(12) United States Patent
Nakagawa et al.

(10) Patent No.: US 9,889,673 B2
(45) Date of Patent: Feb. 13, 2018

(54) LIQUID DISCHARGE APPARATUS AND LIQUID DISCHARGE HEAD

(71) Applicant: CANON KABUSHIKI KAISHA, Tokyo (JP)

(72) Inventors: Yoshiyuki Nakagawa, Kawasaki (JP); Shuzo Iwanaga, Kawasaki (JP); Shingo Okushima, Kawasaki (JP); Mikio Sanada, Kawasaki (JP); Shin-ichi Hakamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/389,249

(22) Filed: Dec. 22, 2016

(65) Prior Publication Data
US 2017/0197433 A1    Jul. 13, 2017

(30) Foreign Application Priority Data

Jan. 8, 2016  (JP) ................................ 2016-002959
Dec. 8, 2016  (JP) ................................ 2016-238633

(51) Int. Cl.
*B41J 2/18*  (2006.01)
*B41J 2/14*  (2006.01)

(52) U.S. Cl.
CPC .............. *B41J 2/18* (2013.01); *B41J 2/1433* (2013.01)

(58) Field of Classification Search
CPC .... B41J 2/18; B41J 2/1433; B41J 2002/1853; B41J 2202/12
See application file for complete search history.

(56) References Cited

U.S. PATENT DOCUMENTS

| 5,751,318 A | 5/1998 | Granzow |
| 2006/0268066 A1 | 11/2006 | Kaneko |
| 2007/0211123 A1 | 9/2007 | Lee |
| 2012/0200649 A1* | 8/2012 | Igawa .................. B41J 2/175 347/89 |

FOREIGN PATENT DOCUMENTS

| IN | 1161DEL2012 A | 10/2015 |
| JP | 2002-355973 A | 12/2002 |
| JP | 2009-173829 A | 8/2009 |
| WO | 2013/129687 A1 | 9/2013 |

\* cited by examiner

*Primary Examiner* — Juanita D Jackson
(74) *Attorney, Agent, or Firm* — Canon U.S.A., Inc. IP Division

(57) ABSTRACT

A liquid discharge apparatus has a liquid discharge head having a recording element board that includes a plurality of discharge orifices configured to discharge liquid, a plurality of pressure chambers internally provided with a recording element configured to generate energy used to discharge liquid, the plurality of pressure chambers each communicating with the plurality of discharge orifices via discharge channels, a liquid supply channel configured to supply liquid to the plurality of pressure chambers, and a liquid recovery channel configured to recover liquid from the plurality of pressure chambers, and a tank configured to store liquid supplied to the liquid discharge head. The plurality of pressure chambers communicate between the liquid supply channel and the liquid recovery channel so that liquid flows through the plurality of pressure chambers, and the specific permittivity $\epsilon_r$ of the liquid stored in the tank satisfies the relationship of $\epsilon_r \leq 65$.

17 Claims, 43 Drawing Sheets

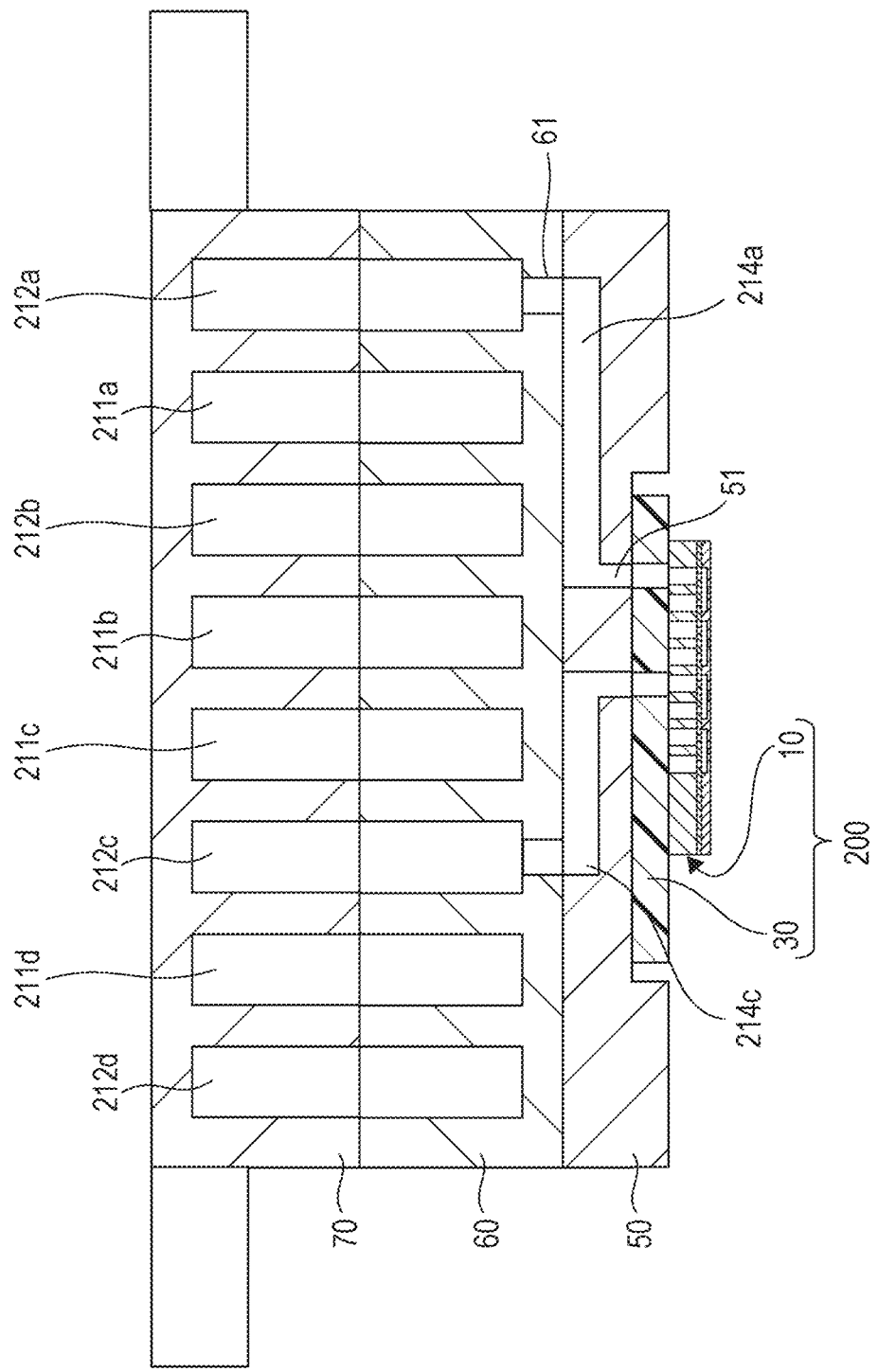

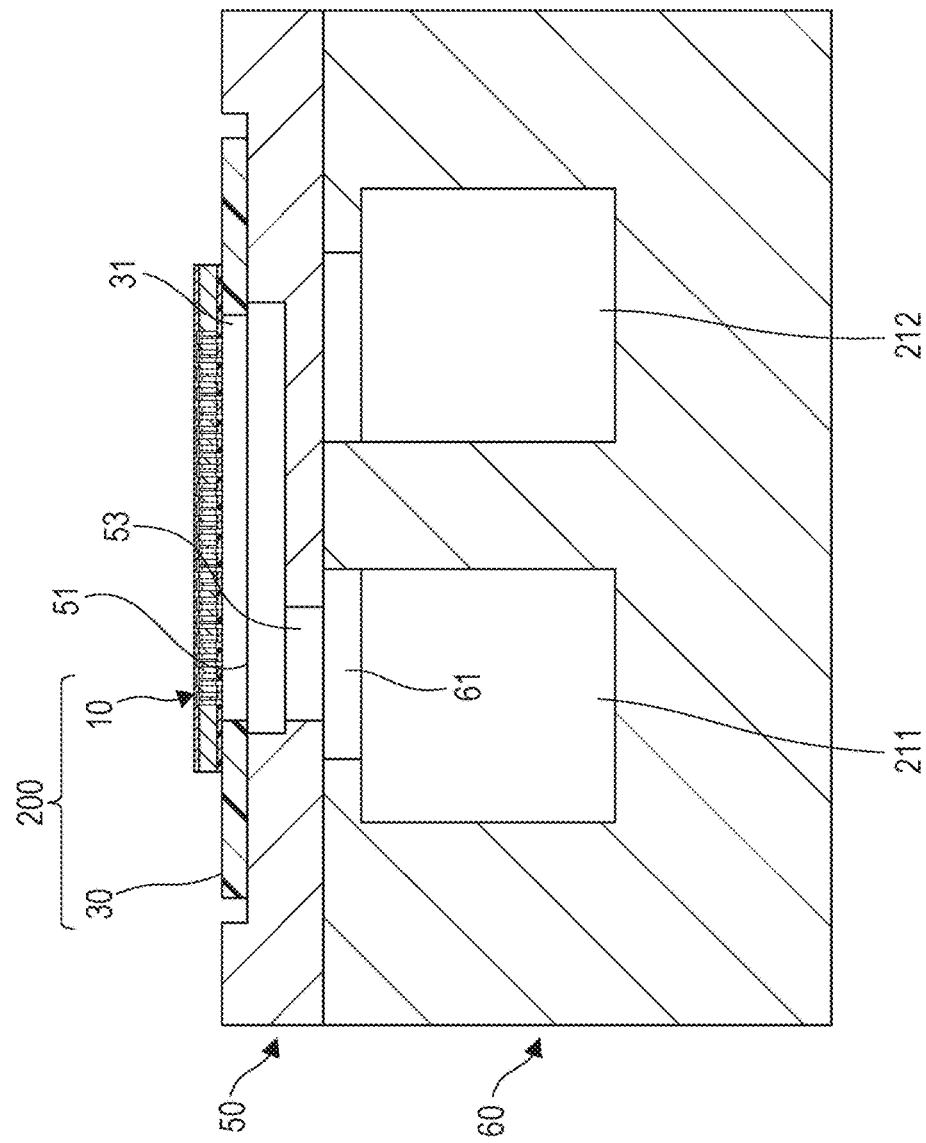

LIQUID DISCHARGE APPARATUS AND LIQUID DISCHARGE HEAD

BACKGROUND

Field

The present disclosure relates to a liquid discharge apparatus and a liquid discharge head.

Description of the Related Art

There is a problem with liquid discharge heads that discharge liquid such as ink or the like from discharge orifices, in that volatile components in the liquid discharged form the discharge orifices evaporate, and the liquid thickens near the discharge orifices, resulting in change in discharge speed of discharged droplets, and droplet landing accuracy being affected.

There is a known method of circulating ink supplied to the liquid discharge head along a circulation path, as a measure to counter this liquid thickening phenomenon. Japanese Patent Laid-Open No. 2002-355973 describes a liquid discharge head that suppresses clogging of discharge orifices due to evaporation of liquid from the discharge orifices, by circulating liquid within a channel formed between a member where the discharge orifices are formed and a substrate where heating resistance elements are formed.

When intermission periods after discharge operations are long, increased viscosity of liquid nearby the discharge orifices is pronounced, and solid components within the liquid may solidify nearby the discharge orifices. Accordingly, the solid components may increase fluid resistance when the liquid passes through the discharge orifices at the time of the first liquid discharge after the intermission, which may result in a defective discharge. However, no consideration regarding such defective discharge is given to the liquid discharge head described in Japanese Patent Laid-Open No. 2002-355973. Accordingly, the defective discharge occurring at the time of the first liquid discharge after the intermission may cause deterioration of image quality.

SUMMARY

It has been found desirable to provide a liquid discharge apparatus and a liquid discharge head capable of high-definition and high-quality image formation.

A liquid discharge apparatus includes: a liquid discharge head having a recording element board that includes a plurality of discharge orifices configured to discharge liquid, a plurality of pressure chambers internally provided with a recording element configured to generate energy used to discharge liquid, the plurality of pressure chambers each communicating with the plurality of discharge orifices via discharge channels, a liquid supply channel configured to supply liquid to the plurality of pressure chambers, and a liquid recovery channel configured to recover liquid from the plurality of pressure chambers; and a tank configured to recover liquid supplied to the liquid discharge head. The plurality of pressure chambers communicate with the liquid supply channel and the liquid recovery channel 19 so that liquid flows through the plurality of pressure chambers. Specific permittivity $\epsilon_r$ of the liquid stored in the tank satisfies the relationship of $\epsilon_r \leq 65$.

A liquid discharge head includes: a discharge orifice configured to discharge liquid; a recording element configured to generate energy used to discharge liquid; a pressure chamber internally provided with the recording element; a liquid supply channel configured to supply liquid to the pressure chamber; and a liquid recovery channel configured to recover liquid from the pressure chamber. A liquid of which specific permittivity $\epsilon_r$ satisfies the relationship of $\epsilon_r \leq 65$ circulates through the liquid supply channel, the pressure chamber, and the liquid recovery channel.

According to the above liquid discharge apparatus and liquid discharge head, the specific permittivity of the liquid can be lowered, whereby stagnation of solid content in the liquid near the perimeter of the discharge orifice can be suppressed even after stopping discharge operations for a certain amount of time. Accordingly, even in a case of a liquid having a great amount of solid content, defective discharge at the time of the first liquid discharge after the intermission can be suppressed, thereby suppressing deterioration of image quality.

Further features of the present invention will become apparent from the following description of exemplary embodiments with reference to the attached drawings.

BRIEF DESCRIPTION OF THE DRAWINGS

FIG. 8 is a cross-sectional view taken along line VIII-VIII in FIG. 7.

FIG. 17 is a cross-sectional view taken along line XVII-XVII in FIG. 16.

DESCRIPTION OF THE EMBODIMENTS

Application examples and embodiments will be described below with reference to the attached drawings. First through third application examples will be described first, and thereafter embodiments will be described. It should be understood, however, that the description that follows does not restrict the scope of the present invention. As one example, a thermal system where bubbles are generated by heat-generating elements and liquid is discharged is implied in the application examples, but the present disclosure is applicable to liquid discharge head employing piezoelectric systems or various other types of liquid discharge systems as well.

Although the application examples relate to an inkjet recording apparatus (or simply "recording apparatus") of a form where a liquid such as ink or the like is circulated between a tank and liquid discharge head, other forms may be used as well. For example, a form may be employed where, instead of circulating ink, two tanks are provided, one at the upstream side of the liquid discharge head and the other on the downstream side, and ink within the pressure chamber is caused to flow by running ink from one tank to the other. Also, the application examples relate to a so-called line head that has a length corresponding to the width of the recording medium, but the embodiments can also be a so-called serial liquid discharge head that records while scanning over the recording medium. An example of a serial liquid discharge head is one that has one board each for recording black ink and for recording color ink, but this is not restrictive. An arrangement may be made where short line heads that are shorter than the width of the recording medium are formed, with multiple recording element boards arrayed so that orifices overlap in the discharge orifice row direction, these being scanned over the recording medium.

First Application Example

Description of Inkjet Recording Apparatus

Figure 1:
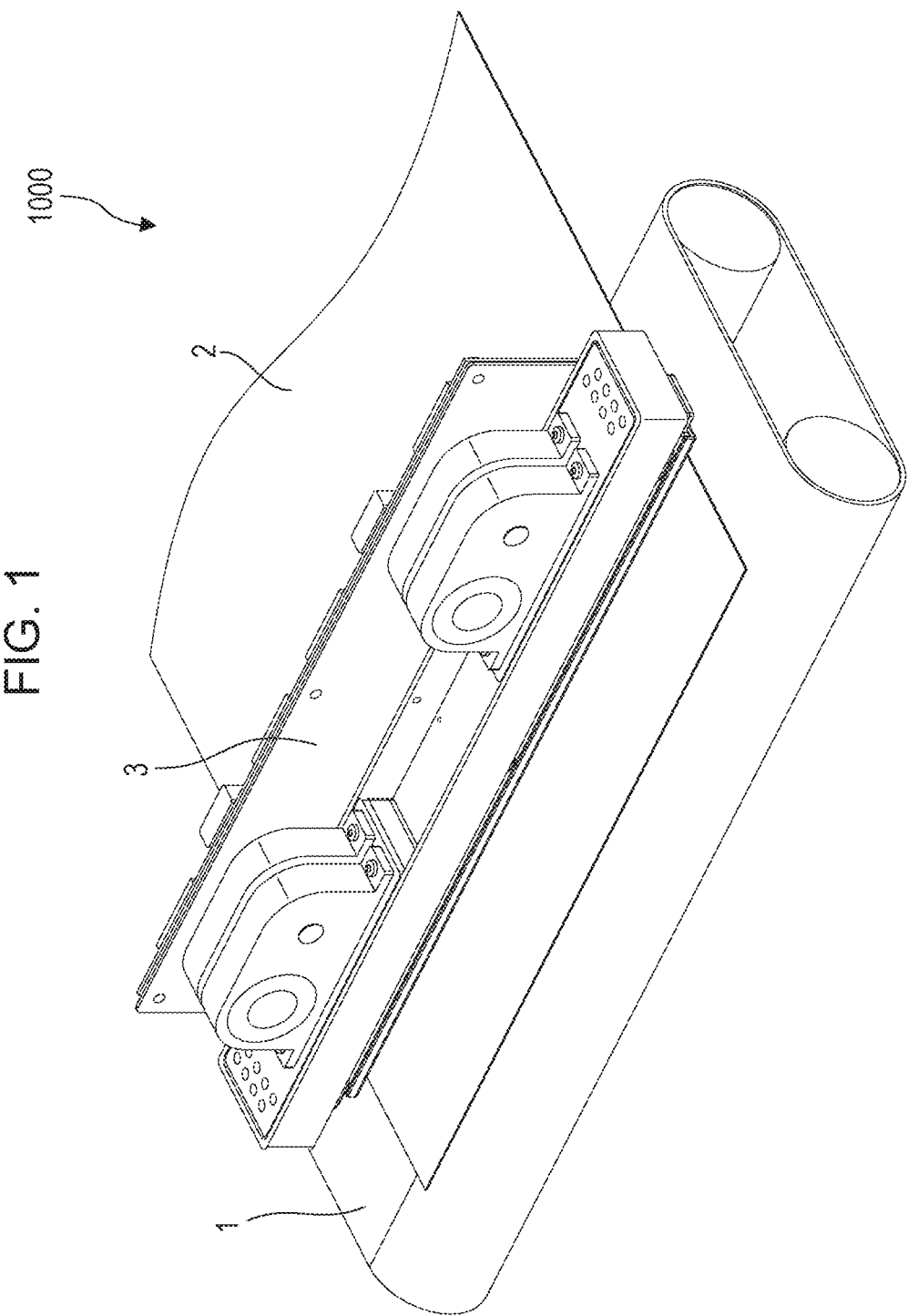
FIG. 1 is a perspective view illustrating an inkjet recording apparatus according to a first application example.

FIG. 1 illustrates a schematic configuration of a device that discharges liquid, and more particularly an inkjet recording apparatus 1000 (hereinafter also referred to simply as "recording apparatus") that performs recording by discharging ink. The recording apparatus 1000 is a line recording apparatus that has a conveyance unit 1 that conveys a recording medium 2, and a line type (page-wide) liquid discharge head 3 disposed generally orthogonal to the conveyance direction of the recording medium 2, and performs single-pass continuous recording while continuously or intermittently conveying multiple recording mediums 2. The recording medium 2 is not restricted to cut sheets, and may be continuous roll sheets. The liquid discharge head 3 is capable of full-color printing by cyan, magenta, yellow, and black (acronym "CMYK") ink. The liquid discharge head 3 has a liquid supply unit serving as a supply path that supplies liquid to the liquid discharge head 3, a main tank, and a buffer tank (see FIG. 2) connected by fluid connection. The liquid discharge head 3 is also electrically connected to an electric control unit that transmits electric power and discharge control signals to the liquid discharge head 3. Liquid paths and electric signal paths within the liquid discharge head 3 will be described later.

Description of First Circulation Path

Figure 2:
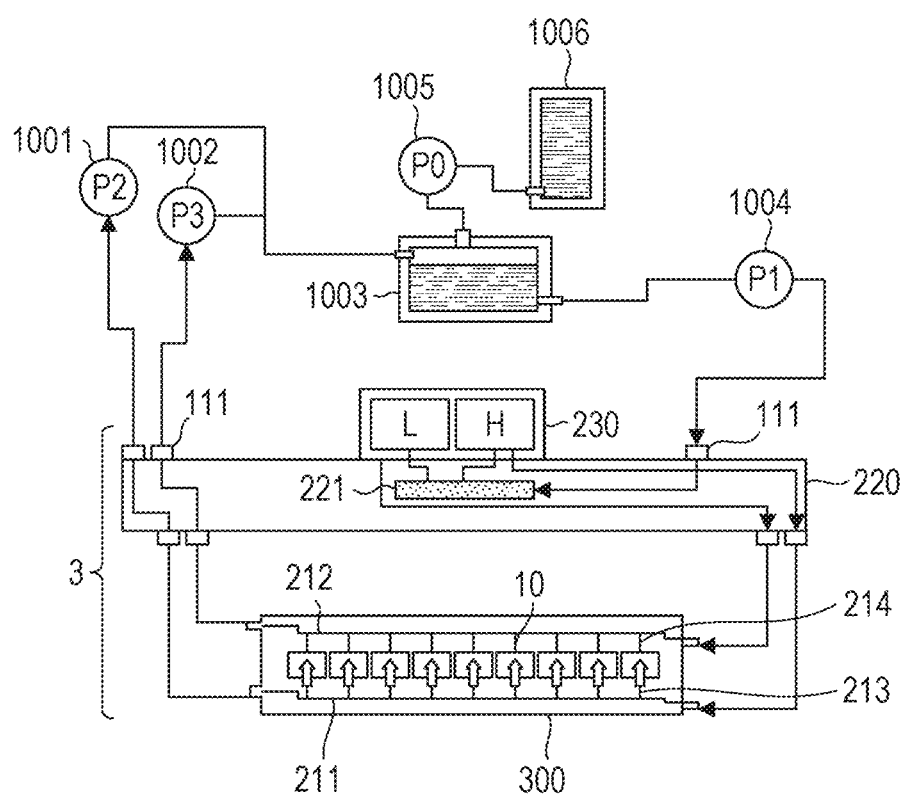
FIG. 2 is a schematic diagram illustrating a first circulation path in the first application example.

FIG. 2 is a schematic diagram illustrating a first circulation path that is a first form of a circulation path applied to the recording apparatus of the present application example. FIG. 2 is a diagram illustrating a first circulation pump (high-pressure side) 1001, a first circulation pump (low-pressure side) 1002 and a buffer tank 1003 and the like connected by fluid connection, as a flowage unit. Although FIG. 2 only illustrates the paths over which one color ink out of the CMYK ink flows, for the sake of brevity of description, in reality there are four colors worth of circulation paths provided to the liquid discharge head 3 and the recording apparatus main unit. The buffer tank 1003, serving as a sub-tank that is connected to a main tank 1006, has an atmosphere communication opening (omitted from illustration) whereby the inside and the outside of the tank communicate, and bubbles within the ink can be discharged externally. The buffer tank 1003 is also connected to a replenishing pump 1005. When ink is consumed at the liquid discharge head 3 due to discharging (ejecting) ink from the discharge orifices of the liquid discharge head, by discharging ink to perform recording, suction recovery, or the like, the replenishing pump 1005 acts to send ink of an amount the same as that has been consumed from the main tank 1006 to the buffer tank 1003.

The first circulation pumps 1001 and 1002 act to extract liquid from a fluid connector 111 of the liquid discharge head 3 and flow the liquid to the buffer tank 1003. The first circulation pumps 1001 and 1002 serving as the flowage unit causing the liquid to flow through the liquid discharge head 3 preferably are positive-displacement pumps that have quantitative fluid sending capabilities. Specific examples may include tube pumps, gear pumps, diaphragm pumps, syringe pumps, and so forth. An arrangement may also be used where a constant flow is ensured by disposing a common-use constant-flow value and relief valve at the outlet of the pump. When the liquid discharge unit 300 is being driven, the (high-pressure side) 1001 and first circulation pump (low-pressure side) 1002 cause a constant amount of ink to flow through a common supply channel 211 and a common recovery channel 212. The amount of flow is preferably set to a level where temperature difference among recording element boards 10 of the liquid discharge head 3 does not influence recording image quality, or higher. On the other hand, if the flow rate is set excessively high, the effects of pressure drop in the channels within a liquid discharge unit 300 causes excessively large difference in negative pressure among the recording element boards 10, resulting in unevenness in density in the image. Accordingly, the flow rate is preferably set taking into consideration temperature difference and negative pressure difference among the recording element boards 10.

A negative pressure control unit 230 is provided between paths of a second circulation pump 1004 and the liquid discharge unit 300. The negative pressure control unit 230 functions such that the pressure downstream from the negative pressure control unit 230 (i.e., at the liquid discharge unit 300 side) can be maintained at a present constant pressure even in cases where the flow rate of the circulation system fluctuates due to difference in duty when recording. Any mechanism may be used as two pressure adjustment mechanisms making up the negative pressure control unit 230, as long as pressure downstream from itself can be controlled to fluctuation within a constant range or smaller that is centered on a desired set pressure. As one example, a mechanism equivalent to a so-called "pressure-reducing regulator" can be employed. In a case of using a pressure-reducing regulator, the upstream side of the negative pressure control unit 230 is preferably pressurized by the second circulation pump 1004 via a liquid supply unit 220, as illustrated in FIG. 2. This enables the effects of water head pressure as to the liquid discharge head 3 of the buffer tank 1003 as to the liquid discharge head 3 to be suppressed, giving broader freedom in the layout of the buffer tank 1003 in the recording apparatus 1000. It is sufficient that the second circulation pump 1004 have a certain lift pressure or greater, within the range of the circulatory flow pressure of ink used when driving the liquid discharge head 3, and turbo pumps, positive-displacement pumps, and the like can be used. Specifically, diaphragm pumps or the like can be used. Alternatively, a water head tank disposed with a certain water head difference as to the negative pressure control unit 230, for example, may be used instead of the second circulation pump 1004.

As illustrated in FIG. 2, the negative pressure control unit 230 has two pressure adjustment mechanisms, with different control pressure from each other having been set. Of the two negative pressure adjustment mechanisms, the relatively high-pressure setting side (denoted by H in FIG. 2) and the relatively low-pressure side (denoted by L in FIG. 2) are respectively connected to the common supply channel 211 and the common recovery channel 212 within the liquid discharge unit 300 via the liquid supply unit 220. Provided to the liquid discharge unit 300 are individual supply channels 213 and individual recovery channels 214 communicating between the common supply channel 211, common recovery channel 212, and the recording element boards 10. Due to the individual supply channels 213 communicating with the common supply channel 211 and common recovery channel 212, flows occur where part of the liquid flows from the common supply channel 211 through internal channels in the recording element board 10 and to the common recovery channel 212 (indicated by the arrows in FIG. 2). The reason is that the pressure adjustment mechanism H is connected to the common supply channel 211, and the pressure adjustment mechanism L to the common recovery channel 212, so a pressure difference is generated between the two common channels.

Thus, flows occur within the liquid discharge unit 300 where a part of the liquid passes through the recording element boards 10 while liquid flows through each of the common supply channel 211 and common recovery channel 212. Accordingly, heat generated at the recording element boards 10 can be externally discharged from the recording element boards 10 by the flows through the common supply channel 211 and common recovery channel 212. This configuration also enables ink flows to be generated at discharge orifices and pressure chambers not being used for recording while recording is being performed by the liquid discharge head 3, so thickening of the ink at such portions can be suppressed. Further, thickened ink and foreign substances in the ink can be discharged to the common recovery channel 212. Accordingly, the liquid discharge head 3 according to the present application example can record at high speed with high image quality.

Description of Second Circulation Path

Figure 3:
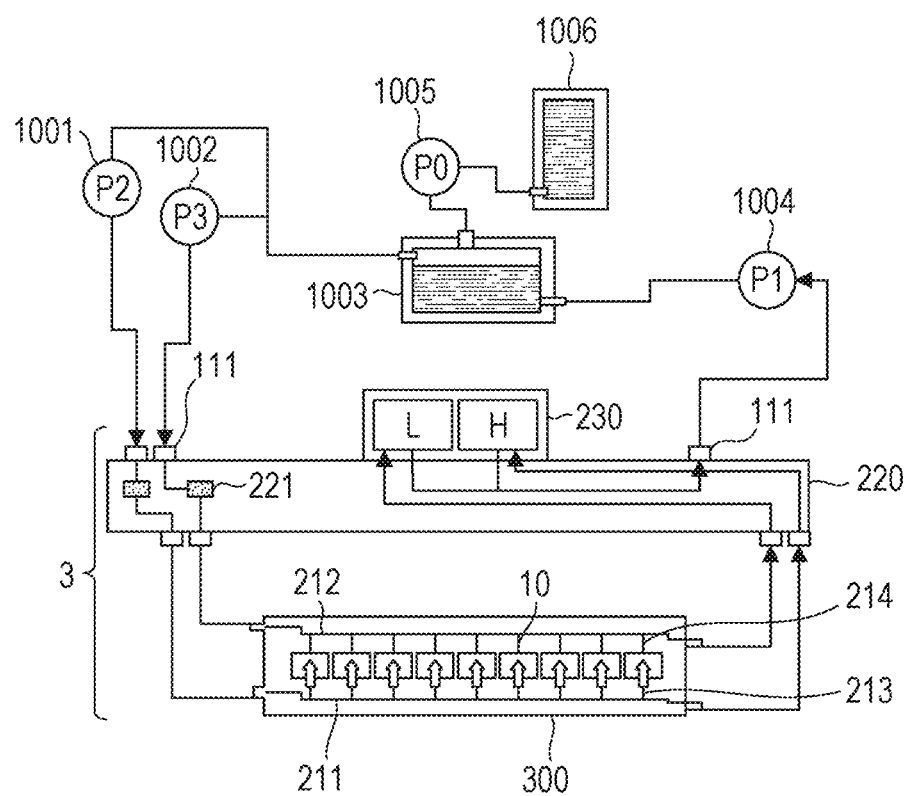
FIG. 3 is a schematic diagram illustrating a second circulation path in the first application example.

FIG. 3 illustrates, of circulation paths applied to the recording apparatus according to the present application example, a second circulation path that is a different circulation path from the above-described first circulation path. A primary point of difference as to the above-described first circulation path is that both of the two pressure adjustment mechanisms making up the negative pressure control unit 230 have a mechanism to control pressure at the upstream side from the negative pressure control unit 230 to fluctuation within a constant range that is centered on a desired set pressure. This mechanism is a mechanism part having operations equivalent to a so-called "backpressure regulator". Another point of difference is that the second circulation pump 1004 acts as a negative pressure source to depressurize the downstream side from the negative pressure control unit 230. A further point of difference is that the first circulation pump (high-pressure side) 1001 and first circulation pump (low-pressure side) 1002 are disposed on the upstream side of the liquid discharge head 3, and the negative pressure control unit 230 is disposed on the downstream side of the liquid discharge head 3.

The negative pressure control unit 230 in the second circulation path acts as follows. That is to say, the negative pressure control unit 230 operates to maintain pressure fluctuation on the upstream side of itself (i.e., at the liquid discharge unit 300 side) within a constant range centered on a preset pressure, even in cases where the flow rate fluctuates due to difference in duty when recording with the liquid discharge head 3. The downstream side of the negative pressure control unit 230 is preferably pressurized by the second circulation pump 1004 via the liquid supply unit 220, as illustrated in FIG. 3. This enables the effects of water head of the buffer tank 1003 as to the liquid discharge head 3 to be suppressed, giving a broader range of selection for the layout of the buffer tank 1003 in the recording apparatus 1000. Alternatively, a water head tank disposed with a certain water head difference as to the negative pressure control unit 230, for example, may be used instead of the second circulation pump 1004.

The negative pressure control unit 230 has two pressure adjustment mechanisms, with different control pressure from each other having been set as illustrated in FIG. 3, in the same way as the first application example. Of the two negative pressure adjustment mechanisms, the relatively high-pressure setting side (denoted by H in FIG. 3) and the relatively low-pressure side (denoted by L in FIG. 3) are respectively connected to the common supply channel 211 and the common recovery channel 212 within the liquid discharge unit 300 via the liquid supply unit 220. The pressure of the common supply channel 211 is made to be relatively higher than the pressure of the common recovery channel 212 by the two negative pressure adjustment mechanisms. Thus, flows occur where ink flows from the common supply channel 211 through individual channels 213 and 214 and internal channels in the recording element board 10 to the common recovery channel 212 (indicated by the arrows in FIG. 3). The second circulation path thus yields an ink flow state the same as that of the first circulation path within the liquid discharge unit 300, but has two advantages that are different from the case of the first circulation path.

One advantage is that, with the second circulation path, the negative pressure control unit 230 is disposed on the downstream side of the liquid discharge head 3, so there is little danger that dust and foreign substances generated at the negative pressure control unit 230 will flow into the head. A second advantage is that the maximum value of the necessary flow rate supplied from the buffer tank 1003 to the liquid discharge head 3 can be smaller in the second circulation path as compared to the case of the first circulation path. The reason is as follows. The total flow rate within the common supply channel 211 and common recovery channel 212 when circulating during recording standby will be represented by A. The value of A is defined as the smallest flow rate necessary to maintain the temperature difference in the liquid discharge unit 300 within a desired range in a case where temperature adjustment of the liquid discharge head 3 is performed during recording standby. Also, the discharge flow rate in a case of discharging ink from all discharge orifices of the liquid discharge unit 300 (full discharge) is defined as F. Accordingly, in the case of the first circulation path (FIG. 2), the set flow rate of the first circulation pump (high-pressure side) 1001 and the first circulation pump (low-pressure side) 1002 is A, so the maximum value of the liquid supply amount to the liquid discharge head 3 necessary for full discharge is A+F.

On the other hand, in the case of the second circulation path (FIG. 3), the liquid supply amount to the liquid discharge head 3 necessary at the time of recording standby is flow rate A. This means that the supply amount to the liquid discharge head 3 that is necessary for full discharge is flow rate F. Accordingly, in the case of the second circulation path, the total value of the set flow rate of the first circulation pump (high-pressure side) 1001 and the first circulation pump (low-pressure side) 1002, i.e., the maximum value of the necessary supply amount, is the larger value of A and F. Thus, the maximum value of the necessary supply amount in the second circulation path (A or F) is always smaller than the maximum value of the necessary supply amount in the first circulation path (A+F), as long as the liquid discharge unit 300 of the same configuration is used. Consequently, the degree of freedom regarding circulatory pumps that can be applied is higher in the case of the second circulation path, so low-cost circulatory pumps having a simple structure can be used, the load on a cooler (omitted from illustration) disposed on the main unit side path can be reduced, for example. Accordingly, costs of the recording apparatus main unit can be reduced. This advantage is more pronounced with line heads where the values of A or F are relatively great, and is more useful the longer the length of the line head is in the longitudinal direction.

However, there are points where the first circulation path is more advantageous than the second circulation path. That is to say, with the second circulation path, the flow rate flowing through the liquid discharge unit 300 at the time of recording standby is maximum, so the lower the recording duty of the image is, the greater a negative pressure is applied to the nozzles. Accordingly, in a case where the channel widths of the common supply channel 211 and common recovery channel 212 (the length in a direction orthogonal to the direction of flow of liquid) is reduced to reduce the head width (the length of the liquid discharge head in the transverse direction), this may result in more influence of satellite droplets. The reason is that high negative pressure is applied to the nozzles in low-duty images where unevenness is conspicuous. On the other hand, high negative pressure is applied to the nozzles when forming high-duty images in the case of the first circulation path, so any generated satellites are less conspicuous, which is advantageous in that influence on the image quality is small. Which of these two circulation paths is more preferable can be selected in light of the specifications of the liquid discharge head and recording apparatus main unit (discharge flow rate F, smallest circulatory flow rate A, and channel resistance within the head).

Description of Third Circulation Path

Figure 33:
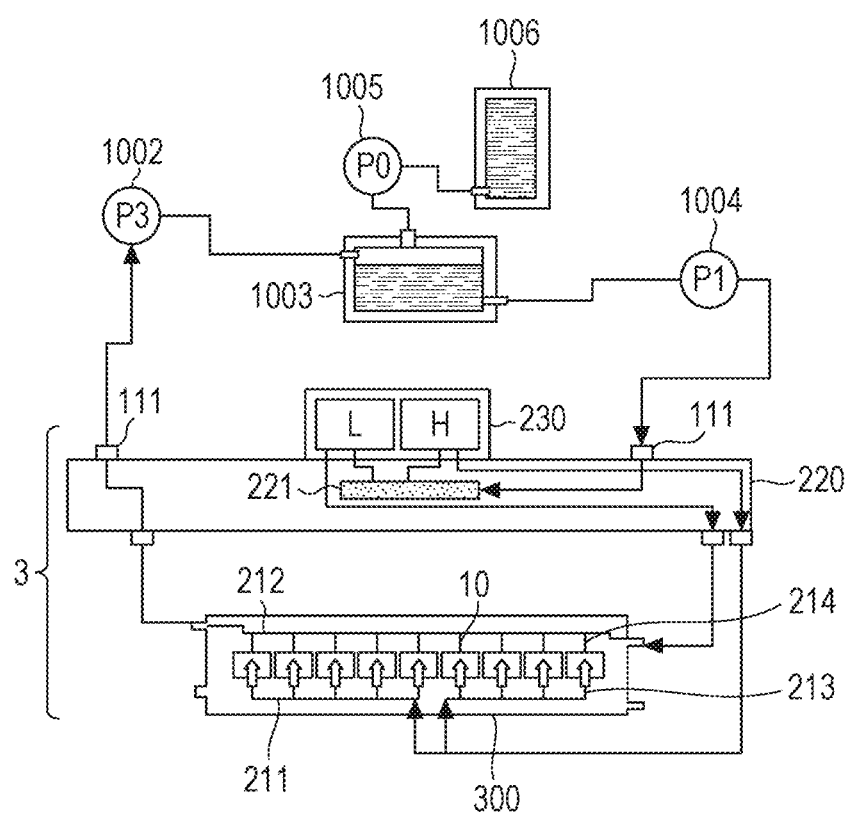
FIG. 33 is a diagram illustrating a third circulation path.

FIG. 33 is a schematic diagram illustrating a third circulation path that is a first form of a circulation path applied to the recording apparatus. Description of functions and configurations the same as the above-described first and second circulation paths will be omitted, and description is be made primarily regarding points of difference.

Liquid is supplied to inside of the liquid discharge head 3 from two places at the middle of the liquid discharge head 3, and one end side of the liquid discharge head 3, for a total of three places. The liquid passes from the common supply channel 211 through pressure chambers 23 then recovered by the common recovery channel 212, and thereafter is externally recovered from a recovery opening at the other end of the liquid discharge head 3. Individual channels 213 and 214 communicate with the common supply channel 211 and common recovery channel 212, with the recording element boards 10 and the pressure chambers 23 disposed within the recording element boards 10 being provided on the paths of the individual channels 213 and 214. Accordingly, flows occur where part of the ink which the first circulation pump 1002 pumps flows from the common supply channel 211 through pressure chambers 23 in the recording element boards 10 and to the common recovery channel 212 (indicated by the arrows in FIG. 33). The reason is that pressure difference is formed between the pressure adjustment mechanism H connected to the common supply channel 211, and the pressure adjustment mechanism L to the common recovery channel 212, and the first circulation pump 1002 is connected to just the common recovery channel 212.

Thus, a flow of liquid that passes through the common recovery channel 212, and a flow that passes from the common supply channel 211 through the pressure chambers 23 in the recording element boards 10 and flows to the common recovery channel 212, are formed in the liquid discharge unit 300. Accordingly, heat generated at the recording element boards 10 can be externally discharged from the recording element boards 10 by the flow from the common supply channel 211 to the common recovery channel 212, while suppressing increase of pressure loss. Also, according to the present circulation path, the number of pumps serving as liquid conveyance units can be reduced as compared with the first and second circulation paths described above.

Description of Configuration of Liquid Discharge Head

Figure 4A:
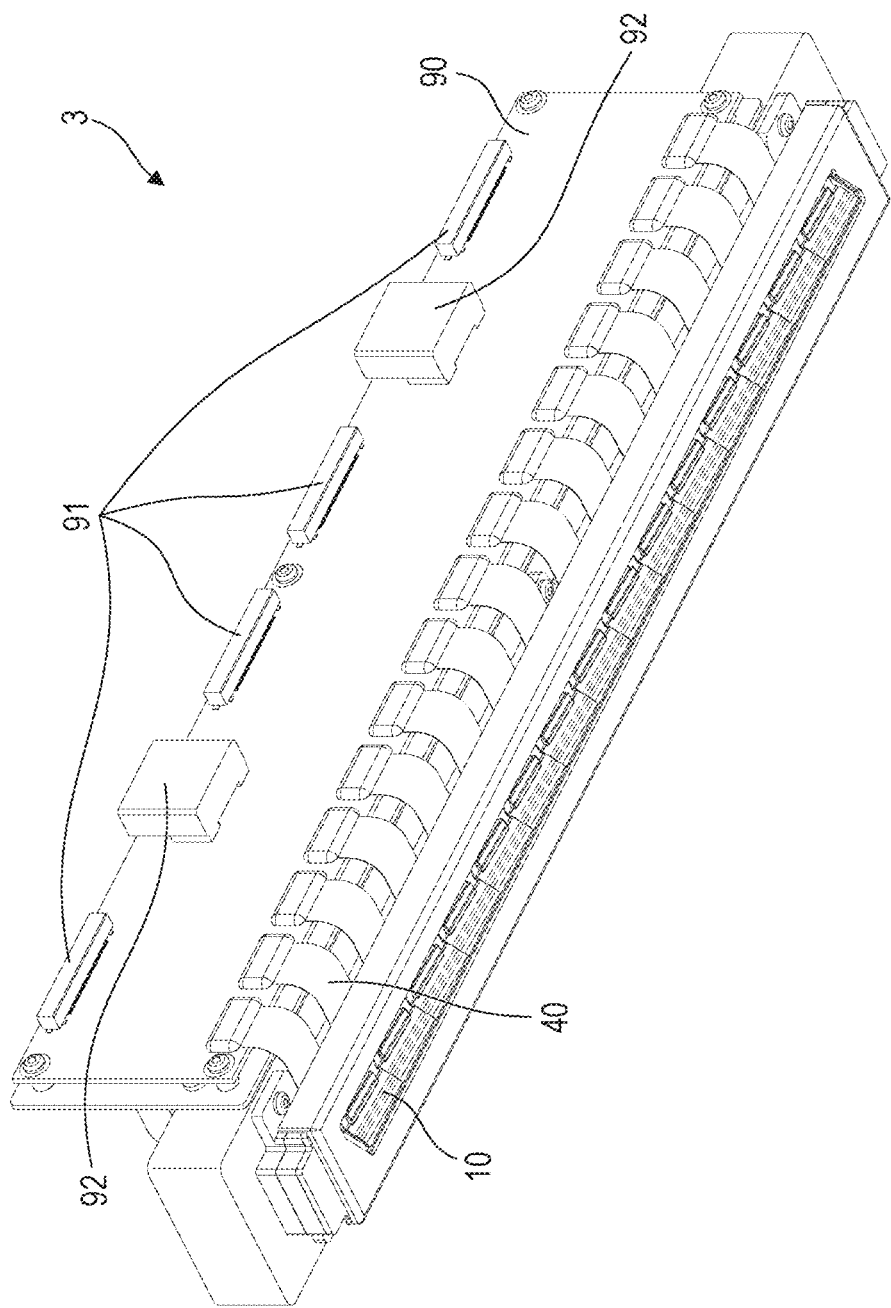
FIGS. 4A and 4B are perspective diagrams of a liquid discharge head according to the first application example.
Figure 4B:
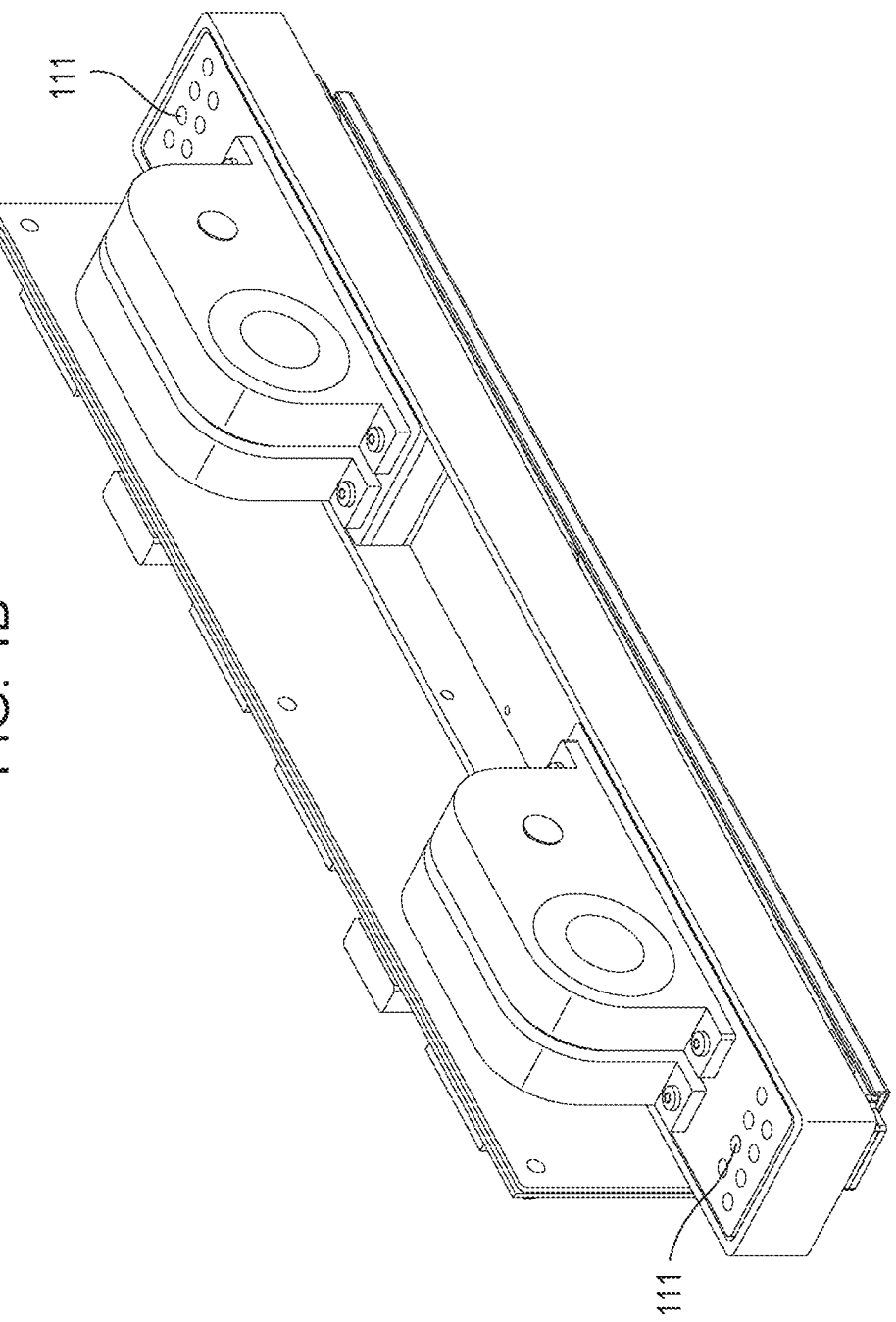

The configuration of the liquid discharge head 3 according to the first application example will be described. FIGS. 4A and 4B are perspective views of the liquid discharge head 3 according to the present application example. The liquid discharge head 3 is a line-type liquid discharge head where fifteen recording element boards 10, each recording element board 10 capable of discharging ink of the four colors of C, M, Y, and K, are arrayed on a straight line (inline layout). The liquid discharge head 3 includes the recording element boards 10, and input terminals 91 and power supply terminals 92 that are electrically connected via flexible printed circuit boards 40 and an electric wiring board 90, as illustrated in FIG. 4A. The input terminals 91 and power supply terminals 92 are electrically connected to a control unit of the recording apparatus 1000, and each supply the recording element boards 10 with discharge drive signals and electric power necessary for discharge. Consolidating wiring by electric circuits in the electric wiring board 90 enables the number of input terminals 91 and power supply terminals 92 to be reduced in comparison with the number of recording element boards 10. This enables the number of electric connection portions that need to be removed when assembling the liquid discharge head 3 to the recording apparatus 1000 or when exchanging the liquid discharge head 3. Liquid connection portions 111 provided to both ends of the liquid discharge head 3 are connected with the liquid supply system of the recording apparatus 1000, as illustrated in FIG. 4B. Thus, ink of the four colors of CMYK is supplied to the liquid discharge head 3, and ink that has passed through the liquid discharge head 3 is recovered to the supply system of the recording apparatus 1000. In this way, ink of each color can circulate over the path of the recording apparatus 1000 and the path of the liquid discharge head 3.

Figure 5:
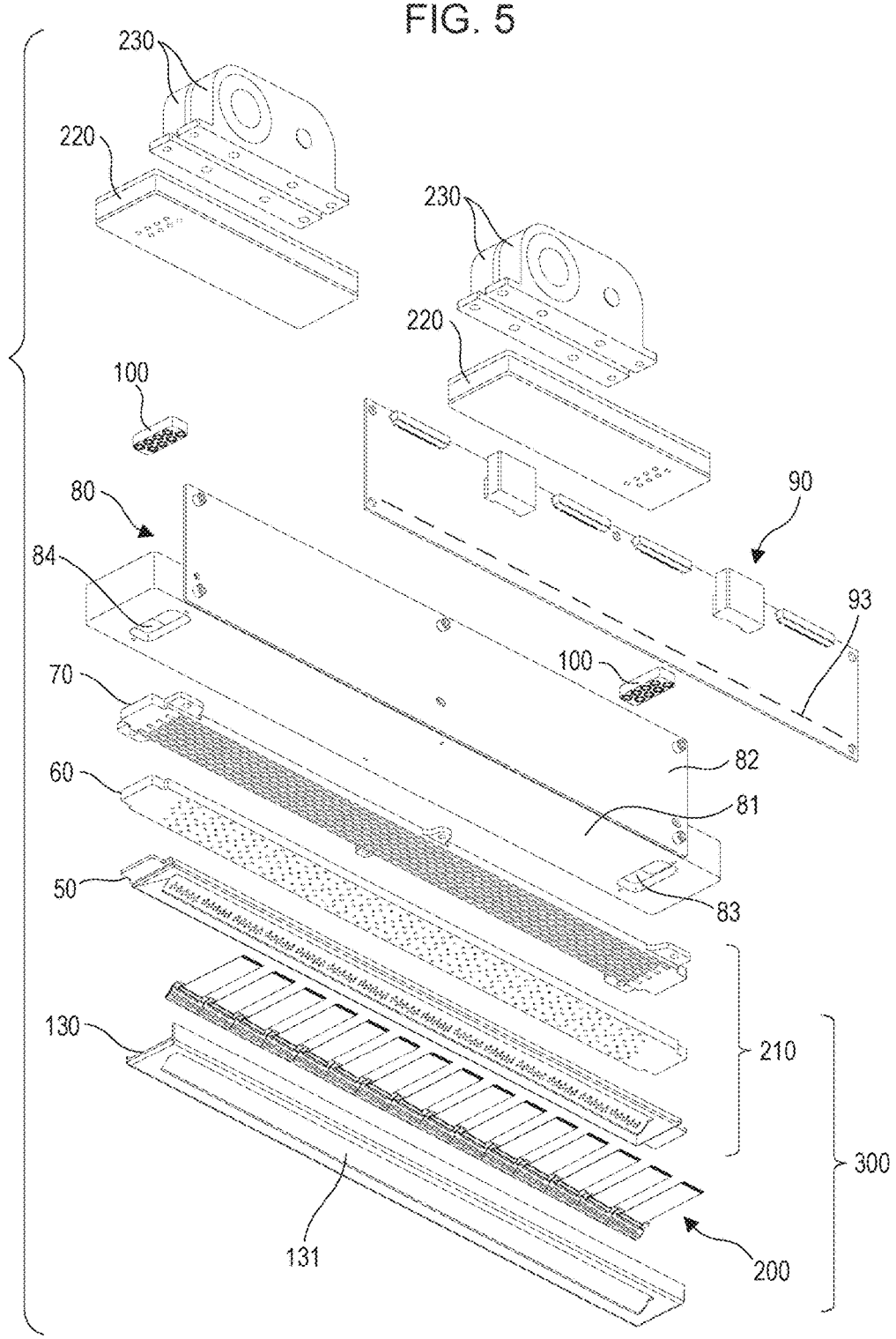
FIG. 5 is a disassembled perspective view of the liquid discharge head according to the first application example.

FIG. 5 illustrates a disassembled perspective view of parts and units making up the liquid discharge head 3. The liquid discharge unit 300, liquid supply units 220, and electric wiring board 90 are attached to a case 80. The liquid connection portions 111 (FIG. 3) are provided to the liquid supply unit 220, and filters 221 (FIGS. 2 and 3) for each color, that communicate with each opening of the liquid connection portions 111 to remove foreign substances in the supplied ink, are provided inside the liquid supply units 220. Two liquid supply units 220 are each provided with filters 221 for two colors. The liquids that have passed through the filters 221 are supplied to the respective negative pressure control units 230 provided on the corresponding liquid supply units 220. Each negative pressure control unit 230 is a unit made up of a pressure adjustment value for its respective color, and markedly attenuate change in pressure drop in the supply system of the recording apparatus 1000 (supply system on the upstream side of the liquid discharge head 3) occurring due to fluctuation in the flow rate of liquid, by the operations of valve and spring members and the like therein. Accordingly, the negative pressure control units 230 are capable of stabilizing change of negative pressure at the downstream side from themselves (liquid discharge unit 300 side) within a certain range. Each negative pressure control unit 230 for each color has two pressure adjustment values built in, as described in FIG. 2. These two pressure adjustment values are each set to different control pressures, and communicate with the liquid supply unit 220 via the common supply channel 211 in the liquid discharge unit 300 in the case of the high-pressure side and via the common recovery channel 212 in the case of the low-pressure side.

The case 80 is configured including a liquid discharge unit support member 81 and electric wiring board support member 82, and supports the liquid discharge unit 300 and electric wiring board 90 as well as securing rigidity of the liquid discharge head 3. The electric wiring board support member 82 is for supporting the electric wiring board 90, and is fixed by being screwed to the liquid discharge unit support member 81. The liquid discharge unit support member 81 serves to correct warping and deformation of the liquid discharge unit 300, and thus secure relative positional accuracy of the multiple recording element boards 10, thereby suppressing unevenness in the recorded article. Accordingly, the liquid discharge unit support member 81 preferably has sufficient rigidity. Examples of suitable materials includes metal materials such as stainless steel and aluminum, and ceramics such as alumina. The liquid discharge unit support member 81 has openings 83 and 84 into which joint rubber members 100 are inserted. Liquid supplied from a liquid supply unit 220 passes through a joint rubber member 100 and is guided to a third channel member 70 which is a part making up the liquid discharge unit 300.

The liquid discharge unit 300 is made up of multiple discharge modules 200 and a channel member 210, and a cover member 130 is attached to the face of the liquid discharge unit 300 that faces the recording medium. The cover member 130 is a member having a frame-shaped face where a long opening 131 is provided. The recording element boards 10 included in the discharge module 200 and a sealing portion 110 made up of a sealant (FIG. 9) are exposed from the opening 131, as illustrated in FIG. 5. The frame portion on the perimeter of the opening 131 functions as a contact surface for a cap member that caps off the liquid discharge head 3 when in recording standby. Accordingly, a closed space is preferably formed when capping, by coating the perimeter of the opening 131 with an adhesive agent, sealant, filling member, or the like, to fill in roughness and gaps on the discharge orifice face of the liquid discharge unit 300.

Next, description will be made regarding the configuration of the channel member 210 included in the liquid discharge unit 300. The channel member 210 is an article formed by laminating a first channel member 50, a second channel member 60, and the third channel member 70. The channel member 210 is a channel member that distributes the liquid supplied from the liquid supply unit 220 to each of the discharge modules 200, and returns liquid recirculating from the discharge modules 200 to the liquid supply unit 220. The channel member 210 is fixed to the liquid discharge unit support member 81 by screws, thereby suppressing warping and deformation of the channel member 210.

Figure 6A:
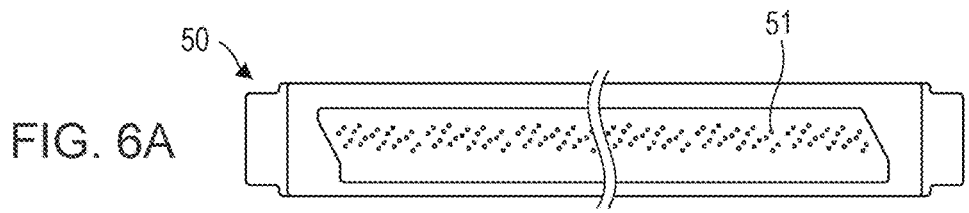
FIGS. 6A through 6F are plan views illustrating first through third channel members according to the first application example.
Figure 6B:
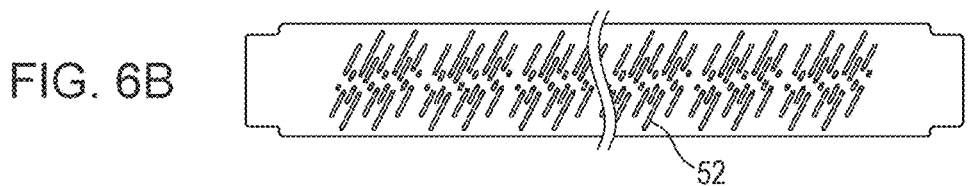
Figure 6C:
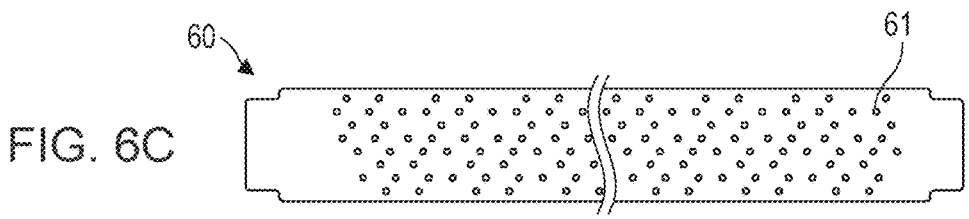
Figure 6D:
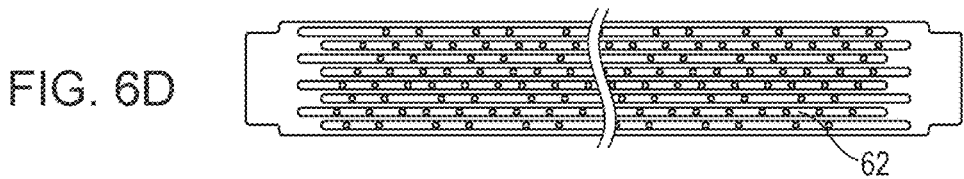
Figure 6E:
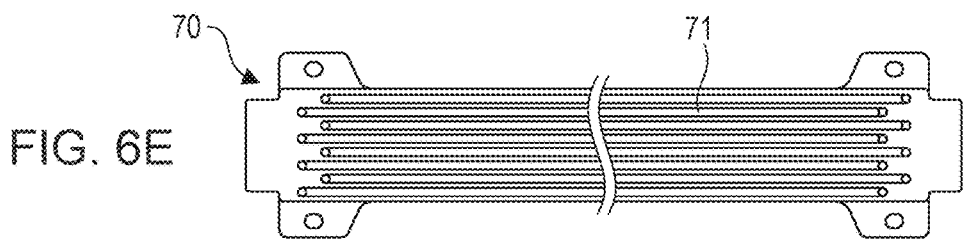
Figure 6F:
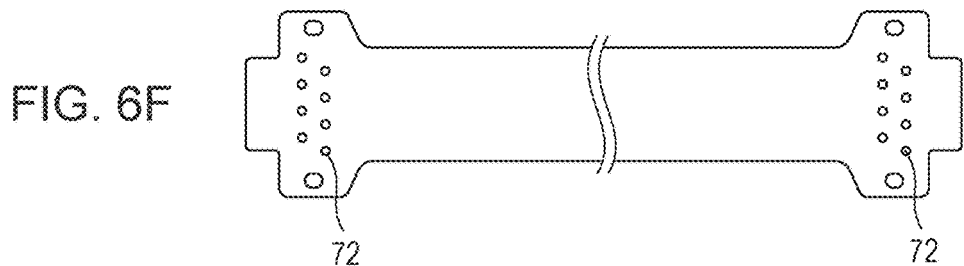
Figure 7:
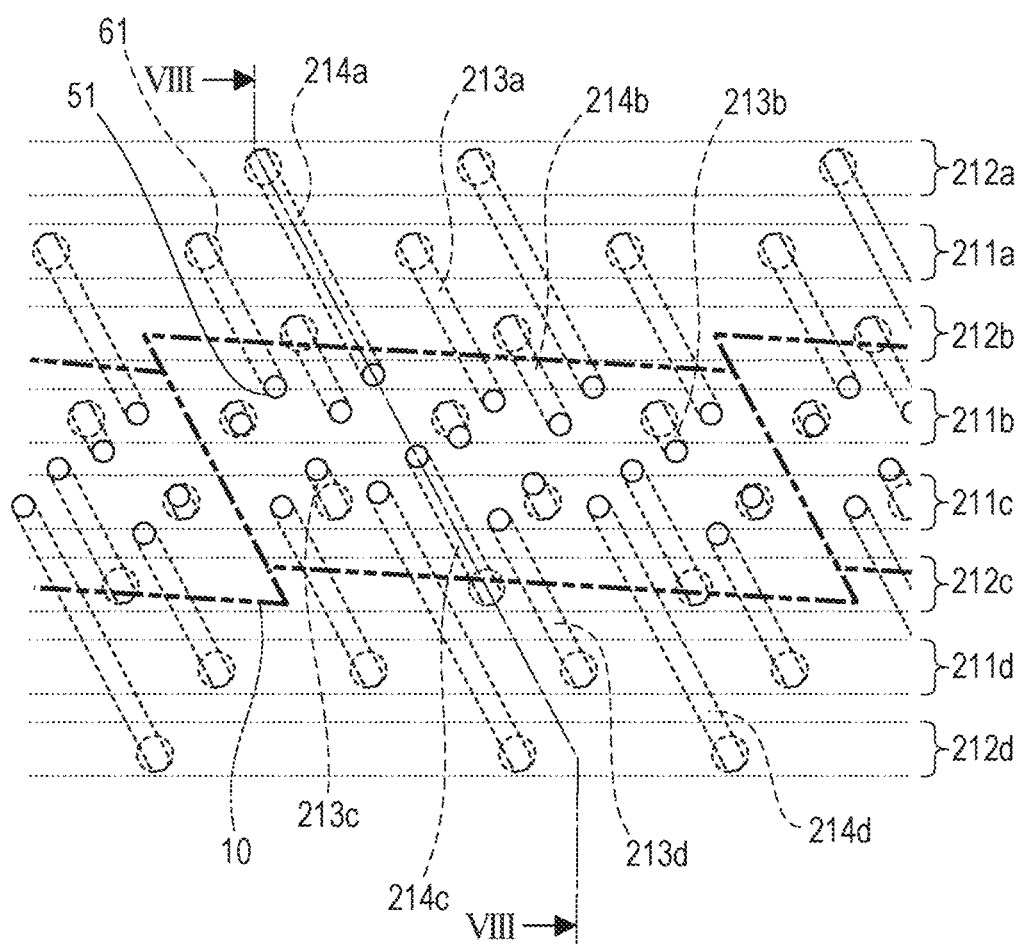
FIG. 7 is an enlarged transparent view of part of channel members in the first application example.

FIGS. 6A through 6F are diagrams illustrating the front and rear sides of the channel members making up the first through third channel members. FIG. 6A illustrates the side of the first channel member 50 on which the discharge modules 200 are mounted, and FIG. 6F illustrates the face of the third channel member 70 that comes in contact with the liquid discharge unit support member 81. The first channel member 50 and second channel member 60 have mutually adjoining channel member contact faces, illustrated in FIGS. 6B and 6C respectively, as do the second channel member 60 and third channel member 70 as illustrated in FIGS. 6D and 6E. The adjoining second channel member 60 and third channel member 70 have formed thereupon common channel grooves 62 and 71 which, when facing each other, form eight common channels extending in the longitudinal direction of the channel members. This forms a set of common supply channels 211 and common recovery channels 212 for each of the colors within the channel member 210 (FIG. 7). Communication ports 72 of the third channel member 70 communicate with the holes in the joint rubber members 100, so as to communicate with the liquid supply unit 220 by fluid connection. Multiple communication ports 61 are formed on the bottom face of the common channel grooves 62 of the second channel member 60, communicating with one end of individual channel grooves 52 of the first channel member 50. Communication ports 51 are formed at the other end of the individual channel grooves 52 of the first channel member 50 so as to communicate with the multiple discharge modules 200 by fluid connection via the communication ports 51. These individual channel grooves 52 allow the channels to be consolidated at the middle of the channel member.

The first through third channel members preferably are corrosion-resistant as to the liquid, and formed from a material having a low linear expansion coefficient. Examples suitable materials include alumina, liquid crystal polymer (LCP), and composite materials (resin materials) where inorganic filler such as fine particles of silica or fiber or the like has been added to a base material such as polyphenyl sulfide (PPS), polysulfone (PSF), or denatured polyphenylene ether (PPE). The channel member 210 may be formed by laminating the three channel members and adhering using an adhesive agent, or in a case of selecting a composite resin material for the material, the three channel members may be joined by fusing.

Next, the connection relationship of the channels within the channel member 210 will be described with reference to FIG. 7. FIG. 7 is a partially enlarged transparent view of channels within the channel member 210 formed by joining the first through third channel members, as viewed from the side of the first channel member 50 on which the discharge modules 200 are mounted. The channel member 210 has, for each color, common supply channels 211 (211a, 211b, 211c, and 211d) and common recovery channels 212 (212a, 212b, 212c, and 212d) extending on the longitudinal direction of the liquid discharge head 3. Multiple individual supply channels 213 (213a, 213b, 213c, and 213d) formed of the individual channel grooves 52 are connected to the common supply channels 211 of each color via the communication ports 61. Multiple individual recovery channels 214 (214a, 214b, 214c, and 214d) formed of the individual channel grooves 52 are connected to the common recovery channels 212 of each color via the communication ports 61. This channel configuration enables ink to be consolidated at the recording element boards 10 situated at the middle of the channel members, from the common supply channels 211 via the individual supply channels 213. Ink can also be recovered from the recording element boards 10 to the common recovery channels 212 via the individual recovery channels 214.

FIG. 8 is a cross-sectional view taken along line VIII-VIII in FIG. 7, illustrating that individual recovery channels (214a and 214c) communicate with the discharge module 200 via the communication ports 51. Although FIG. 8 only illustrates the individual recovery channels (214a and 214c), the individual supply channels 213 and the discharge module 200 communicate at a different cross-section, as illustrated in FIG. 7. Channels for supplying ink from the first channel member 50 to recording elements 15 (FIG. 10B), provided to the recording element board 10, are formed in a support member 30 included in the discharge module 200 and the recording element boards 10. Further, channels for recovering (recirculating) part or all of the liquid supplied to the recording elements 15 to the first channel member 50 are formed in the support member 30 and recording element boards 10. The common supply channels 211 of each color is connected to the negative pressure control unit 230 (high-pressure side) of the corresponding color via its liquid supply unit 220, and the common recovery channels 212 are connected to the negative pressure control units 230 (low-pressure side) via the liquid supply units 220. The negative pressure control units 230 generate pressure difference between the common supply channels 211 and common recovery channels 212. Accordingly, a flow occurs for each color in the liquid discharge head 3 according to the present application example where the channels are connected as illustrated in FIGS. 7 and 8, in the order of common supply channel 211→individual supply channels 213→recording element board 10→individual recovery channels 214→common recovery channel 212.

Description of Discharge Module

Figure 9A:
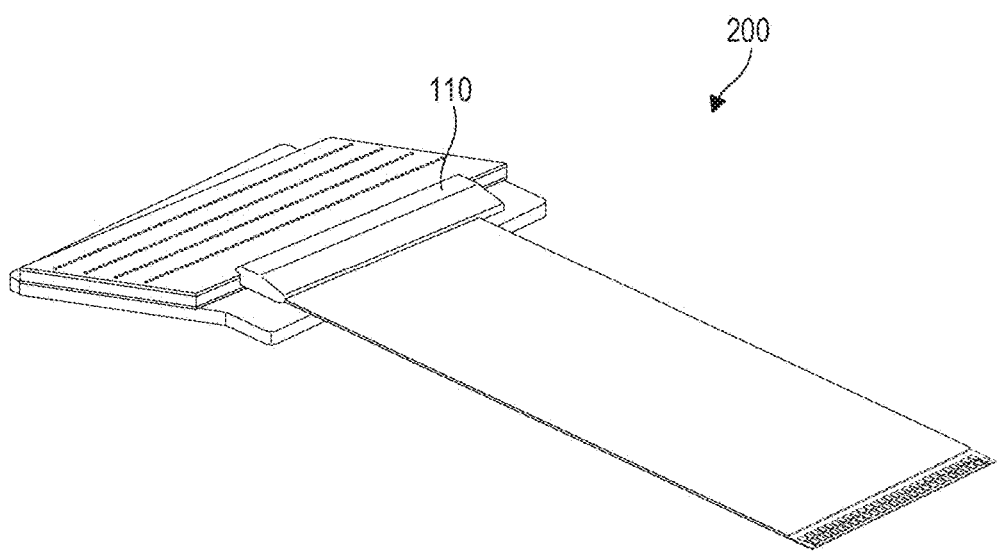
FIGS. 9A and 9B are diagrams illustrating a discharge module according to the first application example, FIG. 9A being a perspective view and FIG. 9B a disassembled view.
Figure 9B:
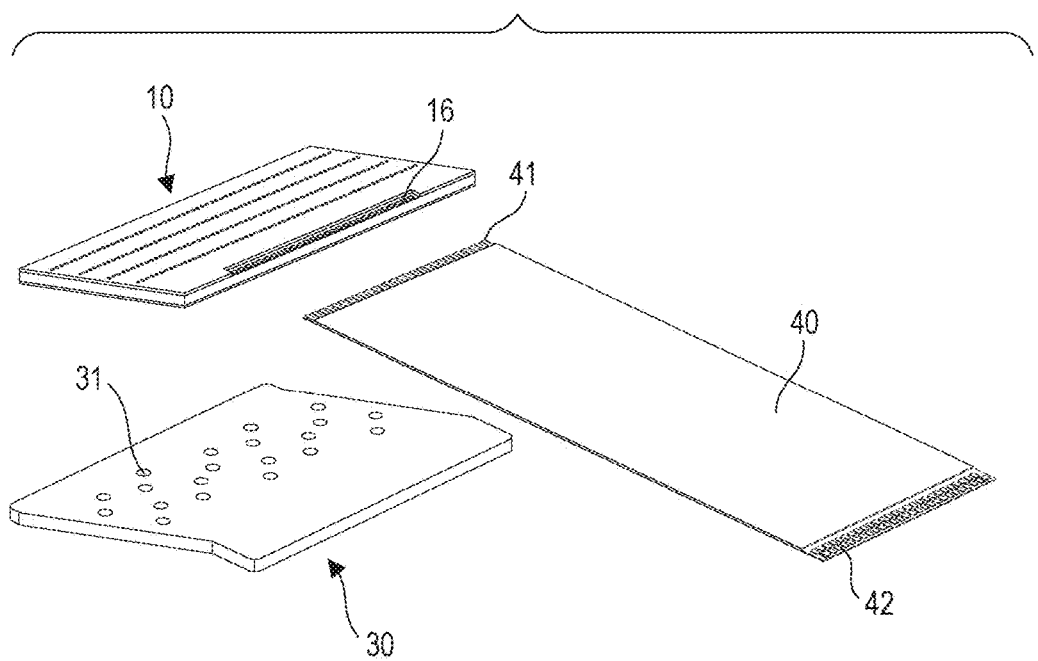

FIG. 9A illustrates a perspective view of one discharge module 200, and FIG. 9B illustrates a disassembled view thereof. The method of manufacturing the discharge module 200 is as follows. First, a recording element board 10 and flexible printed circuit board 40 are adhered to a support member 30 in which communication ports 31 have been formed beforehand. Subsequently, terminals 16 on the recording element board 10 are electrically connected to terminals 41 on the flexible printed circuit board 40 by wire bonding, following which the wire-bonded portion (electric connection portion) is covered and sealed by a sealant to form a sealing portion 110. Terminals 42 at the other end of the flexible printed circuit board 40 from the recording element board 10 are electrically connected to connection terminals 93 (FIG. 5) of the electric wiring board 90. The support member 30 is a support member that supports the recording element board 10, and also is a channel member communicating between the recording element board 10 and the channel member 210 by fluid connection. Accordingly, the support member 30 should have a high degree of flatness, and also should be able to be joined to the recording element board 10 with a high degree of reliability. Examples of suitable materials include alumina and resin materials.

Description of Structure of Recording Element Board

Figure 10A:
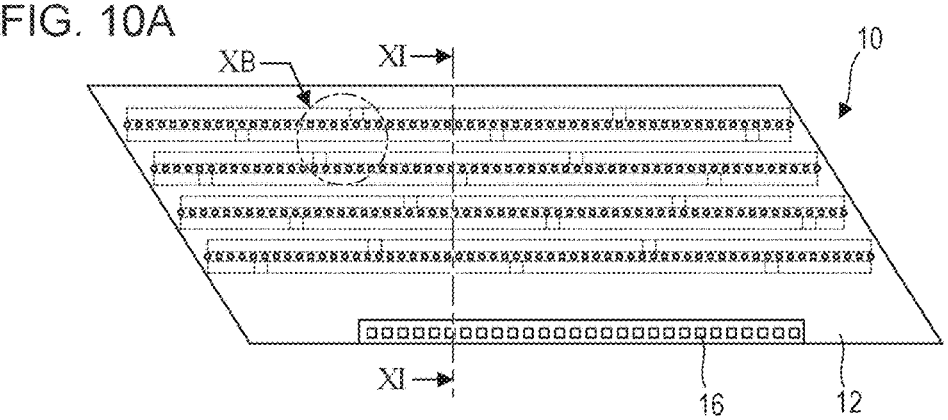
FIGS. 10A through 10C are plan views of a recording element board according to the first application example.
Figure 10B:
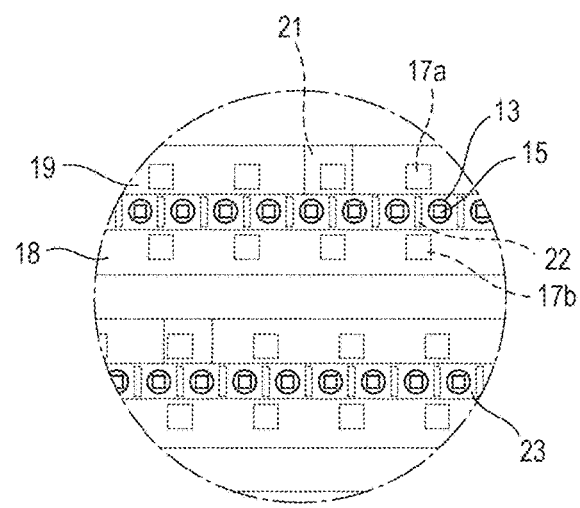
Figure 10C:
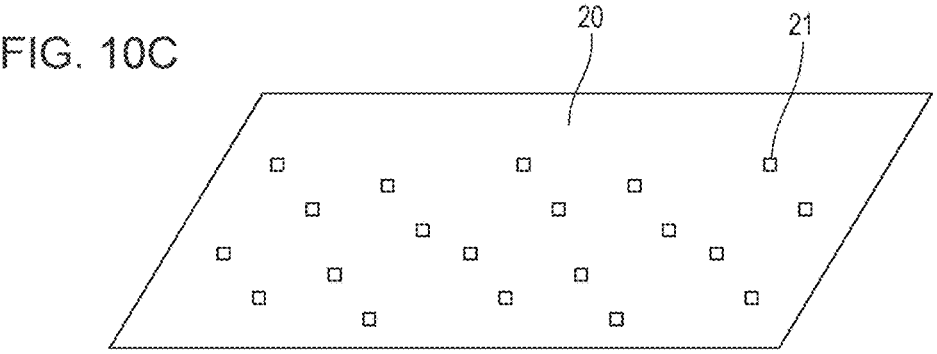

The configuration of the recording element board 10 according to the present application example will be described. FIG. 10A is a plan view of the side of the recording element board 10 on which discharge orifices 13 have been formed, FIG. 10B is an enlarged view of the portion indicated by XB in FIG. 10A, and FIG. 10C is a plan view of the rear face of the recording element board 10 from that in FIG. 10A. The recording element board 10 has a discharge orifice forming member 12, where four discharge orifice rows corresponding to the ink colors are formed, as illustrated in FIG. 10A. Note that hereinafter, the direction in which the discharge orifice rows, where multiple discharge orifices 13 are arrayed, extend, will be referred to as "discharge orifice row" direction.

The recording elements 15, which are heating elements that generate energy that us used to discharge the liquid, are disposed at positions corresponding to the discharge orifices 13, as illustrated in FIG. 10B. Pressure chambers 23 that contain the recording elements 15 are sectioned off by partitions 22. The recording elements 15 are electrically connected to the terminals 16 in FIG. 10A by electric wiring (omitted from illustration) provided to the recording element board 10. The recording elements 15 generate heat to cause the liquid to boil, based on pulse signals input from a control circuit of the recording apparatus 1000, via the electric wiring board 90 (FIG. 5) and flexible printed circuit board 40 (FIG. 9). The force of bubbling due to this boiling discharges the liquid from the discharge orifices 13. A liquid supply channel 18 extends along one side of each discharge orifice row, and a liquid recovery channel 19 along the other. The liquid supply channels 18 and liquid recovery channels 19 are channels extending in the direction of the discharge orifice rows provided on the recording element board 10, and communicate with the discharge orifices 13 via supply ports 17a and recovery ports 17b, respectively.

Figure 11:
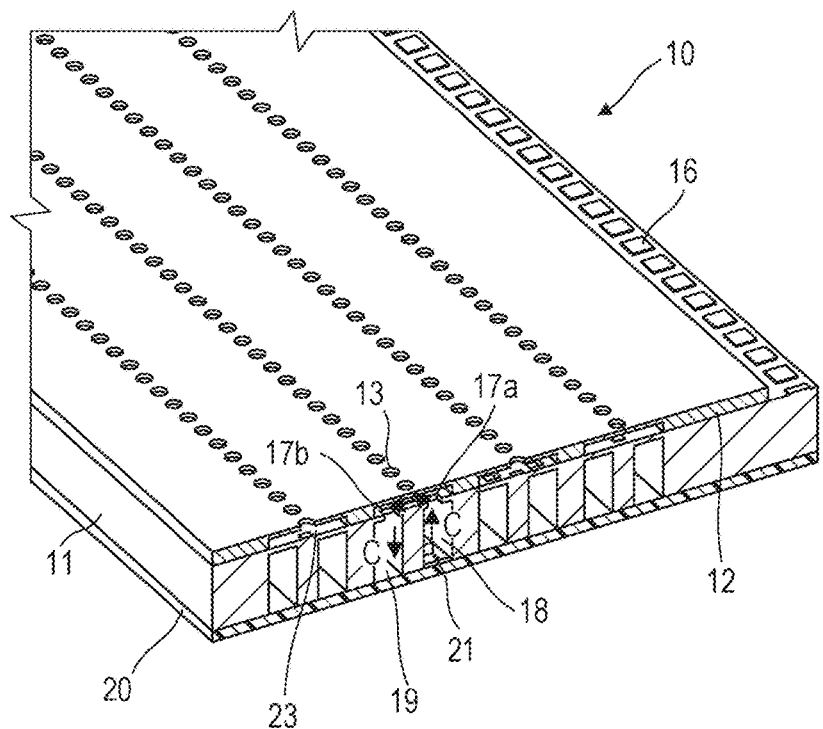
FIG. 11 is a perspective view illustrating cross-section XI-XI in FIG. 10A.

A sheet-shaped cover 20 is laminated on the rear face from the face of the recording element board 10 on which the discharge orifices 13 are formed, the cover 20 having multiple openings 21 communicating with the liquid supply channel 18 and liquid recovery channel 19 which will be described later, as illustrated in FIGS. 10C and 11. In the present application example, three openings 21 are provided in the cover 20 for each liquid supply channel 18, and two openings 21 are provided for each liquid recovery channel 19. The openings 21 of the cover 20 communicate with the multiple communication ports 51 illustrated in FIG. 6A, as illustrated in FIG. 10B. The cover 20 functions as a lid that makes up part of the sides of the liquid supply channel 18 and liquid recovery channel 19 formed in the substrate 11 of the recording element board 10, as illustrated in FIG. 11. The cover 20 preferably is sufficiently corrosion-resistant as to the liquid, and has to have a high degree of precision regarding the opening shapes of the openings 21 and the positions thereof from the perspective of color mixture prevention. Accordingly, a photosensitive resin material or silicon plate is preferably used as the material for the cover 20, with the openings 21 being formed by photolithography process. The cover 20 thus is for converting the pitch of channels by the openings 21. The cover 20 preferably is thin, taking into consideration pressure drop, and preferably is formed of a film material.

Next, the flow of liquid within the recording element board 10 will be described. FIG. 11 is a perspective view, illustrating a cross-section of the recording element board 10 and cover 20 taken along plane XI-XI in FIG. 10A. The recording element board 10 is formed by laminating the substrate 11 formed of silicon (Si) and the discharge orifice forming member 12 formed of a photosensitive resin, with the cover 20 joined on the rear face of the substrate 11. The recording elements 15 are formed on the other face side of the substrate 11 (FIG. 10B) with the grooves making up the liquid supply channels 18 and liquid recovery channels 19 extending along the discharge orifice rows being formed at the reverse side thereof. The liquid supply channels 18 and liquid recovery channels 19 formed by the substrate 11 and cover 20 are respectively connected to the common supply channels 211 and common recovery channels 212 within the channel member 210, and there is differential pressure between the liquid supply channels 18 and liquid recovery channels 19. When liquid is being discharged from multiple discharge orifices 13 of the liquid discharge head 3 and recording is being performed, the liquid flows as follows due to differential pressure at the discharge orifices 13 that are not performing discharge operations. That is to say, the ink within the liquid supply channel 18 provided within the substrate 11 flows to the liquid recovery channel 19 via the supply port 17a, pressure chamber 23, and recovery port 17b (flow indicated by arrow C in FIG. 11). This flow enables ink that has thickened due to evaporation from the discharge orifices 13, bubbles, foreign substance, and so forth, to be recovered to the liquid recovery channel 19 from the discharge orifices 13 and pressure chambers 23 where recording is not being performed. This also enables thickening of ink at the discharge orifices 13 and pressure chambers 23 to be suppressed. Liquid recovered to the liquid recovery channels 19 is recovered in the order of the communication ports 51 in the channel member 210, the individual recovery channels 214, and the common recovery channel 212, via the openings 21 of the cover 20 and the liquid communication ports 31 of the support member 30 (see FIG. 9B), and is ultimately recovered to the supply path of the recording apparatus 1000.

That is to say, the liquid supplied from the recording apparatus main unit to the liquid discharge head 3 is supplied and recovered by flowing in the order described below. First, the liquid flows from the liquid connection portions 111 of the liquid supply unit 220 into the liquid discharge head 3. The liquid then is supplied to the joint rubber members 100, communication ports 72 and common channel grooves 71 provided to the third channel member 70, common channel grooves 62 and communication ports 61 provided to the second channel member 60, and individual channel grooves 52 and communication ports 51 provided to the first channel member 50. Thereafter, the liquid is supplied to the pressure chambers 23 in the order of the liquid supply channels 18 and supply ports 17a provided to the substrate 11. The liquid that has been supplied to the pressure chambers 23 but not discharged from the discharge orifices 13 flows in the order of the recovery ports 17b and liquid recovery channels 19 provided to the substrate 11, the openings 21 provided to the cover 20, and the communication ports 31 provided to the support member 30. Thereafter, the liquid flows in the order of the communication ports 51 and individual channel grooves 52 provided to the first channel member 50, the communication ports 61 and common channel grooves 62 provided to the second channel member 60, the common channel grooves 71 and communication ports 72 provided to the third channel member 70, and the joint rubber members 100. The liquid further flows outside of the liquid discharge head 3 from the liquid connection portions 111 provided to the liquid supply unit. In the first circulation path illustrated in FIG. 2, the liquid that has flowed in from the liquid connection portions 111 passes through the negative pressure control unit 230 and then is supplied to the joint rubber members 100. In the second circulation path illustrated in FIG. 3, liquid recovered from the pressure chambers 23 passes through the joint rubber members 100, and then flows out of the liquid discharge head 3 from the liquid connection portions 111 via the negative pressure control unit 230.

Also, not all liquid flowing in from one end of the common supply channel 211 of the liquid discharge unit 300 is supplied to the pressure chamber 23 via the individual supply channels 213, as illustrated in FIGS. 2 and 3. There is liquid that flows from the other end of the common supply channel 211 and through the liquid supply unit 220 without ever entering the individual supply channels 213. Thus, providing channels where liquid flows without going through the recording element board 10 enables backflow in the circulatory flow of liquid to be suppressed, even in a case where the recording element board 10 has fine channels where the flow resistance is great, as in the case of the present application example. Accordingly, the liquid discharge head according to the present application example is capable of suppressing thickening of liquid in pressure chambers and nearby the discharge orifices, thereby suppressing deviation of discharge from the normal direction and non-discharge of liquid, so high image quality recording can be performed as a result.

Description of Positional Relationship Among Recording Element Boards

Figure 12:
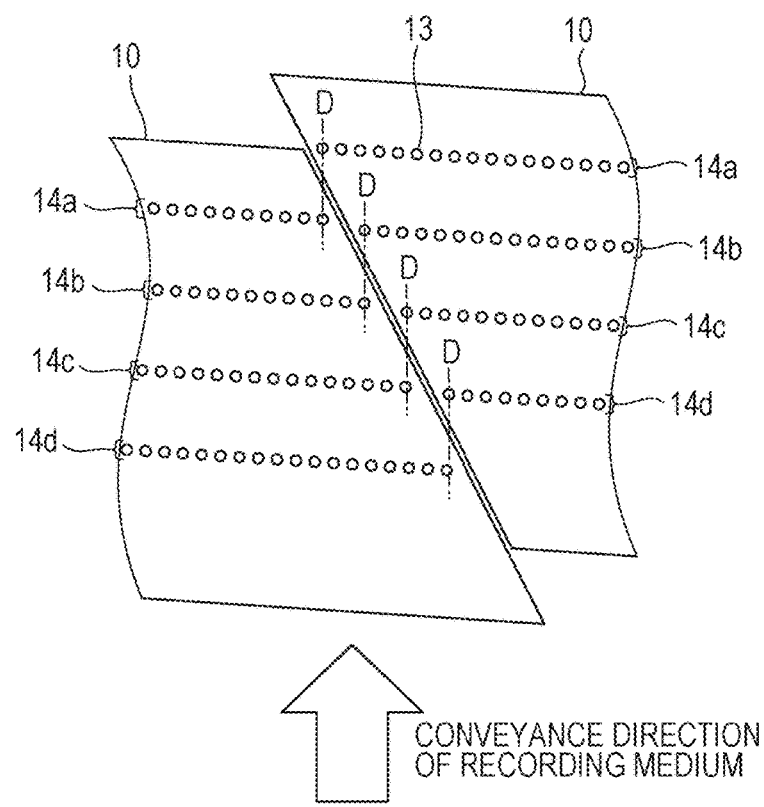
FIG. 12 is a plan view showing a partially enlarged illustration of adjacent portions of recording element boards according to the first application example.

FIG. 12 is a plan view illustrating a partial enlargement of adjacent portions of recording element boards 10 for two adjacent discharge modules. The recording element boards 10 according to the present application example are shaped as parallelograms, as illustrated in FIGS. 10A through 10C. The discharge orifice rows (14a through 14d) where discharge orifices 13 are arrayed on the recording element boards 10 are dispose inclined to the conveyance direction of the recording medium by a certain angle, as illustrated in FIG. 12. At least one discharge orifice of discharge orifice rows at adjacent portions of the recording element board 10 is made to overlap in the conveyance direction of the recording medium thereby. In FIG. 12, two discharge orifices on the lines D are in a mutually overlapping relationship. This layout enables black streaks and blank portions in the recorded image to be made less conspicuous by driving control of the overlapping discharge orifices, even in a case where the positions of the recording element board 10 are somewhat deviated from the predetermined position. The configuration illustrated in FIG. 12 can be used even in a case where the multiple recording element boards 10 are laid out in a straight line (inline) instead of in a staggered arrangement. Thus, black streaks and blank portions at overlapping portions between the recording element boards 10 can be handled while suppressing increased length of the liquid discharge head 3 in the conveyance direction of the recording medium. Although the shape of the primary face of the recording element board 10 according to the present discharge orifice row is a parallelogram, this is not restrictive. The configuration of the present disclosure can be suitably applied even in cases where the shape is a rectangle, a trapezoid, or another shape.

Description of Modification of Liquid Discharge Head Configuration

Figure 32:
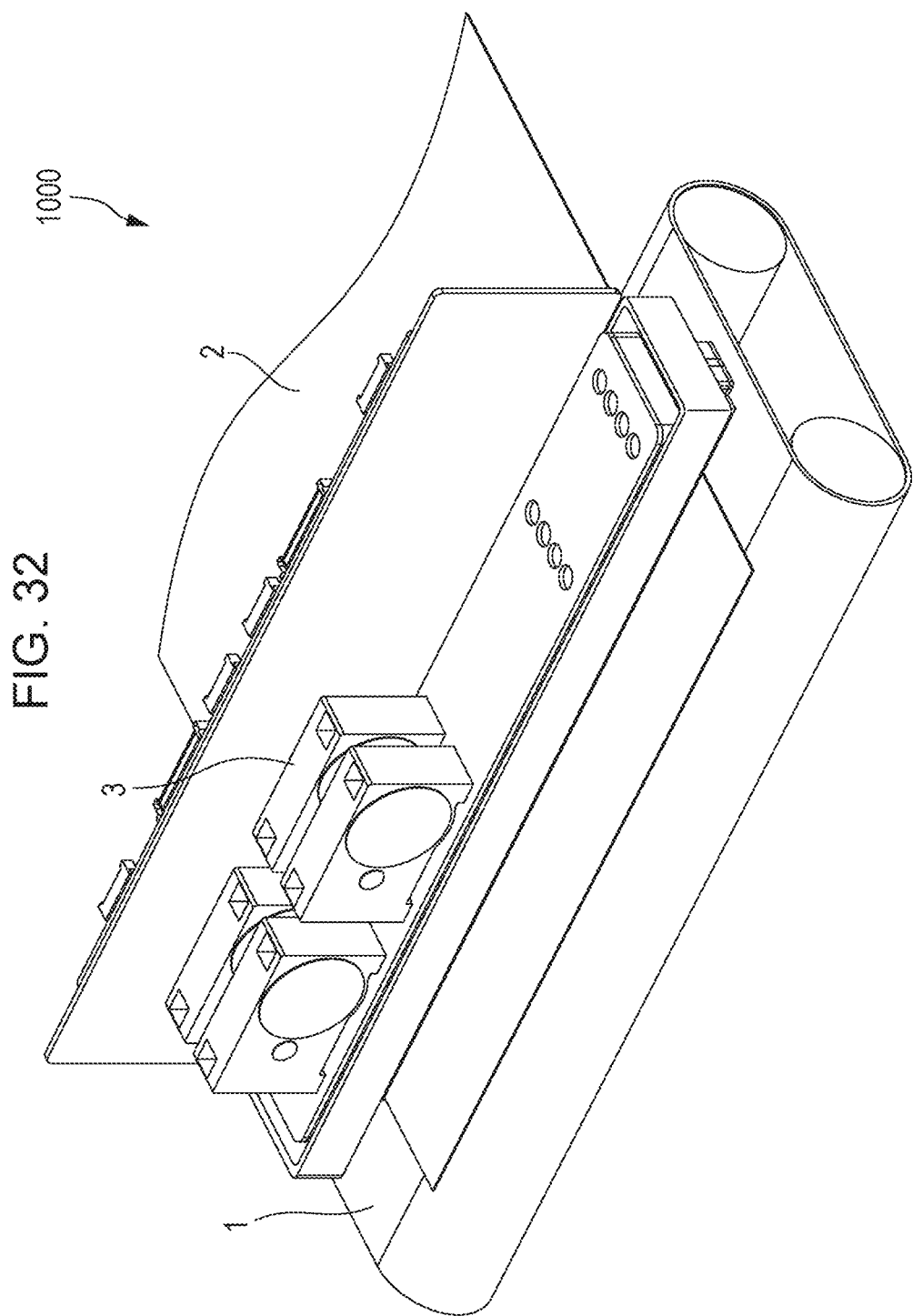
FIG. 32 is a perspective diagram of an inkjet recording apparatus according to the first application example.
Figure 34A:
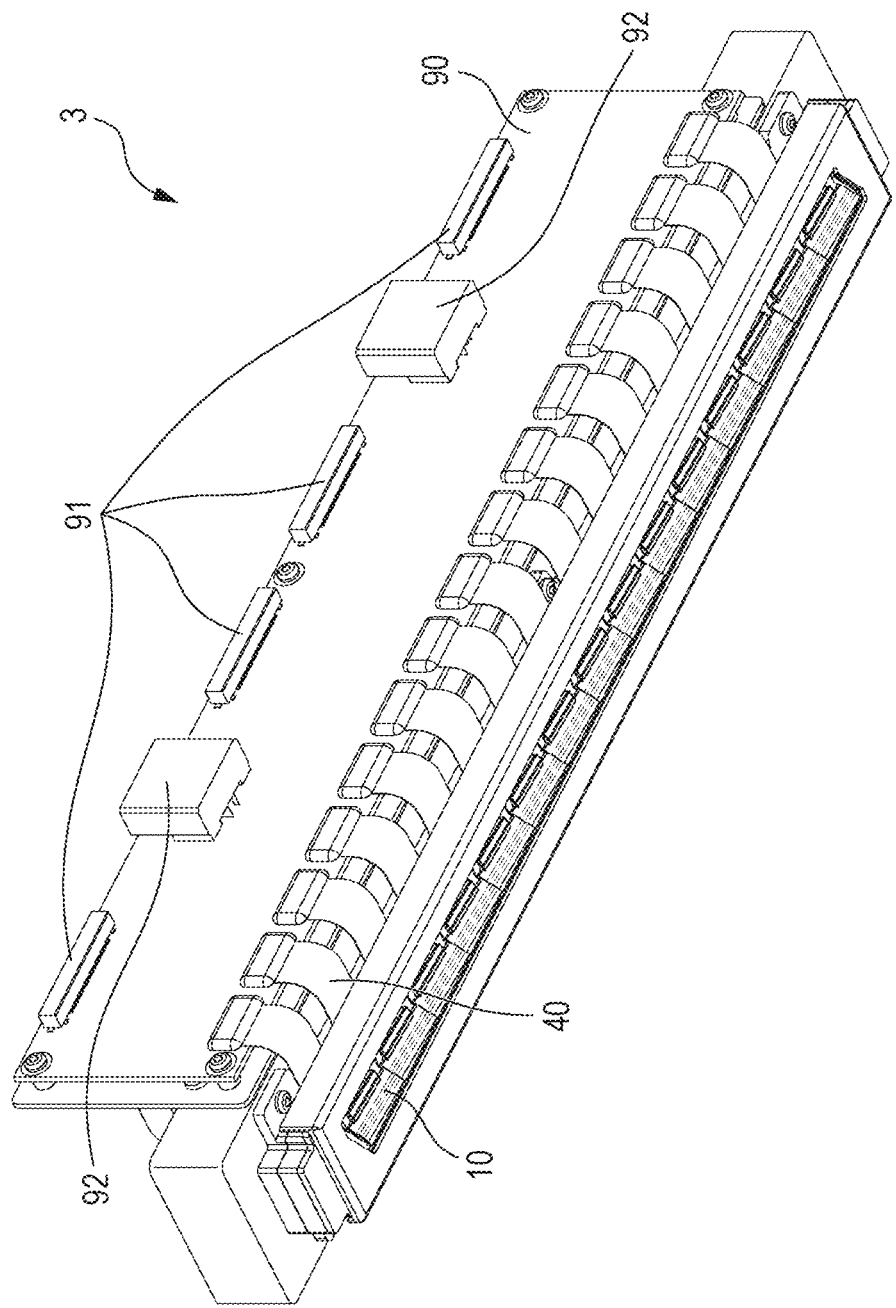
FIGS. 34A and 34B are diagrams illustrating the liquid discharge head according to the first application example.
Figure 34B:
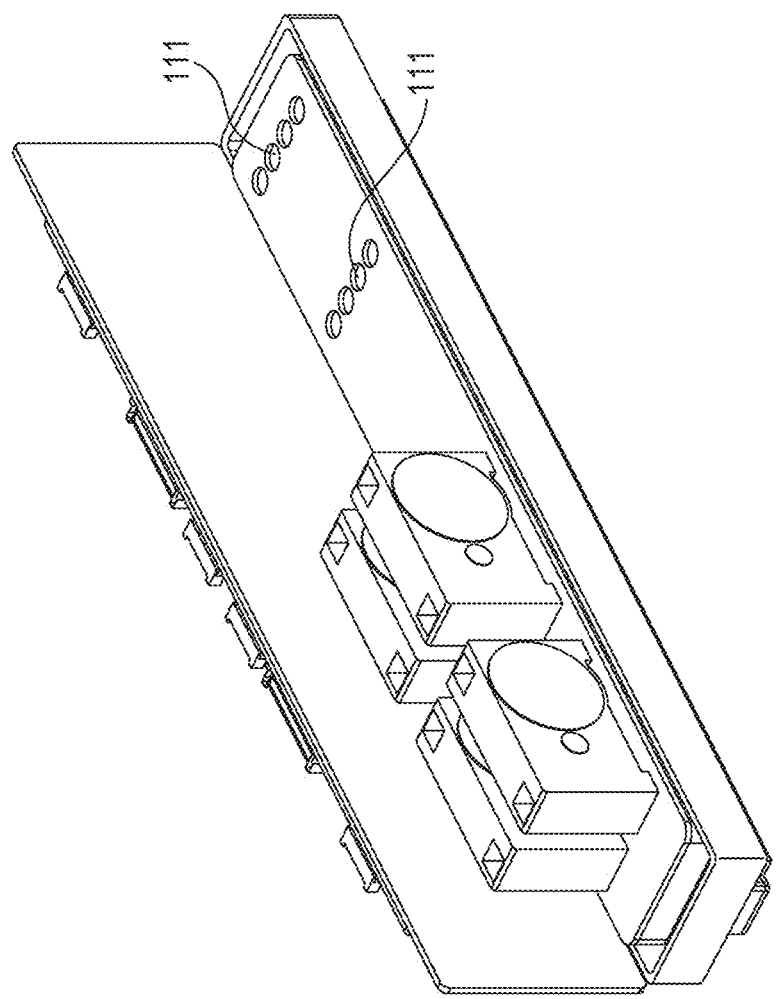
Figure 35:
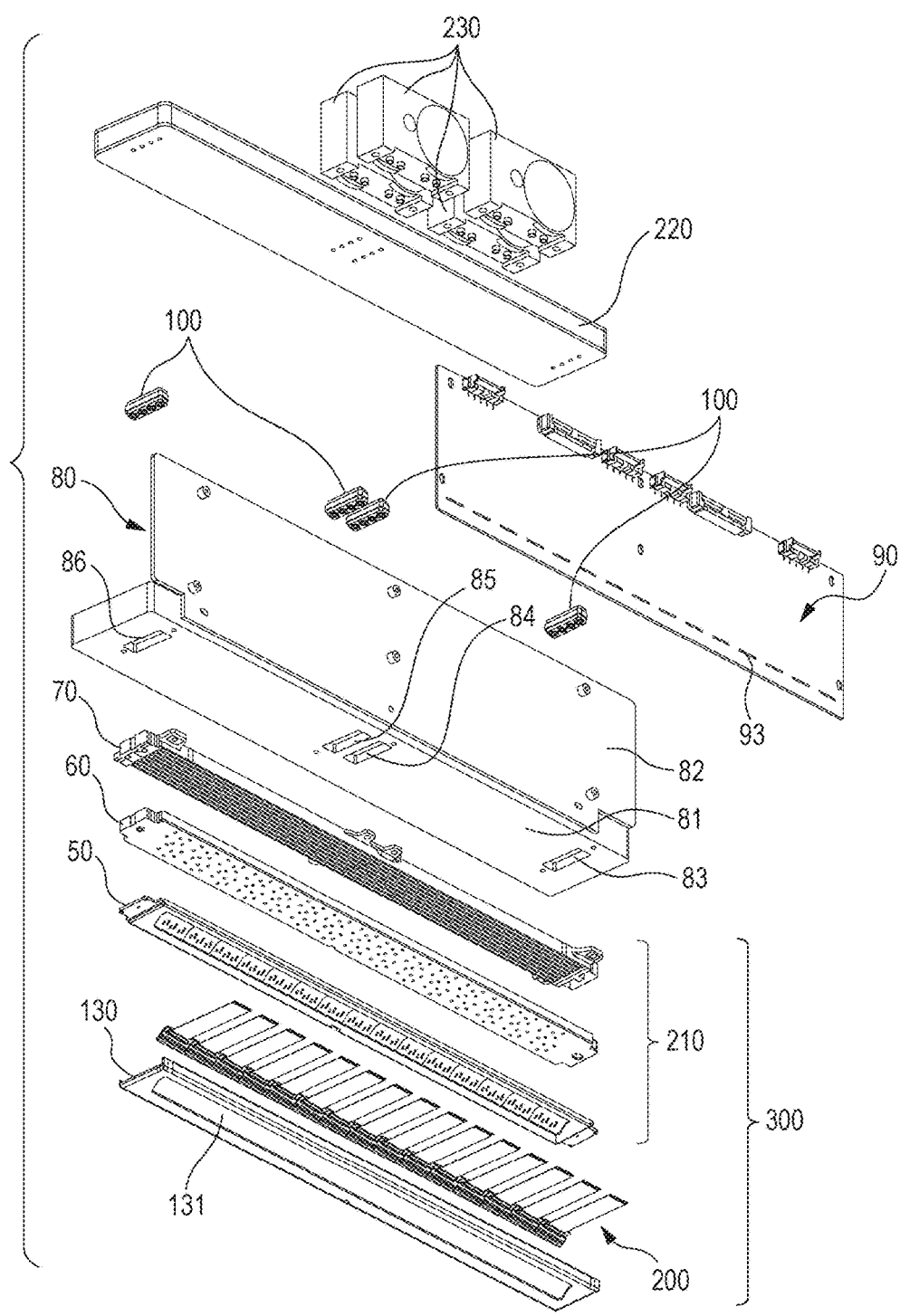
FIG. 35 is a disassembled perspective view of the liquid discharge head according to the first application example.

A modification of the above-described liquid discharge head configuration will be described with reference to FIGS. 32 and 34A through 36. Configurations and functions that are the same as the above-described example will be omitted from description, and points of difference will primarily be described. In this modification, the multiple liquid connection portions 111 that are connection portions between the outside of the liquid discharge head 3 and the liquid are disposed in a consolidated manner at one end side of the liquid discharge head 3 in the longitudinal direction, as illustrated in FIGS. 32, 34A, and 34B. Multiple negative pressure control units 230 are disposed in a consolidated manner at the other end side of the liquid discharge head 3 (FIG. 35). The liquid supply unit 220 included in the liquid discharge head 3 is configured as a long and slender unit corresponding to the length of the liquid discharge head 3, and has channels and filters 221 corresponding to the liquid of the four colors being supplied. The positions of the openings 83 through 86 provided on the liquid discharge unit support member 81 also are at different positions from the liquid discharge head 3 described above, as illustrated in FIG. 35.

Figure 36:
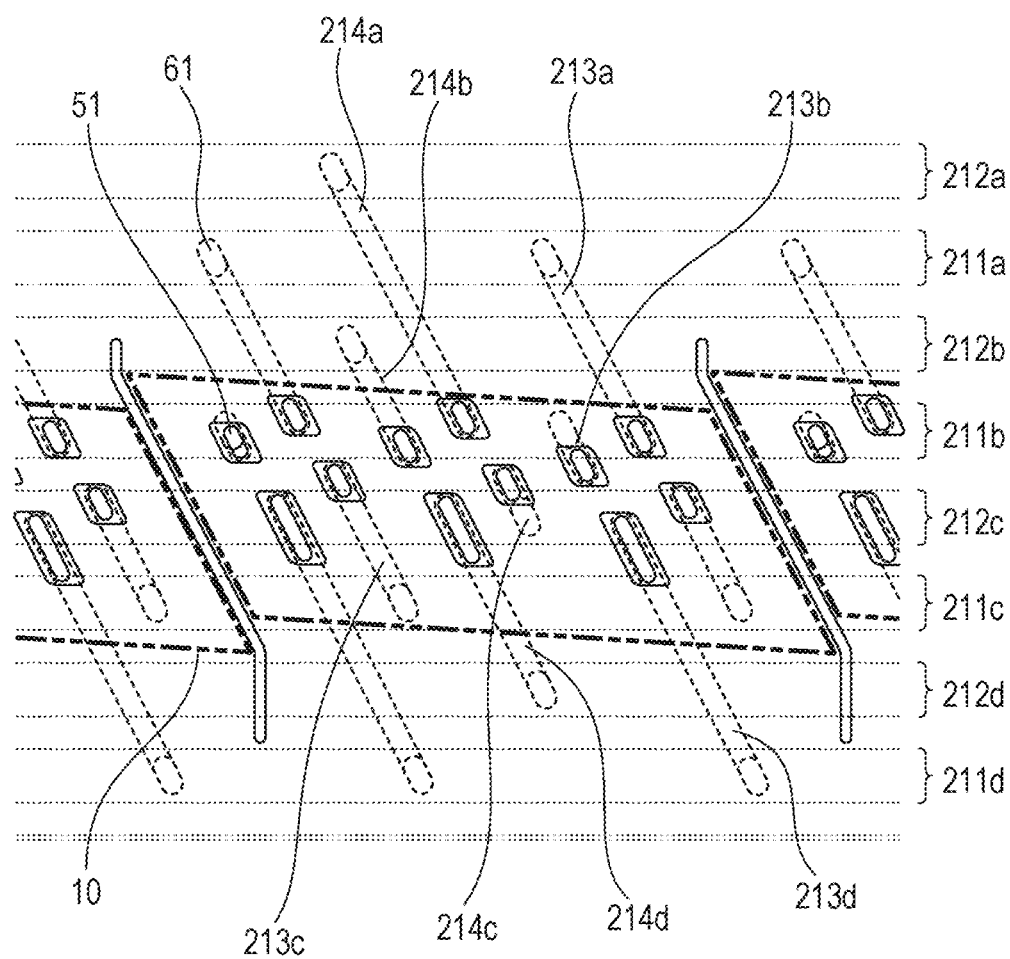
FIG. 36 is a schematic view of a channel member of the liquid discharge head according to the first application example.

FIG. 36 illustrates the laminated states of the channel members 50, 60, and 70. Multiple recording element boards 10 are arrayed in a straight line on the upper face of the first channel member 50 that is the highest layer of the multiple channel members 50, 60, and 70. There are two individual supply channels 213 and one individual recovery channel 214 for each liquid color, as channels communicating with the openings 21 (FIG. 19C) formed on the rear side of each recording element board 10. Corresponding to this, there also are two supply openings 21 and one recovery opening 21 for each liquid color, with regard to the openings 21 formed on the cover 20 provided to the rear face of the recording element boards 10. The common supply channels 211 and common recovery channels 212 extending in the longitudinal direction of the liquid discharge head 3 are arrayed alternatingly, as illustrated in FIG. 36.

Second Application Example

The configuration of an inkjet recording apparatus 1000 and liquid discharge head 3 according to a second application example will be described. Note that portions that differ from the first application example will primarily be described, and portions that are the same as the first application example will be omitted from description.

Description of Inkjet Recording Apparatus

Figure 19A:
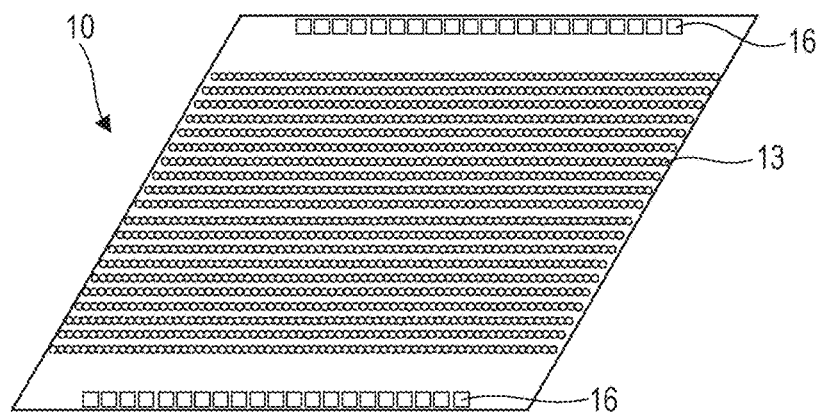
FIGS. 19A through 19C are plan views of the recording element board according to the second application example.
Figure 20:
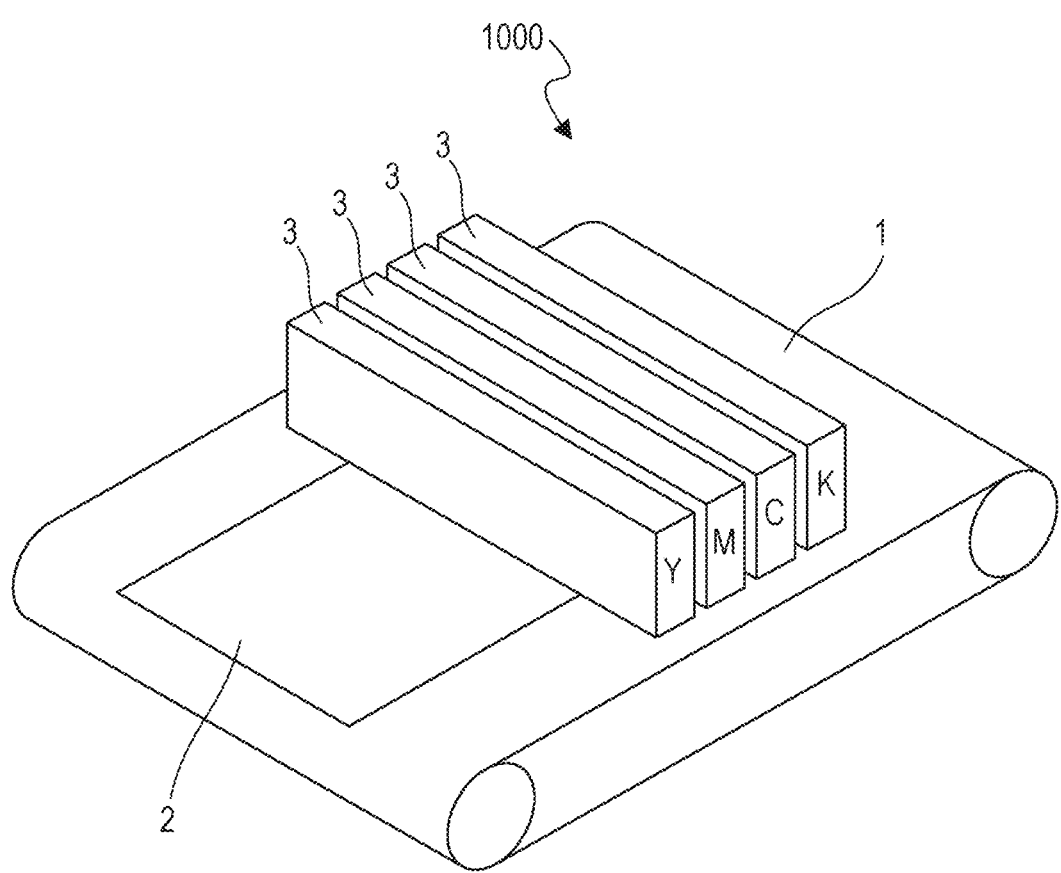
FIG. 20 is a perspective view of the inkjet recording apparatus according to the second application example.

FIG. 20 illustrates an inkjet recording apparatus according to the second application example. The recording apparatus 1000 according to the second application example differs from the first application example with regard to the point that full-color recording is performed on the recording medium by arraying four monochrome liquid discharge heads 3, each corresponding to one of CMYK ink. Although the number of discharge orifice rows usable per color in the first application example was one row, the number of discharge orifice rows usable per color in the second application example is 20 rows (FIG. 19A). This enables extremely high-speed recording to be performed, by allocating recording data to multiple discharge orifice rows. Even if there are discharge orifices that exhibit ink non-discharge, reliability is improved by a discharge orifice at a corresponding position in the conveyance direction of the recording medium in another row performing discharge in a complementary manner, and accordingly the arrangement is suitable for industrial printing. The supply system of the recording apparatus 1000, the buffer tank 1003, and the main tank 1006 (FIG. 2) are connected to the liquid discharge heads 3 by fluid connection, in the same way as in the first application example. Each liquid discharge head 3 is also electrically connected to an electric control unit that transmits electric power and discharge control signals to the liquid discharge head 3.

Description of Circulation Paths

The first and second circulation paths illustrated in FIGS. 2 and 3 can be used as the liquid circulation paths between the recording apparatus 1000 and the liquid discharge heads 3, in the same way as in the first application example.

Description of Structure of Liquid Discharge Head

Figure 13A:
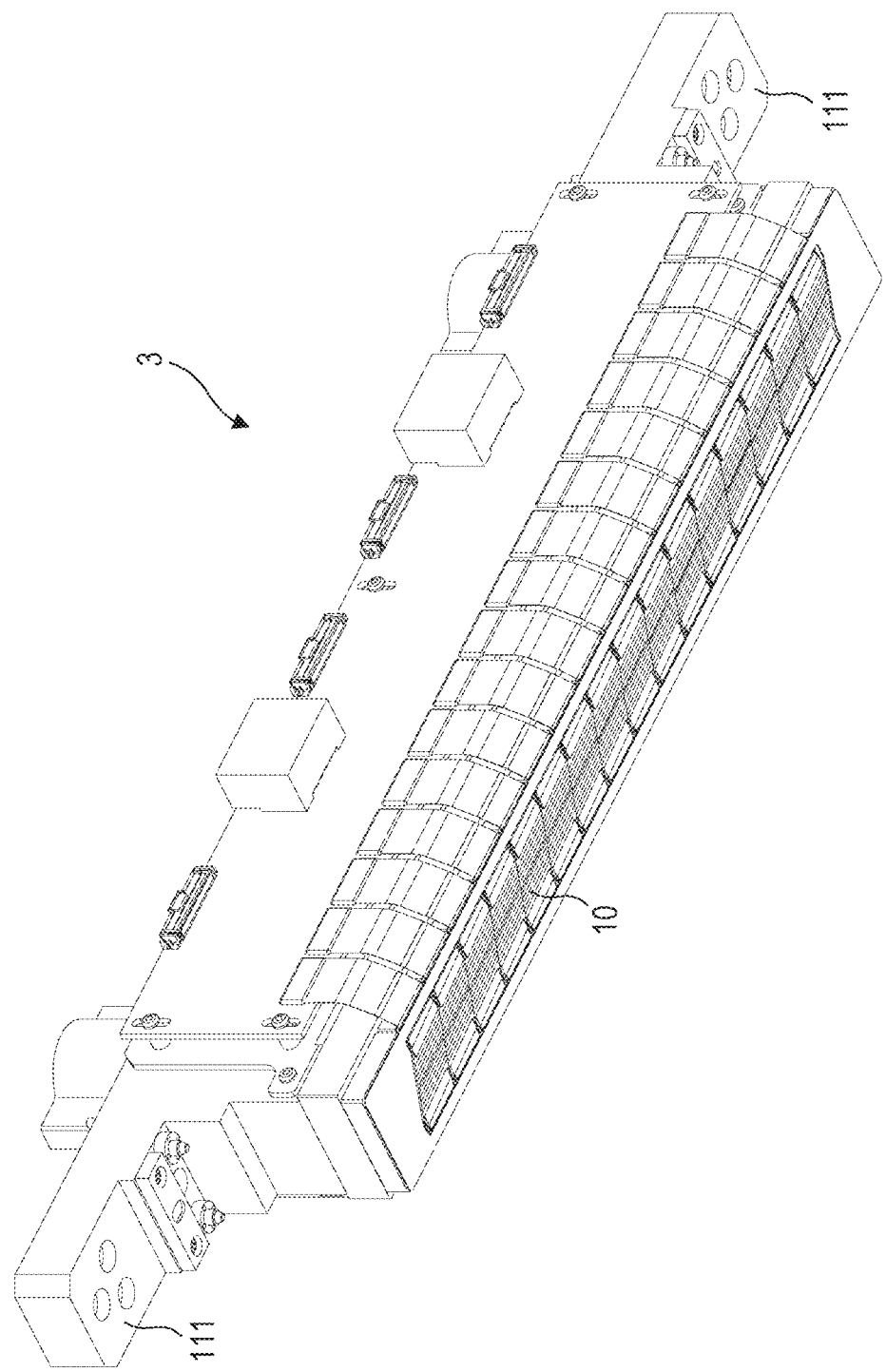
FIGS. 13A and 13B are perspective views of the liquid discharge head according to a second application example.
Figure 13B:
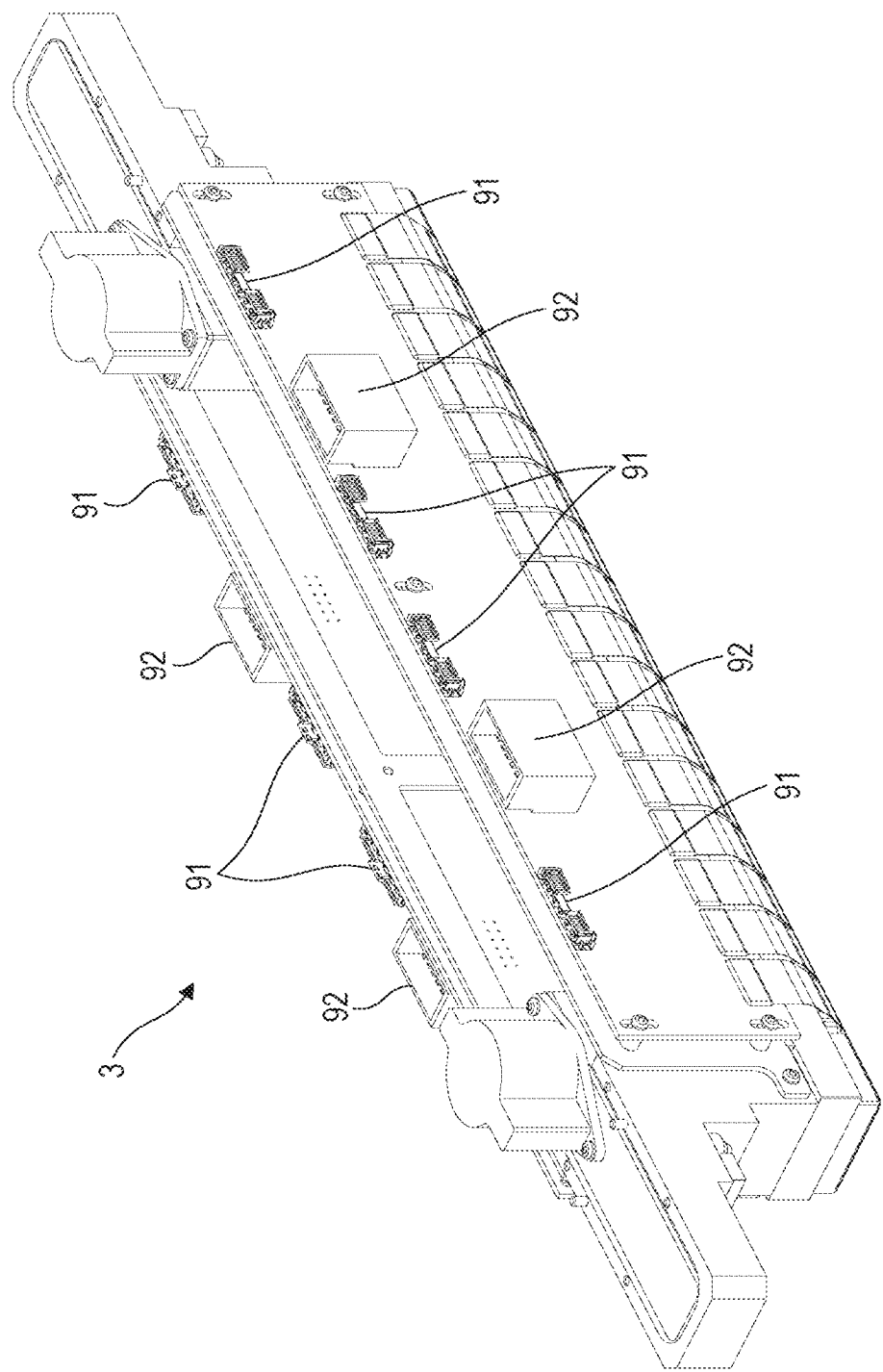

Description will be made regarding the structure of the liquid discharge head 3 according to the second application example. FIGS. 13A and 13B are perspective diagrams of the liquid discharge head 3 according to the present application example. The liquid discharge head 3 has 16 recording element boards 10 arrayed in a straight line in the longitudinal direction of the liquid discharge head 3, and is an inkjet line recording head that can record with liquid of one color. The liquid discharge head 3 has the liquid connection portions 111, input terminals 91, and power supply terminals 92 in the same way as the first application example. The liquid discharge head 3 according to the application example differs from the first application example in that the input terminals 91 and power supply terminals 92 are disposed on both sides of the liquid discharge head 3, since the number of discharge orifice rows is greater. This is to reduce voltage drop and signal transmission delay that occurs at wiring portions provided to the recording element boards 10.

Figure 14:
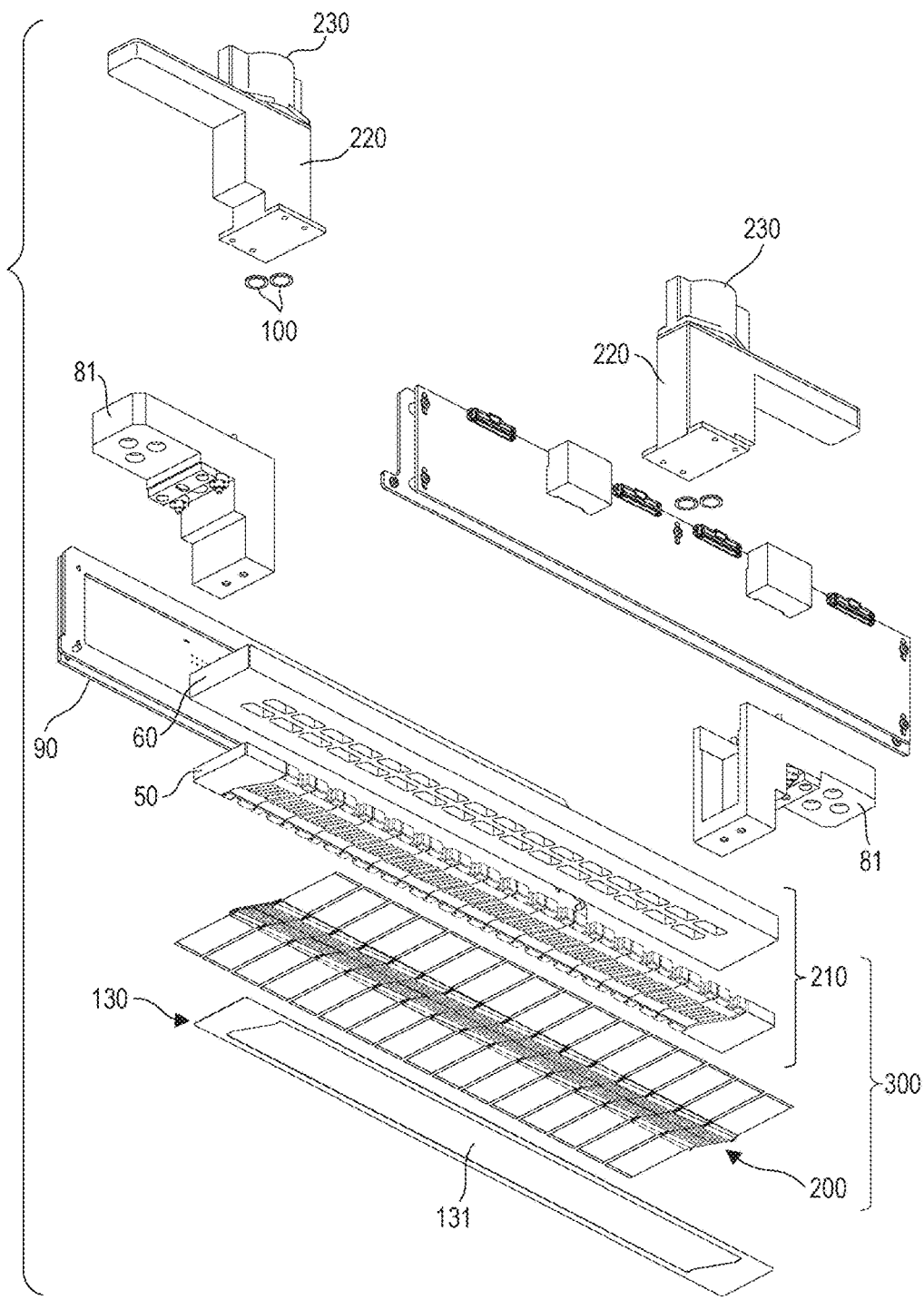
FIG. 14 is a disassembled perspective view of the liquid discharge head according to the second application example.

FIG. 14 is a disassembled perspective view of the liquid discharge head 3, illustrating each part or unit making up the liquid discharge head 3 disassembled according to function. The roles of the units and members, and the order of liquid flow through the liquid discharge head, are basically the same as in the first application example, but the function by which the rigidity of the liquid discharge head is guaranteed is different. The rigidity of the liquid discharge head was primarily guaranteed in the first application example by the liquid discharge unit support member 81, but the rigidity of the liquid discharge head is guaranteed in the second application example by the second channel member 60 included in the liquid discharge unit 300. There are liquid discharge unit support members 81 connected to both ends of the second channel member 60 in the present application example. This liquid discharge unit 300 is mechanically enjoined to a carriage of the recording apparatus 1000, whereby the liquid discharge head 3 is positioned. Liquid supply units 220 having negative pressure control units 230, and the electric wiring board 90, are joined to the liquid discharge unit support members 81. Filters (omitted from illustration) are built into the two liquid supply units 220. The two negative pressure control units 230 are set to control pressure by high and low negative pressure that relatively differ from each other. When the high-pressure side and low-pressure side negative pressure control units 230 are disposed on the ends of the liquid discharge head 3 as illustrated in FIGS. 14A through 15, the flow of liquid on the common supply channel 211 and the common recovery channel 212 that extend in the longitudinal direction of the liquid discharge head 3 are mutually opposite. This promotes heat exchange between the common supply channel 211 and common recovery channel 212, so that the temperature difference between the two common channels can be reduced. This is advantageous in that temperature difference does not readily occur among the multiple recording element boards 10 disposed along the common channels, and accordingly unevenness in recording due to temperature difference does not readily occur.

The channel member 210 of the liquid discharge unit 300 will be described in detail next. The channel member 210 is the first channel member 50 and second channel member 60 that have been laminated as illustrated in FIG. 14, and distributes liquid supplied from the liquid supply unit 220 to the discharge modules 200. The channel member 210 also serves as a channel member for returning liquid recirculating from the discharge modules 200 to the liquid supply unit 220. The second channel member 60 of the channel member 210 is a channel member in which the common supply channel 211 and common recovery channel 212 have been formed, and also primary undertakes the rigidity of the liquid discharge head 3. Accordingly, the material of the second channel member 60 preferably is sufficiently corrosion-resistant as to the liquid and has high mechanical strength. Examples of suitably-used materials include stainless steel, titanium (Ti), alumina, or the like.

Figure 15A:
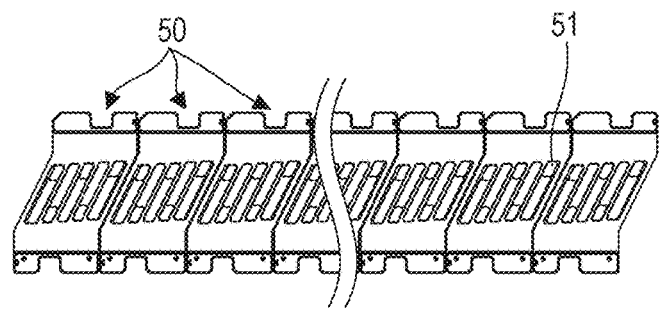
FIGS. 15A through 15E are plan views of first and second channel members making up the channel member according to the second application example.
Figure 15B:
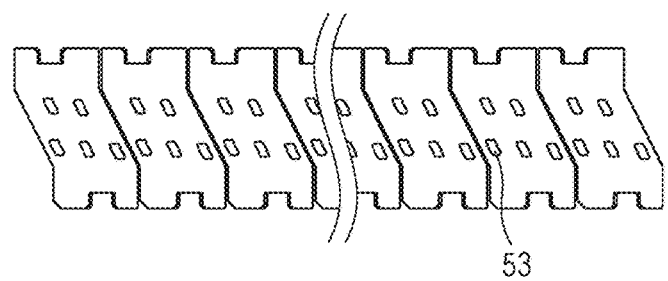
Figure 15C:
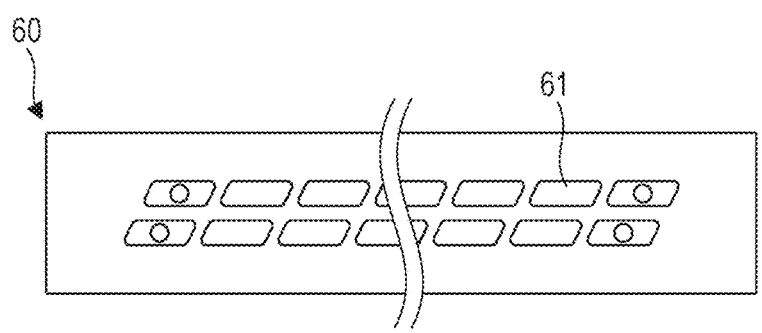
Figure 15D:
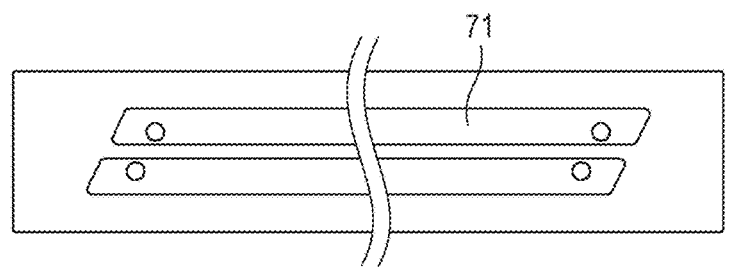
Figure 15E:
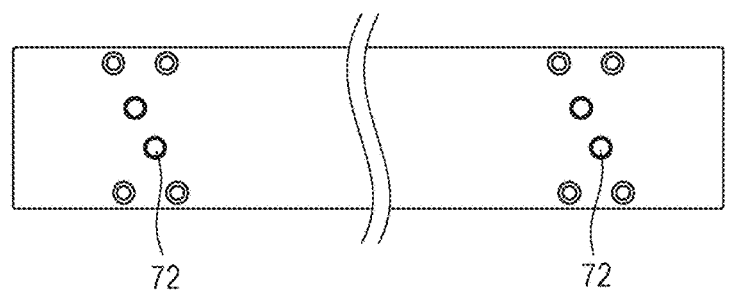

FIG. 15A illustrates the face of the first channel member 50 on the side where the discharge modules 200 are mounted, and FIG. 15B is a diagram illustrating the reverse face therefrom, that comes into contact with the second channel member 60. Unlike the case in the first application example, the first channel member 50 according to the second application example is an arrangement where multiple members corresponding to the discharge modules 200 are arrayed adjacently. Using this divided structure enables a length corresponding to the length of the liquid discharge head to be realized, and accordingly can particularly be suitably used in relatively long-scale liquid discharge heads corresponding to sheets of B2 size and even larger, for example. The communication ports 51 of the first channel member 50 communicate with the discharge modules 200 by fluid connection as illustrated in FIG. 15A, and individual communication ports 53 of the first channel member 50 communicate with the communication ports 61 of the second channel member 60 by fluid connection, as illustrated in FIG. 15B. FIG. 15C illustrates the face of the second channel member 60 that comes in contact with the first channel member 50, FIG. 15D illustrates a cross-section of the middle portion of the second channel member 60 taken in the thickness direction, and FIG. 15E is a diagram illustrating the face of the second channel member 60 that comes into contact with the liquid supply unit 220. The functions of the channels and communication ports of the second channel member 60 are the same as with one color worth in the first application example. One of the common channel grooves 71 of the second channel member 60 is the common supply channel 211 illustrated in FIG. 16, and the other is the common recovery channel 212. Both have liquid supplied from one end side toward the other end side following the longitudinal direction of the liquid discharge head 3. Unlike the case in the first application example, the longitudinal directions of liquid for the common supply channel 211 and common recovery channel 212 are mutually opposite directions.

Figure 16:
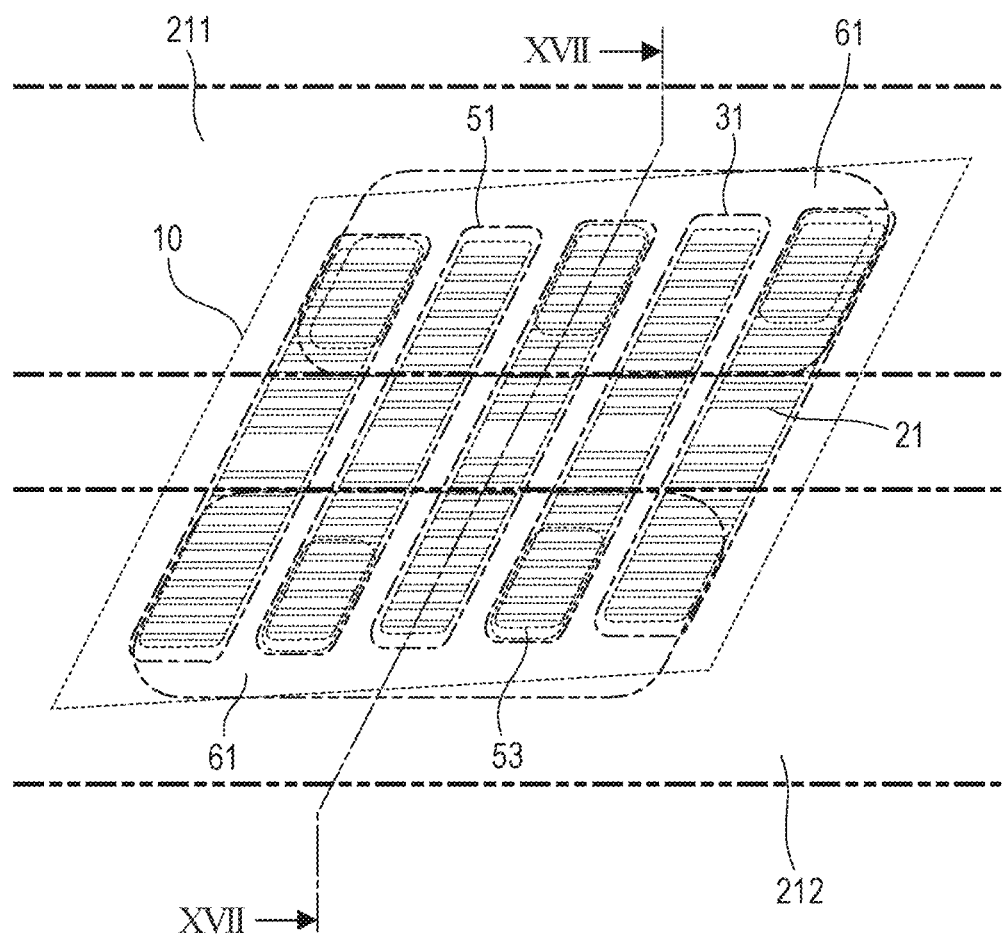
FIG. 16 is an enlarged transparent view of part of the channel member according to the second application example.

FIG. 16 is a transparent view illustrating the connection relationship regarding liquid between the recording element boards 10 and the channel member 210. The set of the common supply channel 211 and common recovery channel 212 extending in the longitudinal direction of the liquid discharge head 3 is provided within the channel member 210, as illustrated in FIG. 16. The communication ports 61 of the second channel member 60 are each positioned with and connected to the individual communication ports 53 of the first channel member 50, thereby forming a liquid supply path from the communication ports 72 of the second channel member 60 to the communication ports 51 of the first channel member 50 via the common supply channel 211. In the same way, a liquid supply path from the communication ports 72 of the second channel member 60 to the communication ports 51 of the first channel member 50 via the common recovery channel 212 is also formed.

FIG. 17 is a diagram illustrating a cross-section taken along XVII-XVII in FIG. 16. FIG. 17 shows how the common supply channel 211 connects to the discharge module 200 through the communication port 61, individual communication port 53, and communication port 51. Although omitted from illustration in FIG. 17, it can be clearly seen from FIG. 16 that another cross-section would show an individual recovery channel 214 connected to the discharge module 200 through a similar path. Channels are formed on the discharge modules 200 and recording element boards 10 to communicate with the discharge orifices 13, and part or all of the supplied liquid recirculates through the discharge orifices 13 (pressure chambers 23) that are not performing discharging operations, in the same way as in the first application example. The common supply channel 211 is connected to the negative pressure control unit 230 (high-pressure side), and the common recovery channel 212 to the negative pressure control unit 230 (low-pressure side), via the liquid supply unit 220, in the same way as in the first application example. Accordingly, a flow is generated by the differential pressure thereof, that flows from the common supply channel 211 through the discharge orifices 13 (pressure chambers 23) of the recording element board 10 to the common recovery channel 212.

Description of Discharge Module

Figure 18A:
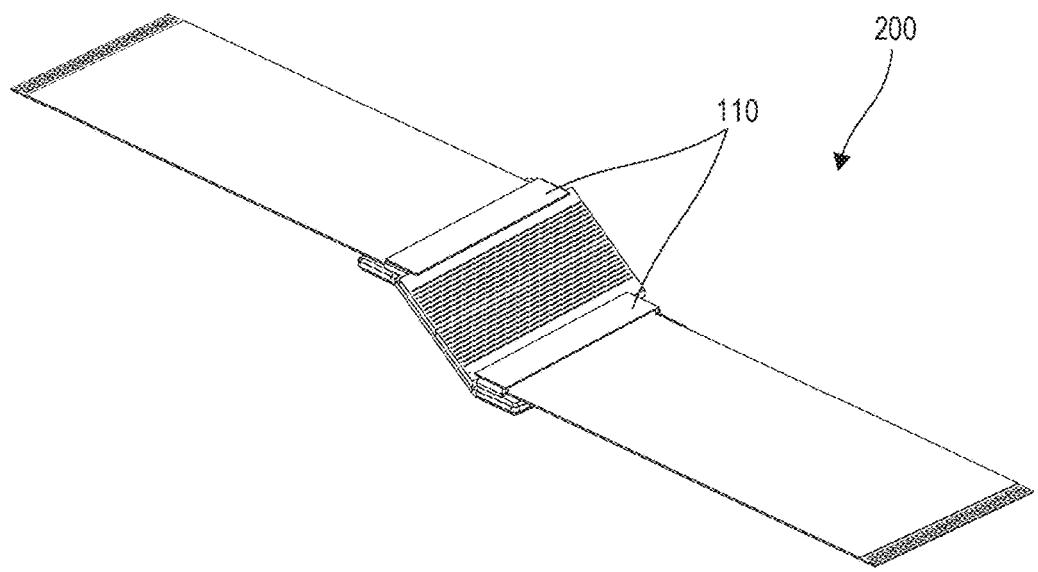
FIGS. 18A and 18B are diagrams illustrating a discharge module according to the second application example, FIG. 18A being a perspective view and FIG. 18B a disassembled view.
Figure 18B:
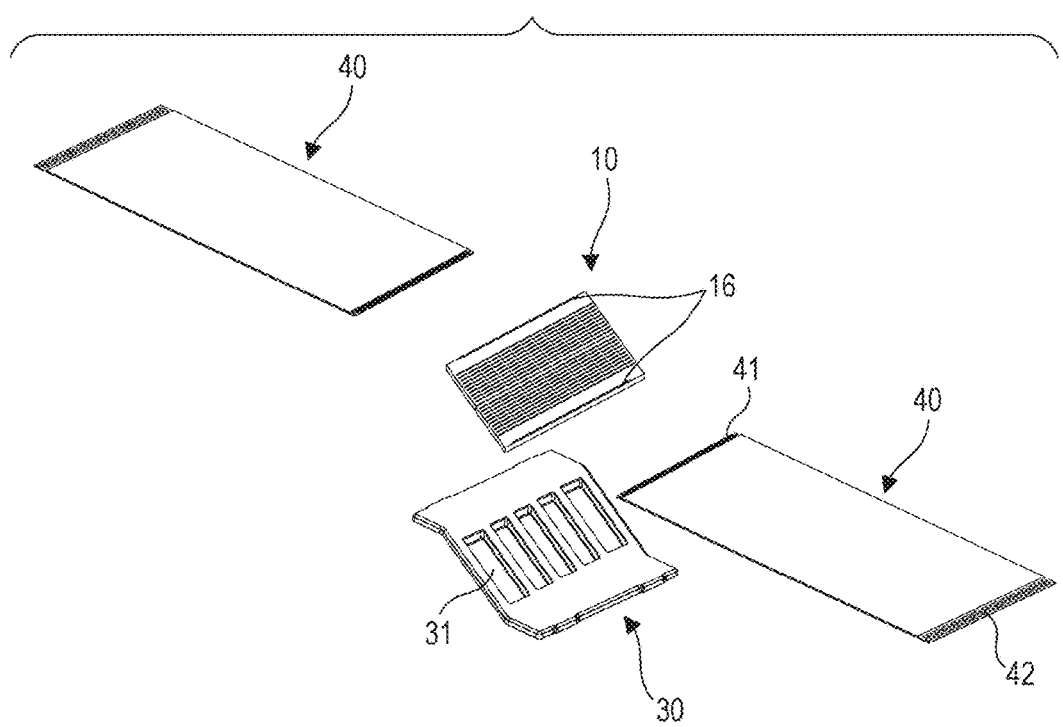

FIG. 18A is a perspective view of one discharge module 200, and FIG. 18B is a disassembled view thereof. The difference as to the first application example is the following point, that is to say that multiple terminals 16 are disposed arrayed on both sides (the long side portions of the recording element board 10) following the direction of the multiple discharge orifice rows of the recording element board 10, and that two flexible printed circuit boards 40 are provided to one recording element board 10 and are electrically connected thereto. The reason is that the number of discharge orifice rows provided on the recording element board 10 is 20 rows, which is a great increase over the eight rows in the first application example. The object thereof is to keep the maximum distance from the terminals 16 to the recording elements 15 provided corresponding to the discharge orifice row short, hereby reducing voltage drop and signal transmission delay that occurs at wiring portions provided to the recording element board 10. Liquid communication ports 31 of the support member 30 are provided to the recording element board 10, and are opened so as to span all discharge orifice rows. Other points are the same as in the first application example.

Description of Structure of Recording Element Board

Figure 19B:
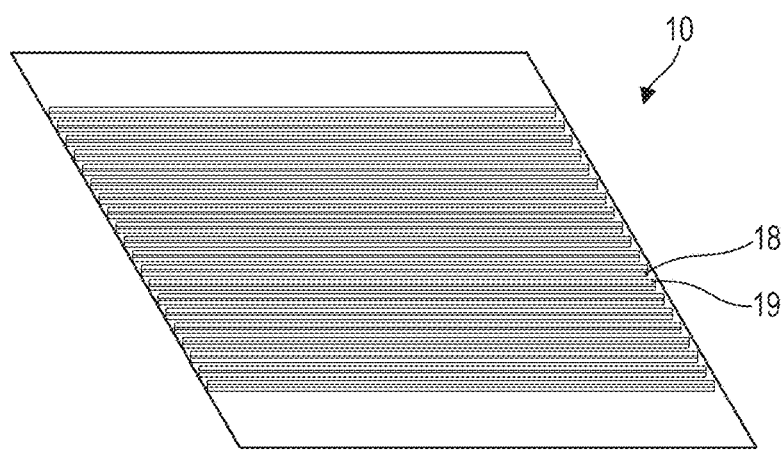
Figure 19C:
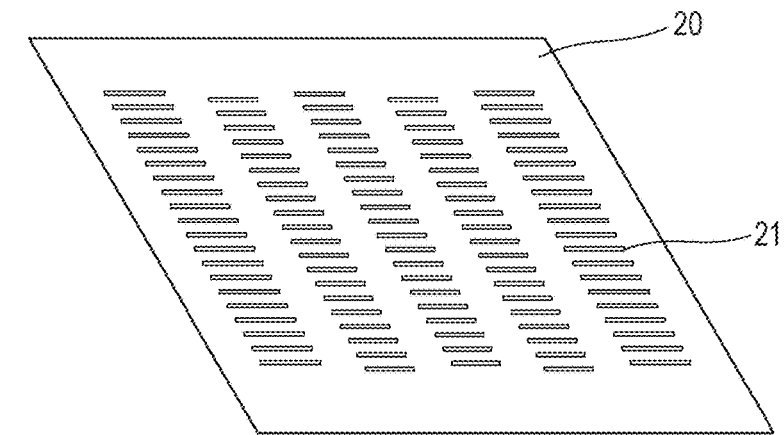

FIG. 19A is a schematic diagram illustrating the face of the recording element board 10 on the side where the discharge orifices 13 are disposed, and FIG. 19C is a schematic diagram illustrating the reverse face of that illustrated in FIG. 19A. FIG. 19B is a schematic diagram illustrating the face of the recording element board 10 in a case where the cover 20 provided on the rear face side of the recording element board 10 is removed in FIG. 19C. Liquid supply channels 18 and liquid recovery channels 19 are alternately provided on the rear face of the recording element board 10 following the discharge orifice row direction, as illustrated in FIG. 19B. Despite the number of discharge orifice rows being much greater than that in the first application example, a substantial difference from the first application example is that the terminals 16 are disposed on both side portions of the recording element board 10 following the discharge orifice row direction, as described above. The basic configuration is the same as that in the first application example, such as one set of a liquid supply channel 18 and liquid recovery channel 19 being provided for each discharge orifice row, openings 21 that communicate with the liquid communication ports 31 of the support member 30 being provided to the cover 20, and so forth.

Third Application Example

The configuration of an inkjet recording apparatus 1000 and liquid discharge head 3 according to a third application example will be described. The liquid discharge head 3 according to the third application example is a page-wide head that records a B2 size recording medium sheet with a single scan. The third application example is similar to the second application example with regard to many points, so points of difference as to the second application example will primarily be described below, and portions that are the same as the second application example will be omitted from description.

Description of Inkjet Recording Apparatus

Figure 37:
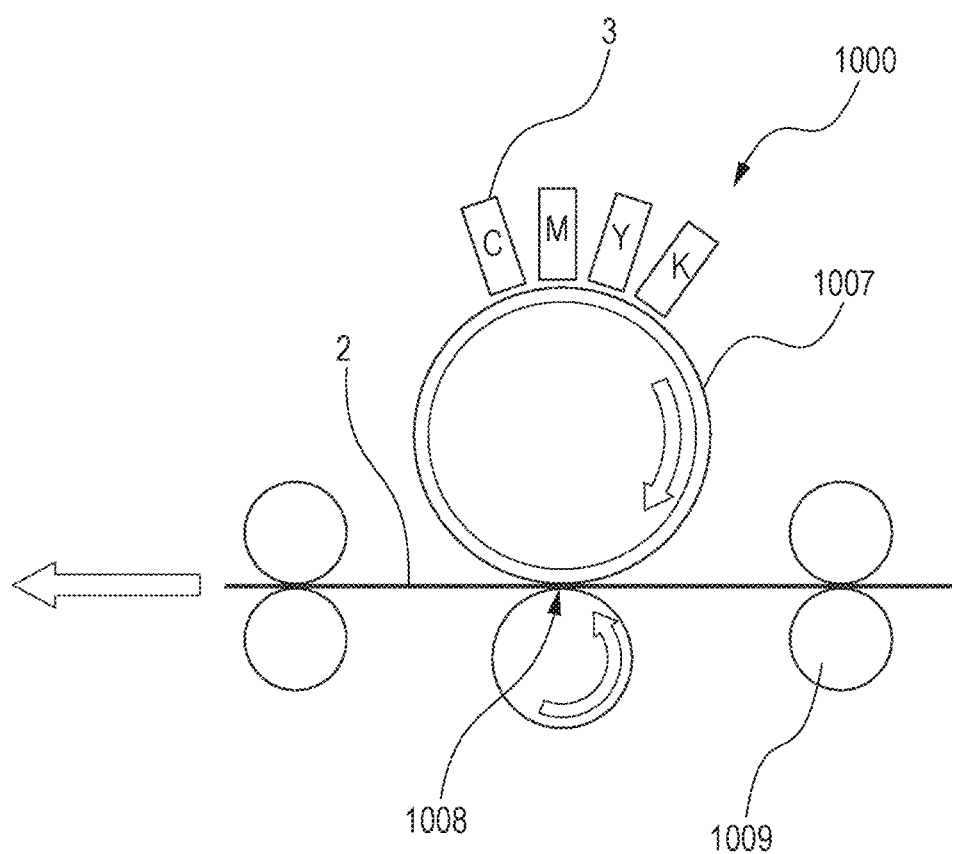
FIG. 37 is a diagram illustrating a recording apparatus according to a third application example.

FIG. 37 is a schematic diagram of an inkjet recording apparatus according to the present application example. The recording apparatus 1000 is of a configuration that does not directly record on the recording medium from the liquid discharge head 3, but rather discharges liquid on an intermediate transfer member (intermediate transfer drum 1007) and forms an image, following which the image is transferred onto the recording medium 2. The recording apparatus 1000 has four monochrome liquid discharge heads 3 corresponding to the four types of ink of CMYK, disposed in an arc following the intermediate transfer drum 1007. Thus, full-color recording is performed on the intermediate transfer member, the recorded image is dried to a suitable state on the intermediate transfer member, and then transferred by a transfer unit 1008 onto the recording medium 2 conveyed by a sheet conveyance roller 1009. Whereas the sheet conveyance system in the second application example was horizontal conveyance with the intent of primarily conveying cut sheets, the present application example is capable of handling continuous sheets supplied from a main roll (omitted from illustration). This sort of drum conveyance system can easily convey sheets with a certain tension applied, so there is less conveyance jamming when performing high-speed recording. Thus, the reliability of the apparatus improves, and is suitable for application to business printing and the like. The supply system of the recording apparatus 1000, the buffer tank 1003, and the main tank 1006 are connected to the liquid discharge heads 3 by fluid connection, in the same way as in the first and second application examples. Each liquid discharge head 3 is also electrically connected to an electric control unit that transmits electric power and discharge control signals to the liquid discharge head 3.

Description of Fourth Circulation Path

Figure 38:
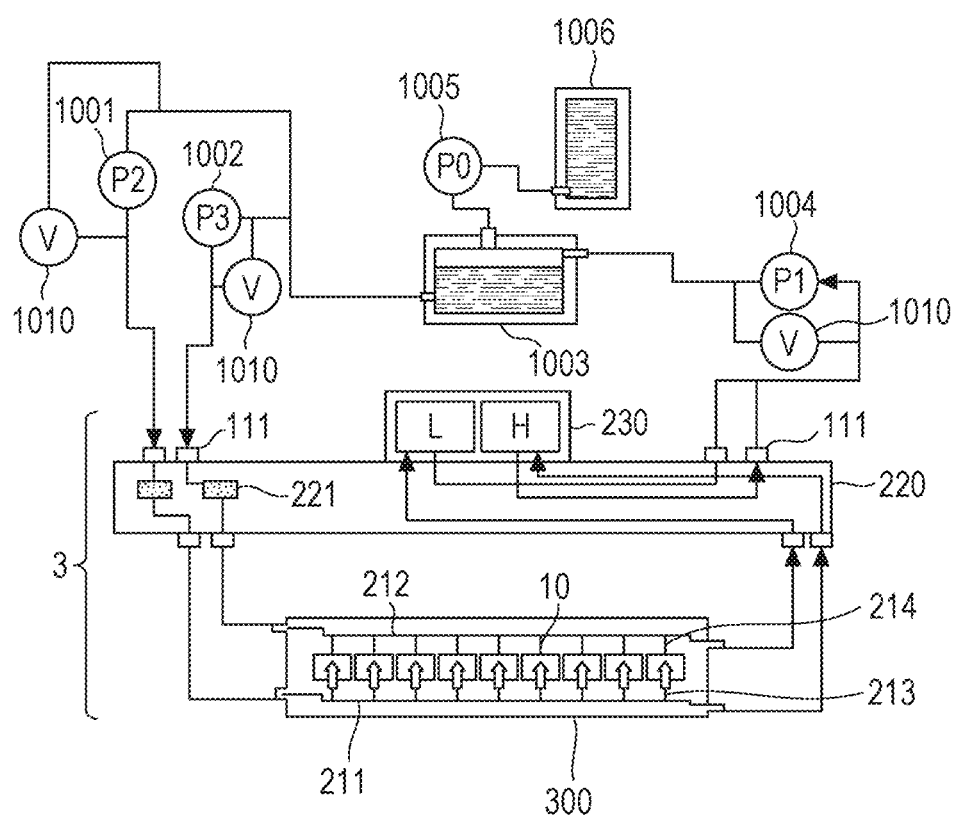
FIG. 38 is a diagram illustrating a fourth circulation path.

Although the first and second circulation paths illustrated in FIGS. 2 and 3 between the tanks of the recording apparatus 1000 and the liquid discharge head 3 are applicable as liquid circulation paths in the same way as in the second application example, a circulation path illustrated in FIG. 38 is suitable. A primary difference as to the second circulation path in FIG. 3 is that bypass valves 1010 are added that communicate with channels of each of the first circulation pumps 1001 and 1002 and the second circulation pump 1004. The bypass valves 1010 function to lower pressure at the upstream side of the bypass valve 1010 (first function), due to the valve opening when pressure exceeds a preset pressure. The bypass valves 1010 also function to open and close valves at a predetermined timing by signals from a control board at the recording apparatus main unit (second function).

According to the first function, excessively large or excessively small pressure can be kept from being applied to the channel at the downstream side of the first circulation pumps 1001 and 1002 and the upstream side of the second circulation pump 1004. For example, in a case where the functions of the first circulation pumps 1001 and 1002 malfunction, excessive flow rate or pressure may be applied to the liquid discharge head 3. This may cause liquid to leak from the discharge orifices 13 of the liquid discharge head 3, or joined portions within the liquid discharge head 3 to be damaged. However, in a case where bypass vales are added to the first circulation pumps 1001 and 1002 as in the present application example, opening the bypass valves 1010 releases the liquid path to the upstream side of the circulation pumps, so trouble such as that described above can be suppressed, even if excessive pressure occurs.

Also, due to the second function, when stopping circulation operations, all bypass valves 1010 are quickly opened after the first circulation pumps 1001 and 1002 and second circulation pump 1004 stop, based on control signals from the main unit side. This allows the high negative pressure (e.g., several kPa to several tens of kPa) at the downstream portion of the liquid discharge head 3 (between the negative pressure control unit 230 and the second circulation pump 1004) to be released in a short time. In a case of using a positive-displacement pump such as a diaphragm pump as the circulation pump, a check valve usually is built into the pump. However, opening the bypass valves 1010 enables pressure release at the downstream side of the liquid discharge head 3 to be performed from the downstream buffer tank 1003 side as well. Although pressure release of the downstream side of the liquid discharge head 3 can be performed just from the upstream side as well, there is pressure drop in the channels at the upstream side of the liquid discharge head 3 and the channels within the liquid discharge head 3. Accordingly, there is the concern that pressure discharge may take time, the pressure within the common channel within the liquid discharge head 3 may temporarily drop too far, and the meniscus at the discharge orifices may be destroyed. Opening the bypass valves 1010 at the downstream side of the liquid discharge head 3 promotes pressure discharge at the downstream side of the liquid discharge head 3, so the risk of destruction of the meniscus at the discharge orifices is reduced.

Description of Structure of Liquid Discharge Head

Figure 39A:
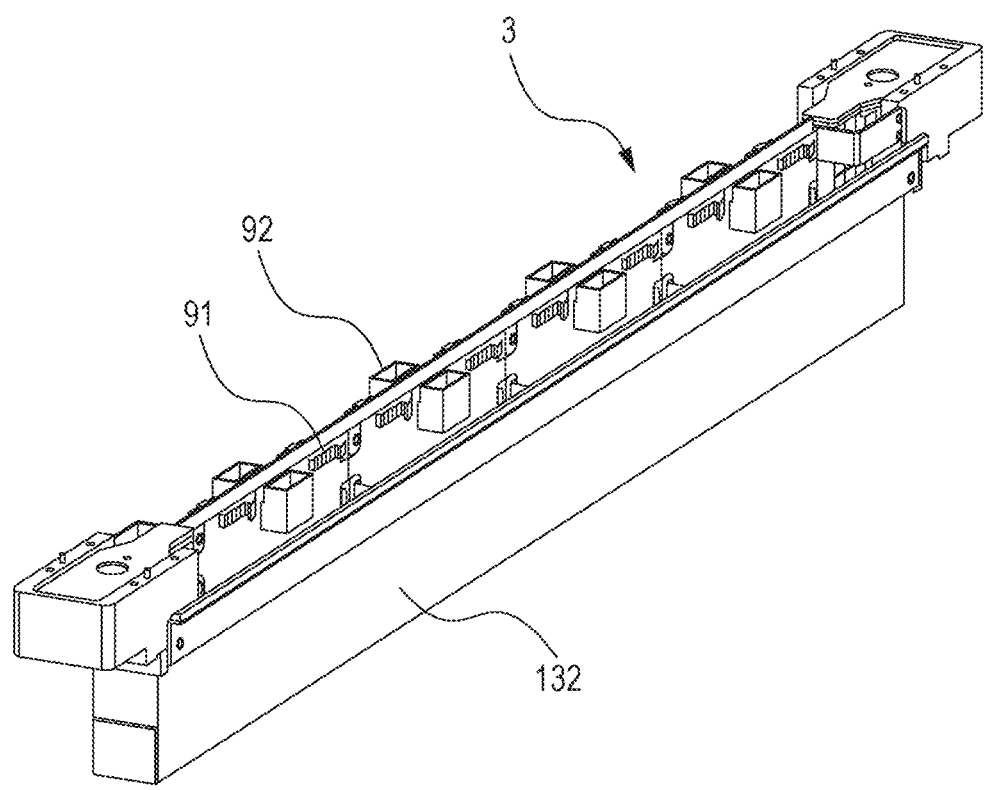
FIGS. 39A and 39B are diagram illustrating the liquid discharge head according to the third application example.
Figure 39B:
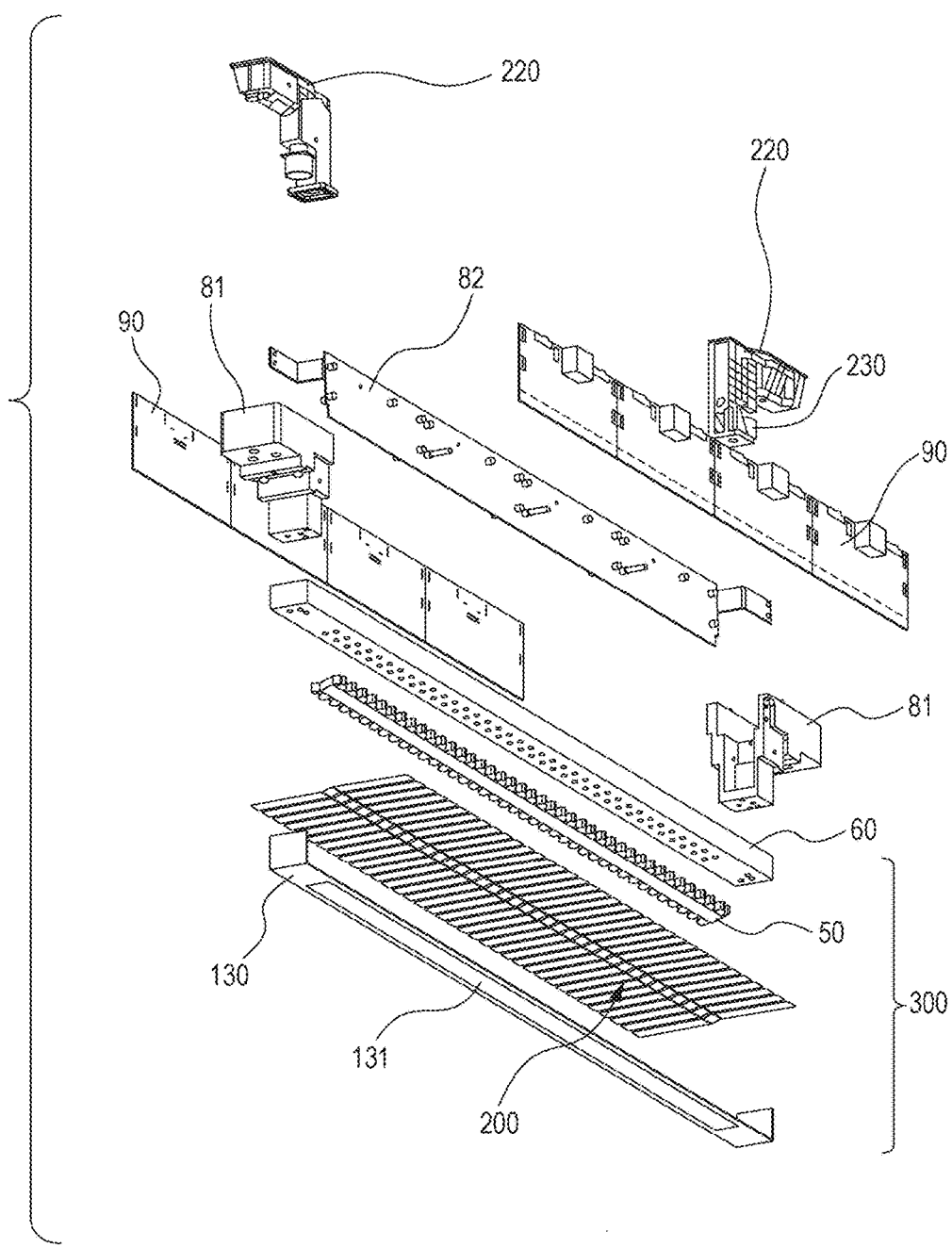

The structure of the liquid discharge head 3 according to the third application example will be described. FIG. 39A is a perspective view of the liquid discharge head 3 according to the present application example, and FIG. 39B is a disassembled perspective view thereof. The liquid discharge head 3 has 36 recording element boards 10 arrayed in a straight line (inline) in the longitudinal direction of the liquid discharge head 3, and is a line type (page-wide) inkjet recording head that records using a single-color liquid. The liquid discharge head 3 has the signal input terminals 91 and power supply terminals 92 in the same way as in the second application example, and also is provided with a shield plate 132 to protect the longitudinal side face of the head.

FIG. 39B is a disassembled perspective view of the liquid discharge head 3, illustrating each part or unit making up the liquid discharge head 3 disassembled according to function (the shield plate 132 is omitted from illustration). The roles of the units and members, and the order of liquid flow through the liquid discharge head 3, are basically the same as in the second application example. The third application example differs from the second application example primarily with regard to the points of the electric wiring board 90 being divided into a plurality and disposed, the position of the negative pressure control units 230, and the shape of the first channel member 50. In the case of a liquid discharge head 3 having a length corresponding to a B2 size recording medium for example, as in the case of the present application example, eight electric wiring boards 90 are provided since the amount of electric power the liquid discharge head 3 uses is great. Four each of the electric wiring boards 90 are attached to both sides of the slender electric wiring board support member 82 attached to the liquid discharge unit support member 81.

Figure 40A:
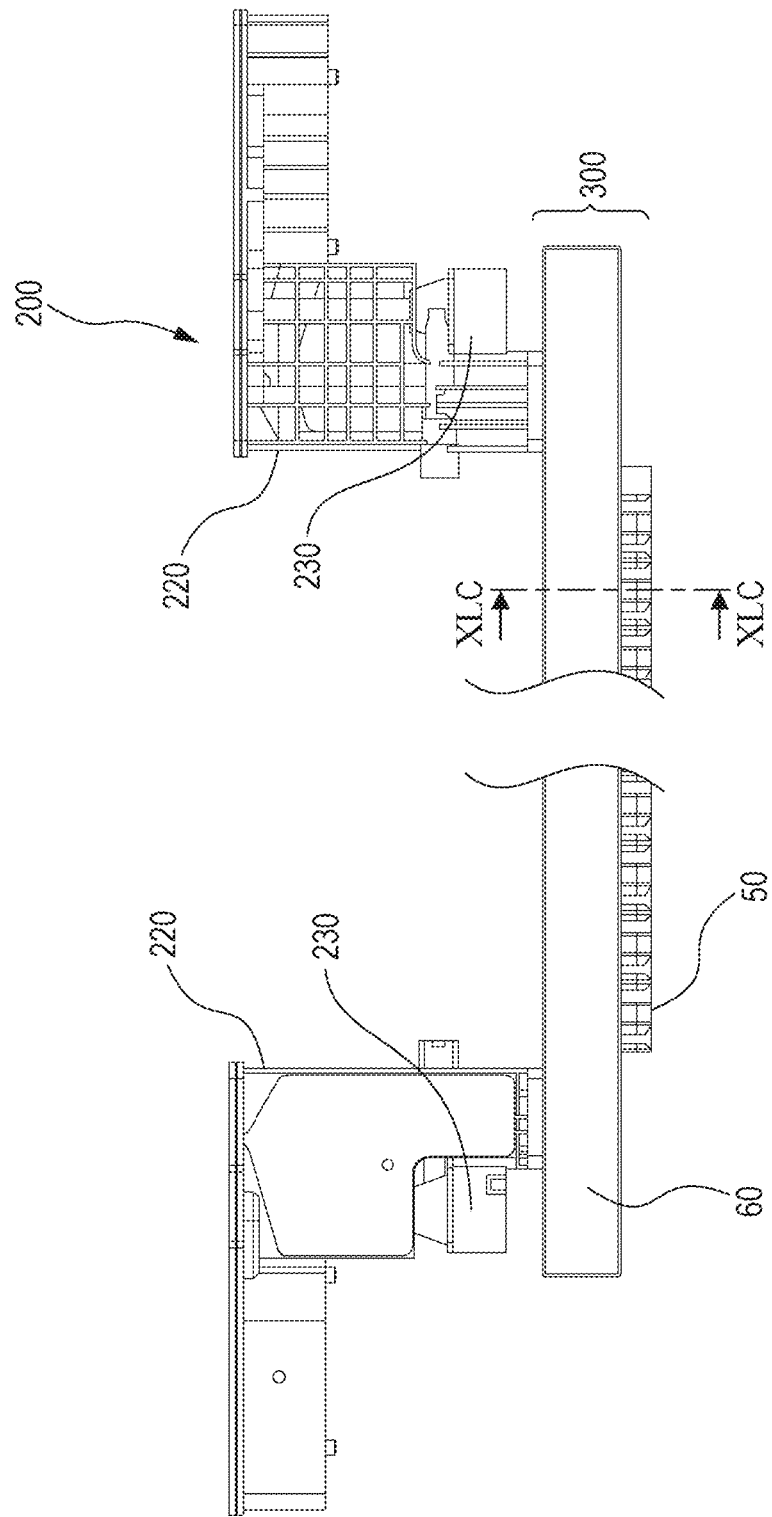
FIGS. 40A through 40C are diagrams illustrating the liquid discharge head according to the third application example.
Figure 40B:
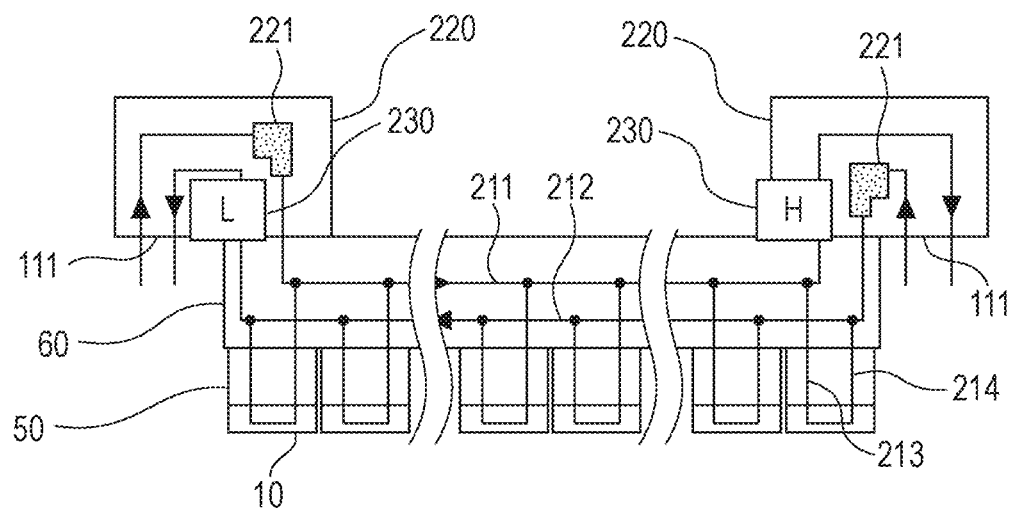
Figure 40C:
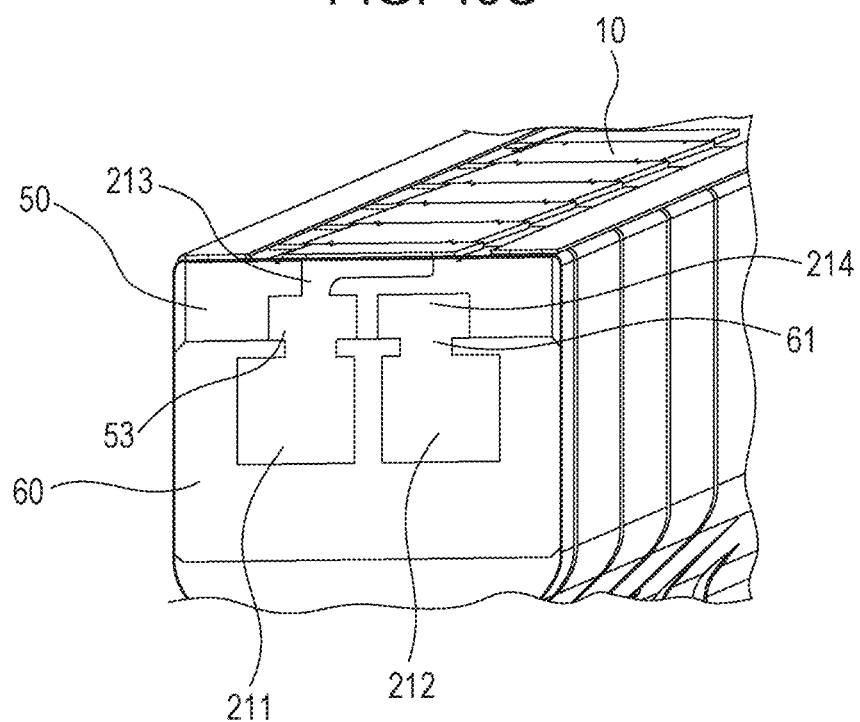

FIG. 40A is a side view of the liquid discharge head 3 that has the liquid discharge unit 300, liquid supply units 220, and negative pressure control units 230, FIG. 40B is a schematic diagram illustrating the flow of liquid, and FIG. 40C is a perspective view illustrating a cross-section taken along line XLC-XLC in FIG. 40A. Parts of the configuration have been simplified to facilitate understanding.

The liquid connection portions 111 and filters 221 are provided within the liquid supply units 220, with the negative pressure control units 230 being integrally formed beneath the liquid supply units 220. This enables the distance in the height direction between the negative pressure control units 230 and the recording element boards 10 to be reduced as compared to the second application example. This configuration reduces the number of channel connection portions within the liquid supply units 220, and is advantageous not only regarding improved reliability regarding leakage of recording liquid, but also in that the number of parts and assembly processes can be reduced.

Also, the water head difference between the negative pressure control units 230 and the face where the discharge orifices are formed is relatively smaller, and accordingly can be suitably applied to a recording apparatus where the inclination angle of the liquid discharge head 3 differs for each liquid discharge head 3, such as illustrated in FIG. 37. The reason is that the reduced water head difference enables the negative pressure difference applied to the discharge orifices of the respective recording element boards 10 can be reduced even if each of the multiple liquid discharge heads 3 is used at a different inclination angle. Reducing the distance from the negative pressure control units 230 to the recording element boards 10 also reduces the pressure drop difference due to fluctuation in flow of the liquid, since the flow resistance is reduced, and is preferable from the point that more stable negative pressure control can be performed.

FIG. 40B is a schematic diagram illustrating the flow of the recording liquid within the liquid discharge head 3. The circuitry is the same as the circulation path illustrated in FIG. 38, but FIG. 40B illustrates the flow of liquid at each component within the actual liquid discharge head 3. A set of the common supply channel 211 and common recovery channel 212 is provided within the slender second channel member 60, extending in the longitudinal direction of the liquid discharge head 3. The common supply channel 211 and common recovery channel 212 are configured so that the liquid flows in mutually opposite directions, with filters 221 disposed at the upstream side of these channels to trap foreign substances intruding from the connection portions 111 or the like. This arrangement where the liquid flows in mutually opposite directions in the common supply channel 211 and common recovery channel 212 is preferable from the point that the temperature gradient in the longitudinal direction within the liquid discharge head 3 is reduced. The flow direction of the common supply channel 211 and common recovery channel 212 is shown as being in the same direction in FIG. 38 to simplify explanation.

A negative pressure control unit 230 is disposed at the downstream side of each of the common supply channel 211 and common recovery channel 212. The common supply channel 211 has branching portions to multiple individual supply channels 213 along the way, and the common recovery channel 212 has branching portions to multiple individual recovery channels 214 along the way. The individual supply channels 213 and individual recovery channels 214 are formed within multiple first channel members 50. Each of the individual channels communicate with openings 21 (see FIG. 19C) of the cover 20 provided to the reverse face of the recording element boards 10.

The negative pressure control units 230 indicated by H and L in FIG. 40B are high-pressure side (H) and low-pressure side (L) units. The respective negative pressure control units 230 are back-pressure type pressure adjustment mechanisms, set to control the pressure upstream of the negative pressure control units 230 to relatively high (H) and low (L) negative pressures. The common supply channel 211 is connected to the negative pressure control unit 230 (high-pressure side), and the common recovery channel 212 is connected to the negative pressure control unit 230 (low-pressure side). This generates differential pressure between the common supply channel 211 and common recovery channel 212. This differential pressure causes the liquid to flow from the common supply channel 211, through the individual supply channels 213, discharge orifices 13 (pressure chambers 23) within the recording element boards 10, and the individual recovery channels 214 in that order, and to the common recovery channel 212.

FIG. 40C is a perspective view illustrating a cross-section taken along line XLC-XLC in FIG. 40A. Each discharge module 200 in the present application example is configured including a first channel member 50, recording element boards 10, and flexible printed circuit boards 40. The present application example does not have the support member 30 (FIG. 18) described in the second application example, with the recording element boards 10 having the cover 20 being directly joined to the first channel member 50. The common supply channel 211 provided to the second channel member 60 supplies liquid from the communication ports 61 provided on the upper face thereof to the individual supply channels 213, via the individual communication ports 53 formed on the lower face of the first channel member 50. Thereafter, the liquid passes through the pressure chambers 23, and is recovered to the common recovery channel 212 via the individual recovery channels 214, individual communication ports 53, and communication ports 61, in that order.

Unlike the arrangement illustrated in the second application example illustrated in FIGS. 15A and 15B, the individual communication ports 53 on the lower face of the first channel member 50 (the face toward the second channel member 60) are openings of a sufficient size with regard to the communication ports 61 formed on the upper face of the second channel member 60. According to this configuration, even in a case where there is positional deviation at the time of mounting the discharge module 200 to the second channel member 60, fluid communication can be realized in a sure manner between the first channel member 50 and the second channel member 60, so yield will improve when manufacturing the head, thereby reducing costs.

First Embodiment

A specific embodiment will be described below. Although description will be made with regard to a case of using the liquid discharge head according to the first application example illustrated in FIGS. 1 through 12, the liquid discharge heads according to the other application examples can be used in the same way.

Description of Flow of Liquid within Discharge Orifice

Figure 21A:
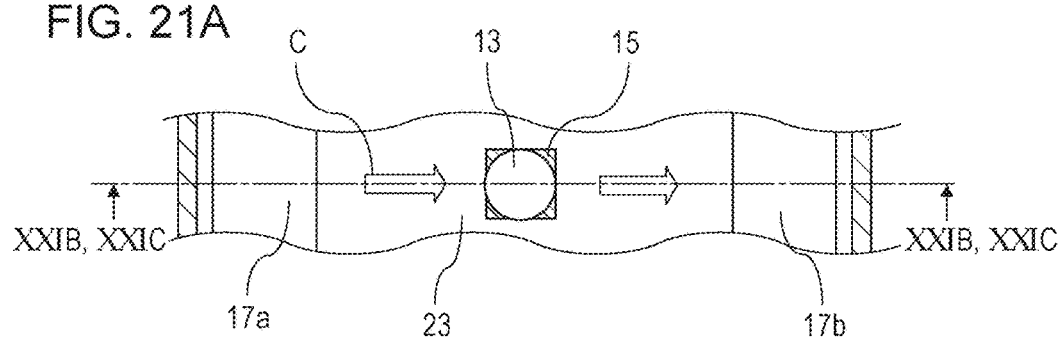
FIGS. 21A through 21C are diagrams illustrating primary portions of a liquid discharge head according to a first embodiment, FIG. 21A being a plan view, 21B a cross-sectional view, and FIG. 21C a perspective view.
Figure 21B:
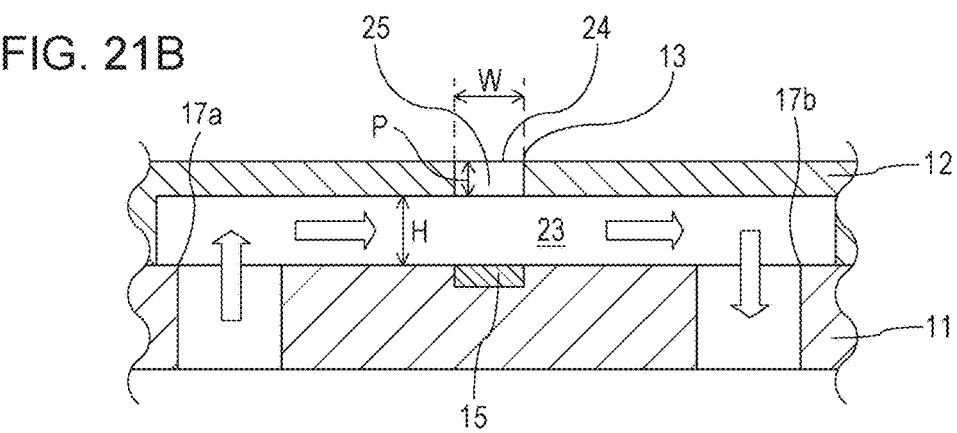
Figure 21C:
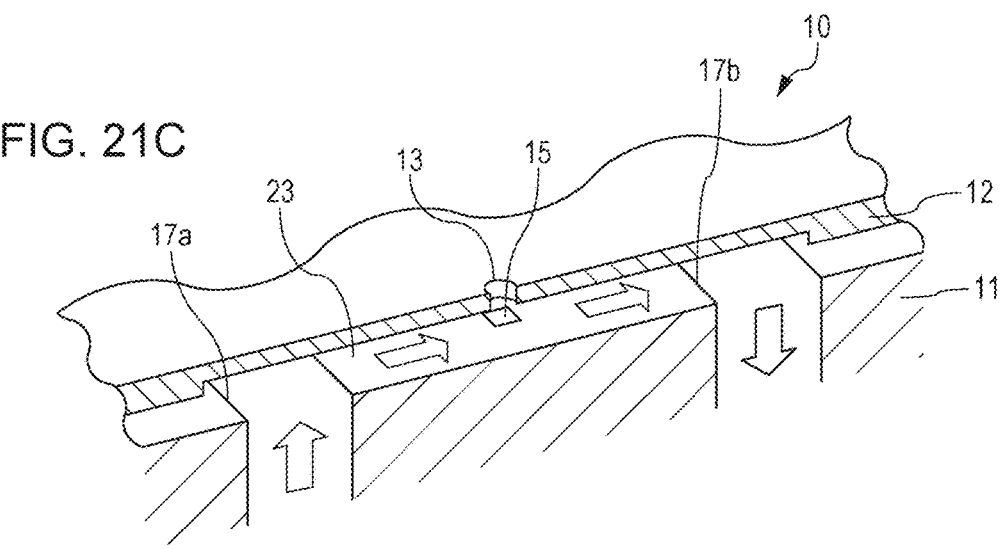

FIGS. 21A through 21C are schematic diagrams for describing near a discharge orifice of a recording element board in detail. FIG. 21A is a plan view from the discharge direction in which liquid is discharged, FIG. 21B is a cross-sectional view taken along line XXIB-XXIB in FIG. 21A, and FIG. 21C is a perspective view illustrating the cross-section taken along line XXIC-XXIC in FIG. 21A.

A circulatory flow C, where liquid within the liquid supply channel 18 provided to the substrate 11 flows to the liquid recovery channel 19 via the supply port 17a, pressure chamber 23, and recovery port 17b, is formed in the recording element board 10 with regard to discharge orifices 13 that are not performing discharge operations as described above. The speed of the circulatory flow C in the pressure chamber 23 is around 0.1 to 100 mm/s for example, and is a speed where performing discharging operations in a state where the liquid is flowing has little effect on droplet landing accuracy and so forth. A liquid meniscus, i.e., a discharge orifice interface 24 that is an interface between the liquid and the atmosphere, is formed at the discharge orifice 13. The discharge orifice 13 is an opening of a through path 25 formed in the discharge orifice forming member 12, and is an opening that opens at the face of the discharge orifice forming member 12 on the side where liquid is discharged, as illustrated in FIG. 21B. In the following description, the through path 25 will be referred to as "discharge orifice portion", the direction in which liquid is discharged from the discharge orifice 13 (vertical direction in FIG. 21B) will be referred to as "discharge direction", and the direction in which the liquid flows in the pressure chamber 23 (horizontal direction in FIG. 21B) will be referred to simply as "flow direction".

Now, the dimensions of the pressure chamber 23 and discharge orifice portion 25 will be defined as follows. The height of the pressure chamber 23 at the upstream side thereof from the portion communicating with the discharge orifice portion 25 is defined as H, the length of the discharge orifice portion 25 in the discharge direction is defined as P, and the width in the flow direction is defined as W. An example of these dimensions is 3 through 30 μm for H, 3 through 30 μm for P, and 6 through 30 μm for W. Also, an example will be described below of a case where the discharged liquid is ink that has been adjusted to nonvolatile solvent concentration of 30%, color material concentration of 3%, and viscosity of 0.002 to 0.003 Pa·s.

Figure 22:
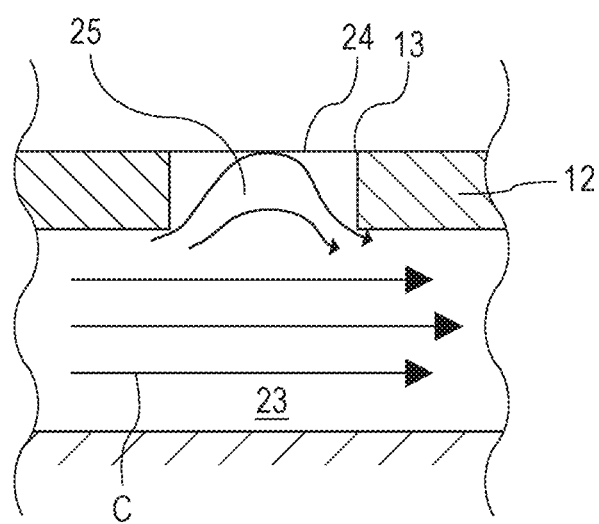
FIG. 22 is an enlarged cross-sectional view of near a discharge orifice of the liquid discharge head.

FIG. 22 is an enlarged cross-sectional view of near the discharge orifice 13, and represents the state of the circulatory flow C at the discharge orifice 13, discharge orifice portion 25, and pressure chamber 23, when the circulatory flow C is in a steady state. Specifically, the arrows indicate the flow of ink that has flowed into the pressure chamber 23 from the supply port 17a at a flow rate of $1.26 \times 10^{-4}$ ml/min, in a recording element board 10 where the above-described H is 14 μm, P is 5 μm, and W is 12.4 μm. Note that the lengths of the arrows in FIG. 22 do not represent speed.

Although evaporation of ink from the discharge orifices 13 causes change in the color material concentration, the recording element board 10 of the dimensions described above is arranged to suppress such ink from stagnating at the discharge orifice 13 and discharge orifice portion 25. That is to say, part of the circulatory flow C in the pressure chamber 23 flows inside the discharge orifice portion 25, reaches the position of the meniscus formed in the discharge orifices 13 (nearby the meniscus interface), and then returns from the discharge orifice portion 25 to the pressure chamber 23. Accordingly, not only ink at the discharge orifice portion 25 that is readily affected by evaporation, but also ink near the discharge orifice interface 24 where the effects or evaporation are particularly great, can be made to flow to the pressure chamber 23 without standing inside the discharge orifice portion 25. A feature of the circulatory flow C here is that it has, regarding the flow direction (from the left to the right in FIG. 21B) nearby at least the middle portion of the discharge orifice interface 24 (center portion of the discharge orifice), a speed component (hereinafter referred to as "positive speed component"). A flow mode where the circulatory flow C has the positive speed component at least near the middle portion of the discharge orifice interface 24, such as illustrated in FIG. 22, will be referred to as "flow mode A". A flow mode where the circulatory flow C has a negative speed component (from the right to the left in FIG. 21B) opposite to the positive speed component near the middle portion of the discharge orifice interface 24, which will be described later, will be referred to as "flow mode B".

The present inventors have found that whether the circulatory flow C in the liquid discharge head is flow mode A (or flow mode B) is determined by the dimensions H, P, and W of the pressure chamber 23 and discharge orifice portion 25 described above. That is to say, in a liquid discharge head where the circulatory flow C is flow mode A, the height H of the pressure chamber 23 at the upstream side thereof, the length P of the discharge orifice portion 25 in the discharge direction, and the length W in the flow direction, satisfy the following relationship (see FIG. 21B).

$$H^{-0.34} \times P^{-0.66} \times W > 1.7 \quad (1)$$

Accordingly, the flow mode A such as illustrated in FIG. 22 is realized in a liquid discharge head that satisfies the relationship in Expression (1), while the flow mode B is realized in a liquid discharge head that does not satisfy the relationship in Expression (1). The left side of Expression (1) will be referred to as "determination value J".

Figure 23:
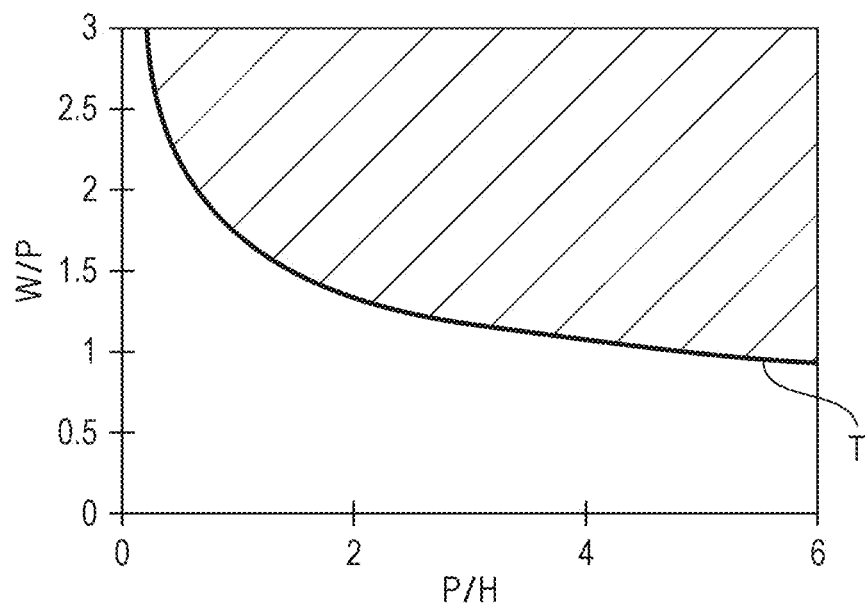
FIG. 23 is a graph for describing the relationship between head dimensions and flow mode.

FIG. 23 is a graph for explaining the relationship between the dimensions of the liquid discharge head and the flow mode. The horizontal axis represents the ratio of P to H (P/H), and the vertical axis represents the ratio of W to P (W/P). The heavy line T in FIG. 23 is a threshold line that satisfies the following relationship.

$$\left(\frac{W}{P}\right) = 1.7 \times \left(\frac{P}{H}\right)^{-0.34} \quad (2)$$

The flow mode A is realized at the liquid discharge head at the portion where the relationship of H, P, and W is above the threshold line T (the hatched region) in FIG. 23, and the flow mode B is realized below the threshold line T. That is to say, the flow mode A is realized in a liquid discharge head satisfying the following relationship.

$$\left(\frac{W}{P}\right) > 1.7 \times \left(\frac{P}{H}\right)^{-0.34} \quad (3)$$

Reordering Expression (3) yields Expression (1), so the flow mode A is realized in a liquid discharge head where the relationship of H, P, and W satisfies Expression (1). On the other hand, the flow mode B is realized in a liquid discharge head where the relationship of H, P, and W satisfies the following relationship.

$$H^{-0.34} \times P^{-0.66} \times W \leq 1.7 \quad (4)$$

Now, a liquid discharge head with the flow mode B is advantageous with regard to the point that cracking of the discharge orifice forming member 12 can be suppressed, since the length P in the discharge direction of the discharge orifice portion 25, i.e., the thickness of the discharge orifice forming member 12, can be made larger. The height H of the pressure chamber 23 also can be made higher, which also is advantageous since the pressure difference necessary for generating the circulatory flow C can be smaller.

Figure 24:
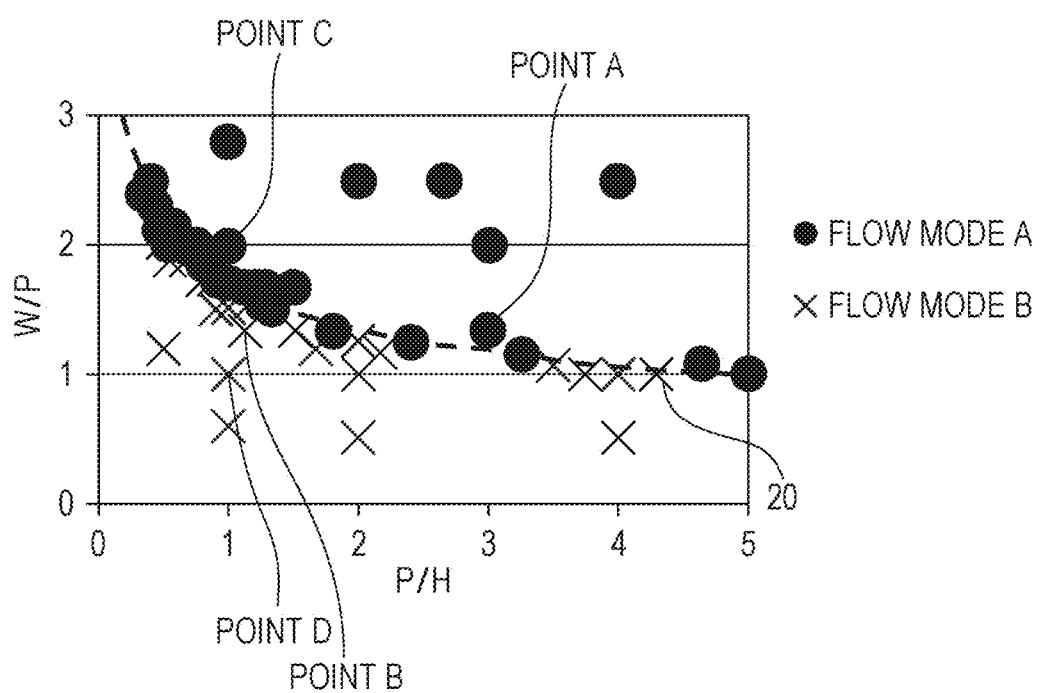
FIG. 24 is a graph illustrating the results of having confirmed the relationship between head dimensions and flow mode.
Figure 25A:
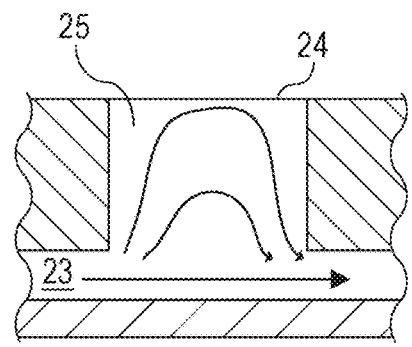
FIGS. 25A through 25D are diagram illustrating circulatory flows within a discharge orifice.
Figure 25B:
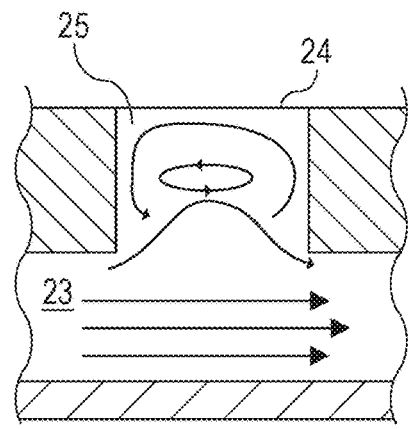
Figure 25C:
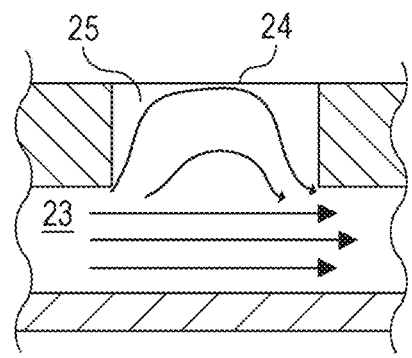
Figure 25D:
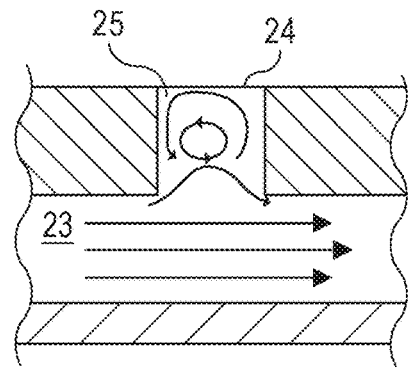

The above relational expressions and the flow within the discharge orifice portion 25 will be described in detail, with reference to FIGS. 24 through 25D. FIG. 24 is a graph illustrating the results of having confirmed the flow within the discharge orifice portion of liquid discharge heads of various shapes. The dots in FIG. 24 represent liquid discharge heads determined to have flow mode A, and the crosses represent discharge heads determined to have flow mode B. FIGS. 25A through 25D are diagrams illustrating examples of circulatory flows in liquid discharge heads indicated by respective points A through D in FIG. 24.

The liquid discharge head indicated by point A in FIG. 24 has H of 3 μm, P of 9 μm, and W of 12 μm. The determination value J that is the left side of Expression (1) is 1.93, which is larger than 1.7. In this case, the actual flow within the discharge orifice portion 25 is such as illustrated in FIG. 25A, which is a flow mode A having a positive speed component near the middle portion of the discharge orifice interface 24. The liquid discharge head indicated by point B in FIG. 24 has H of 8 μm, P of 9 μm, and W of 12 μm. The determination value J is 1.39, which is smaller than 1.7. In this case, the actual flow within the discharge orifice portion 25 is such as illustrated in FIG. 25B, which is a flow mode B having a negative speed component near the middle portion of the discharge orifice interface 24. The liquid discharge head corresponding to point C in FIG. 24 has H of 6 μm, P of 6 μm, and W of 12 μm. The determination value J is 2.0, which is larger than 1.7. In this case, the actual flow within the discharge orifice portion 25 is such as illustrated in FIG. 25C, which is a flow mode A having a positive speed component near the middle portion of the discharge orifice interface 24. The liquid discharge head indicated by point D in FIG. 24 has H of 6 μm, P of 6 μm, and W of 6 μm. The determination value J is 1.0, which is smaller than 1.7. In this case, the actual flow within the discharge orifice portion 25 is such as illustrated in FIG. 25D, which is a flow mode B having a negative speed component near the middle portion of the discharge orifice interface 24.

Thus, liquid discharge heads that exhibit flow mode A and liquid discharge heads that exhibit flow mode B can be distinguished by the threshold line T in FIG. 23 as a boundary. That is to say, liquid discharge heads where the determination value J in Expression (1) is larger than 1.7 realize the flow mode A, and the circulatory flow C has a positive component at least at near the middle portion of the discharge orifice interface 24.

Note that the conditions of H, P, and W are dominating influences on whether the circulatory flow C within the discharge orifice portion 25 is flow mode A or flow mode B. Influence of other conditions, such as the flow velocity of the circulatory flow C, the viscosity of ink, the width of the discharge orifice 13 (length in the direction orthogonal to the direction of the flow), for example, is minute in comparison with the conditions of H, P, and W. Accordingly, the flow velocity of the circulatory flow C and the ink viscosity can be set as suitable, in accordance with required specifications of the liquid discharge head (inkjet recording apparatus) and usage environment conditions. For example, a flow velocity of the circulatory flow C in the pressure chamber 23 of 0.1 to 100 mm/s, and ink having viscosity of 0.01 Pa·s, can be used. In a case where the amount of ink evaporation from the discharge orifice increases in a liquid discharge head with flow mode A due to change in usage environment or the like, appropriately increasing the circulatory flow C allows the flow mode A to be maintained. On the other hand, in a liquid discharge head where dimensions have been set to realize flow mode B, flow mode A cannot be realized however the flow rate of the circulatory flow C is increased. Of liquid discharge heads where the flow mode A is realized, liquid discharge heads where H is 20 μm or less, P is 20 μm or less, and W is 30 μm or less, are particularly preferable, thereby enabling higher definition image formation.

Second Embodiment

Figure 30:
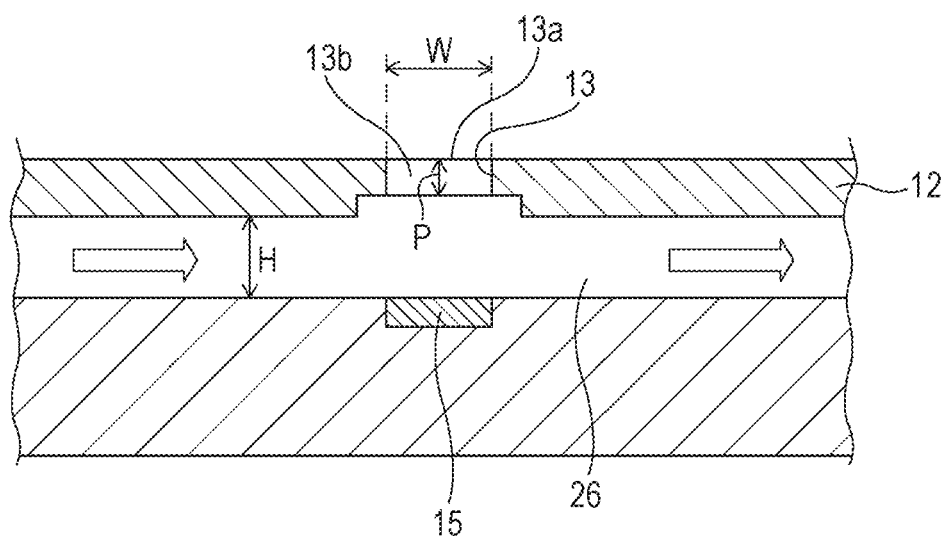
FIG. 30 is a cross-sectional diagram of a liquid discharge head according to a second embodiment.

FIG. 30 is a diagram illustrating the flow of ink flowing through a liquid discharge head according to a second embodiment. The liquid discharge head according to the present embodiment has a stepped portion at a communication portion between the channel 26 and a discharge orifice portion 13b, as illustrated in FIG. 30. The portion from the discharge orifice 13 to a portion where the stepped portion is formed is the discharge orifice portion 13b, the discharge orifice portion 13b being connected to the channel 26 via a portion having a diameter larger than itself (a part of the channel) in the present embodiment. Accordingly, the P, W, and H in the present embodiment are stipulated as illustrated in FIG. 30. The flow mode A can be realized in a liquid discharge head having this shape as well, by setting the P, W, and H so as to satisfy Expression (3). Accordingly, the multi-stepped configuration from the channel toward the discharge orifice enables the flow resistance in the direction from the recording element 15 toward the discharge orifice 13 to be made relatively small.

Third Embodiment

Figure 31A:
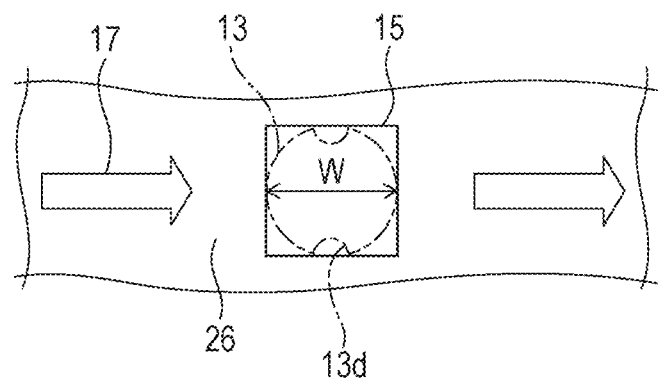
FIGS. 31A and 31B are plan views of a liquid discharge head according to a third embodiment.
Figure 31B:
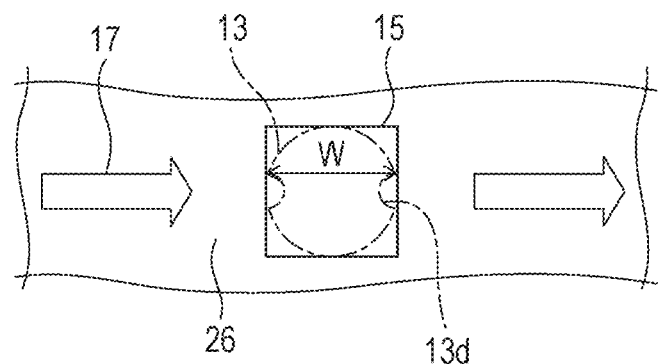

FIGS. 31A and 31B are diagrams illustrating two examples of the shape of the discharge orifice in particular, of a liquid discharge head according to a third embodiment. FIGS. 31A and 31B are plan views (schematic views) viewing the discharge orifice 13 from the direction of discharge of liquid. The discharge orifice 13 according to the present embodiment is shaped such that protrusions 13d are formed extending from opposing positions toward the center of the discharge orifice. The protrusions 13d extend continuing from the outer surface of the discharge orifices 13 to the inner portion of the discharge orifice portion 13b. The flow mode A can be realized in an arrangement having these protrusions as well, by setting H, P, and W so as to satisfy the above Expression (2).

The discharge orifice in the example illustrated in FIG. 31A has the protrusions 13d protruding in a direction intersecting the flow of the liquid in the channel 26. The discharge orifice in the example illustrated in FIG. 31B has the protrusions 13d protruding in a direction following the flow of ink. Forming such protrusions in the discharge orifices 13 enables the meniscus formed between the protrusions 13d to be maintained more easily than the meniscus at other portions in the discharge orifice, so the droplet tail of an ink droplet extending from the discharge orifice can be cut off at an earlier timing. Thus, occurrence of mist, which is minute droplets generated along with the main droplet, can be suppressed.

Description of Features Common to the First Through Third Embodiments
Description of Effects of Lowered Specific Permittivity of Ink As described above, ink within the discharge orifice portion 25, particularly ink near the discharge orifice interface 24, can be moved to the pressure chamber 23 by the circulatory flow C having a positive speed component reaching near the discharge orifice interface 24 in the liquid discharge head 3 in flow mode A. Accordingly, stagnation of ink within the discharge orifice portion 25 can be suppressed, and increase in color material concentration of ink within the discharge orifice portion 25 can be reduced with regard to evaporation from the discharge orifice 13. However, even if there is a circulatory flow C within the pressure chamber 23, the circulatory flow C does not readily occur near the perimeter of the discharge orifice 13 due to the effects of viscosity, so stagnation of ink is difficult to suppress.

Figure 26A:
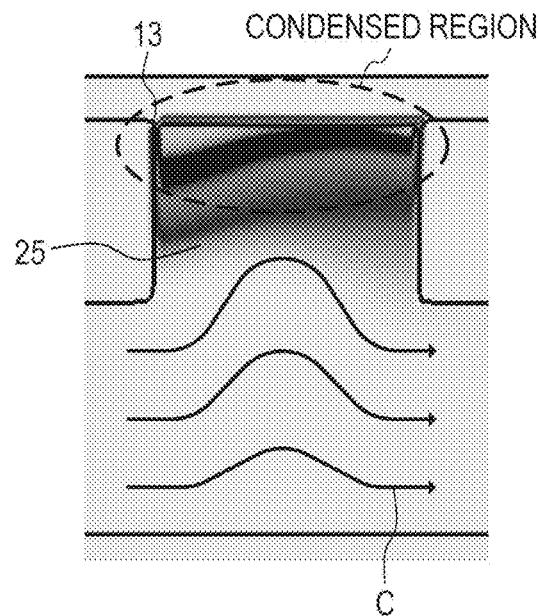
FIGS. 26A through 26C are diagram illustrating concentration of ink within a discharge orifice.
Figure 26B:
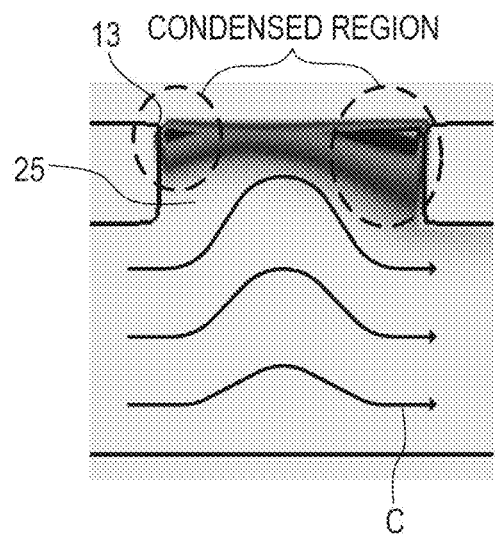
Figure 26C:
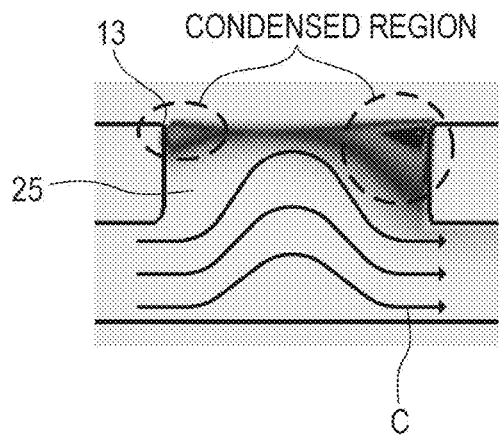

FIGS. 26A through 26C are diagrams illustrating ink concentration within the discharge orifice portion 25, for a liquid discharge head that has flow mode B (J=1.3 and H=14 μm, P=11 μm, W=16 μm) in FIG. 26A, a liquid discharge head that has flow mode A (J=2.3 and H=14 μm, P=6 μm, W=18 μm) in FIG. 26B, and a liquid discharge head that has flow mode A (J=3.5 and H=5 μm, P=5 μm, W=18 μm) in FIG. 26C. FIGS. 26A and 26C are in the order of easiness for the circulatory flow C to reach the discharge orifice interface 24. It can be seen from FIGS. 26B and 26C that stagnation of concentrated ink occurs near the perimeter of the discharge orifice 13 (regions encircled by dotted lines as "concentrated regions", even with liquid discharge heads having the flow mode A. Accordingly, in a case where the ink has a large amount of solids (e.g., 8% by weight or more), the influence of concentrated ink is received more readily near the perimeter of the discharge orifice 13, and defective discharge occurs more readily. Note that solids included in ink include emulsions of pigments, resin, polymers, and the like.

The present inventors have found that to counter defective discharge occurring in a case of using ink with a large amount of solids, reducing the specific permittivity of the ink brings about a receding phenomenon of pigment in the ink, whereby concentration of ink near the perimeter of the discharge orifice can be suppressed. The receding phenomenon of pigment is a phenomenon where, in a case of moisture in ink having evaporated from the discharge orifices, pigment having hydrophilicity near the discharge orifice recedes (moves) to the pressure chamber 23 side (recording element side) where there is more water contained, and thus the pigment concentration near the discharge orifice interface decreases. This point will be described with reference to FIGS. 27A through 29C.

Figure 27A:
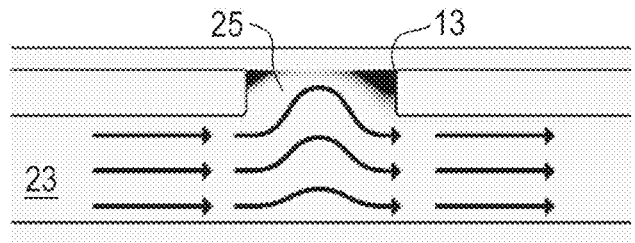
FIG. 27A through 27D are diagrams illustrating concentration distribution of pigment and concentration distribution of solvent within a discharge orifice.
Figure 27B:
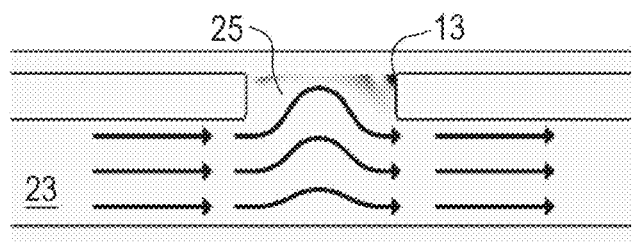
Figure 27C:
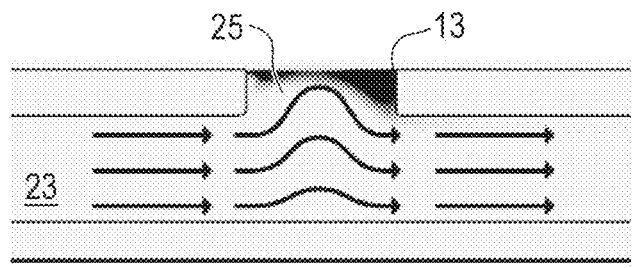
Figure 27D:
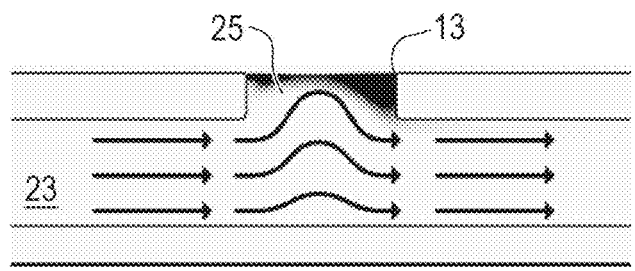

FIGS. 27A and 27B are diagrams illustrating the results of numerical value calculation (simulation) of pigment concentration distribution within the discharge orifice portion 25 in a state where a circulatory flow C is occurring, using ink where the amount of solids is 8% by weight or more, and a liquid discharge head with flow mode A (J=2.3). FIG. 27A illustrates a case where the receding phenomenon of pigment substantially is not occurring, and FIG. 27B illustrates a state where receding phenomenon of pigment is occurring. In the same way, FIGS. 27C and 27D are diagrams illustrating the results of numerical value calculation of solvent concentration distribution within the discharge orifice portion 25 in a state where a circulatory flow C is occurring, using ink where the amount of solids is 8% by weight or more, and a liquid discharge head with flow mode A (J=2.3). FIG. 27C illustrates a case where the receding phenomenon of pigment substantially is not occurring, and FIG. 27D illustrates a state where receding phenomenon of pigment is occurring.

If substantially no receding phenomenon of pigment is occurring, concentration of ink due to evaporation of ink from the discharge orifice 13 cannot be sufficiently suppressed near the perimeter of the discharge orifice 13, even in a case where a circulatory flow C is generated as illustrated in FIG. 27A, and concentration of pigment occurs. As a result, aggregation properties of pigment particles to each other increase, the ink readily thickens, and in extreme cases, the ink solidifies, so defective discharge (e.g., change in discharge speed) more readily occurs at the first discharge after an intermission in discharge operations for a certain amount of time. On the other hand, in a case where the receding phenomenon of pigment is occurring, pigment does not readily stagnate near the perimeter of the discharge orifices 13 due to the circulatory flow C that reaches near the discharge orifice 13 since the pigment has receded to the pressure chamber 23 side, as illustrated in FIG. 27B. As a result, the ink does not readily thicken and solidification is suppressed, so defective discharge does not readily occur at the first discharge after intermission.

Concentration of solvent near the perimeter of the discharge orifice 13 occurs in the same way regardless of whether or not the receding phenomenon of pigment is occurring, as illustrated in FIGS. 27C and 27D. However, the effect of solids such as pigment is generally larger on thickening of the ink, so suppression of stagnation of ink solids near the discharge orifice 13 is particularly important from the perspective of suppressing ink thickening from affecting discharging.

Figure 28:
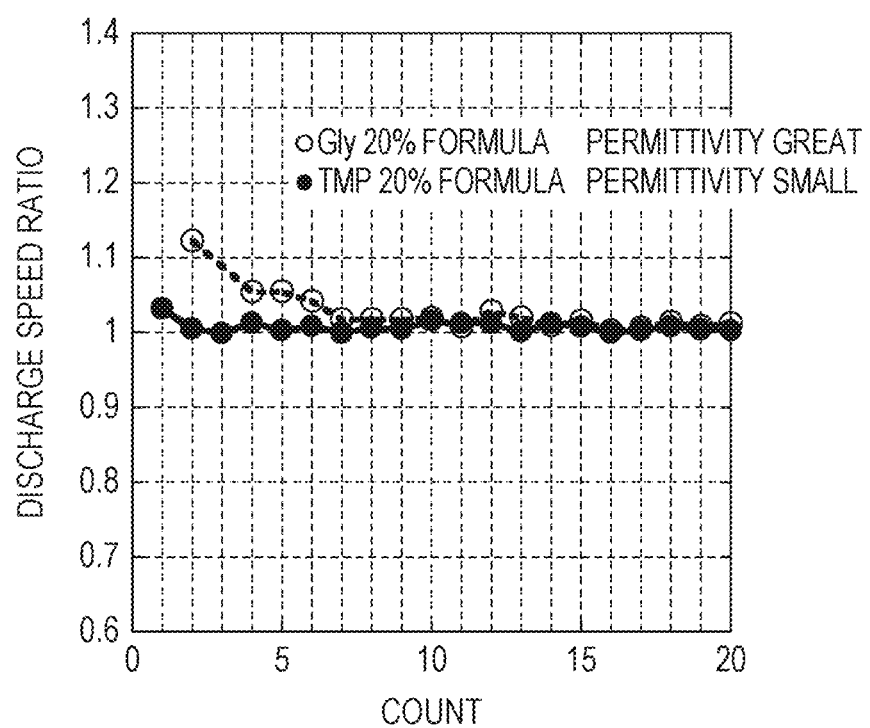
FIG. 28 is a graph plotting discharge speed as to the number of droplets discharged after an intermission.

FIG. 28 is a graph where two types of ink having different specific permittivity (solvent formula) being used in a liquid discharge head having flow mode A (J=2.3), and in a state where a circulatory flow C is formed, discharge operations are stopped for 10 seconds and thereafter the discharge speed is plotted against the discharge count. Specifically, the vertical axis is the ratio where the average value of discharge speed after the twentieth discharge following the intermission is taken as 1. The plotted results were obtained in a case where the solids in the ink (including emulsions of pigment, resin, polymer, etc.) 15% by weight, 10 mm/s for the flow velocity of circulatory flow C (circulation velocity), and head temperature of 55° C. The following two types of solvent formulas were used for the ink. Details of the definition of specific permittivity $\epsilon_r$ will be described later.
Formula A: 20% by weight of glycerin (Gly), great specific permittivity ($\epsilon_r$=45)
Formula B: 20% by weight of trimethylolpropane (TMP), small specific permittivity ($\epsilon_r$=30)

It can be seen from FIG. 28 that the formula B that has relatively low specific permittivity (solid dots in FIG. 28) have relatively smaller change in discharge speed from the first discharge (and several discharges thereafter) after the intermission, as compared to the formula A that has relatively high specific permittivity (circles in FIG. 28). The reason is that lowering the specific permittivity makes the above-described receding phenomenon of pigment more pronounced. Accordingly, a lower specific permittivity is preferable to reduce the change in discharge speed from the first discharge (and several discharges thereafter) after the intermission.

Figure 29A:
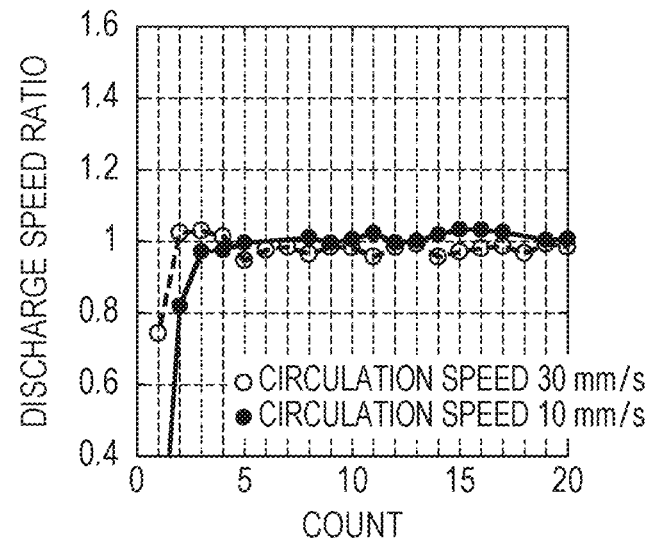
FIGS. 29A through 29C are graphs plotting discharge speed as to the number of droplets discharged after an intermission.
Figure 29B:
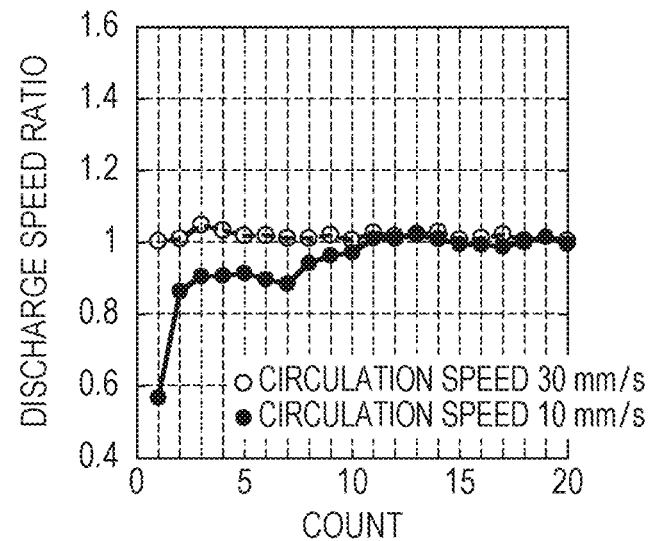
Figure 29C:
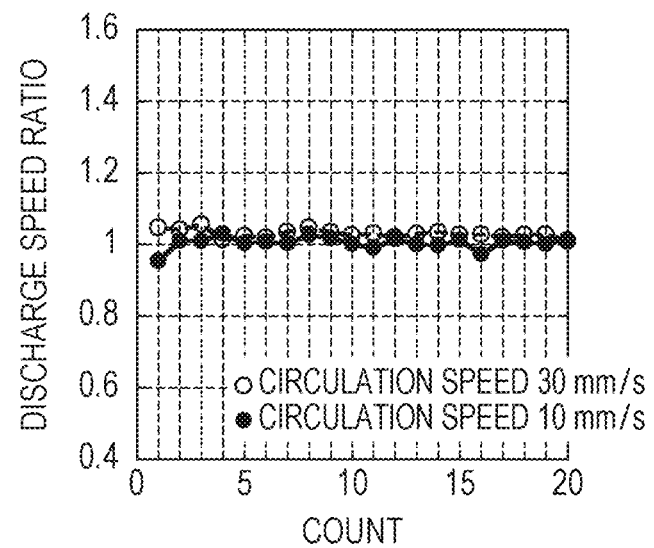

FIGS. 29A through 29C are graphs where discharge speeds of three types of ink each having different specific permittivity (solvent formula) have been plotted. Specifically, these are graphs of these inks being used in a liquid discharge head having flow mode A (J=3.5), and in a state where a circulatory flow C is formed, discharge operations are stopped for 10 seconds and thereafter the discharge speed (the ratio where the average value of discharge speed after the twentieth discharge following the intermission is taken as 1) is plotted against the discharge count. The plotted results were obtained in a case where the solids in the ink (pigment, polymer, etc.) 12% by weight, 10 mm/s and 30 mm/s for the flow velocity of circulatory flow C (circulation velocity), and head temperature of 55° C. The solvent formulas of ink are as shown in the Table. FIG. 29A shows the discharge speed of Formula 1, FIG. 29B shows the discharge speed of Formula 2, and FIG. 29C shows the discharge speed of Formula C.

TABLE

| Standard | Solvent (weight by %) | | | | Specific permittivity |
|---|---|---|---|---|---|
| | Glycerin | 2-Pyrrolidinone | Trimethylol propane | Total | |
| Formula 1 | 15 | 5 | 0 | 20 | 45.4 |
| Formula 2 | 10 | 5 | 5 | 20 | 40.7 |
| Formula 3 | 0 | 5 | 10 | 15 | 33.8 |

FIGS. 29A through 29C have been obtained using the liquid discharge head in FIG. 26C with flow mode A (J=3.5), and it can be seen that the circulatory flow C reaches the discharge orifice interface 24 more readily in comparison with the liquid discharge head in FIG. 26B with flow mode A (J=2.3). However, in a case where the ink has a high concentration of solids (12% by weight), the change in discharge speed at the first discharge after intermission is great with Formula 1 that has relatively high specific permittivity, even if the circulation flow velocity is high (30 mm/s), as illustrated in FIG. 29A. Formula 2 that has a lower specific permittivity than Formula 1 is preferable since the change in discharge speed is overall small in a case where the circulation flow velocity is high (30 mm/s), as illustrated in FIG. 29B. On the other hand, Formula 3 that has an even lower specific permittivity is even more preferable since the change in discharge speed from the first discharge after intermission is small even in a case where the circulation flow velocity is low (10 mm/s), as illustrated in FIG. 29C. Accordingly, $\epsilon_r \leq 40.7$ is preferable for specific permittivity $\epsilon_r$, and $\epsilon_r \leq 33.8$ is more preferable. It further can be seen from FIG. 28 that $\epsilon_r \leq 30.0$ is even more preferable. In a case where the concentration of ink solids is high, the viscosity tends to increase, so the differential pressure necessary to cause the ink to flow needs to be increased in order to increase the flow velocity of the circulatory flow C. However, increasing this differential pressure increases negative pressure applied to the discharge orifice 13, which has adverse effects on discharge properties. The flow velocity of the circulatory flow C is preferably lower from this perspective, but on the other hand, a slower flow velocity of the circulatory flow C makes it easier for solids in the ink to stagnate within the discharge orifice portion 25, and defective discharge occurs more readily. However, change in discharge speed of the first discharge after intermission can be suppressed to a lower level even in a case of lower circulation speed, by increasing the determination value J in flow mode A, and also lowering the specific permittivity of the ink to cause the receding phenomenon of pigment to occur.

Description of Definition of Specific Permittivity of Ink

The specific permittivity $\epsilon_r$ of the ink is defined by the following Expression, and is used in the present specification as an integer value that has been rounded off to the decimal.

$$\epsilon_r = \Sigma_n \epsilon_n r_n / \Sigma_n r_r \quad (5)$$

In the above Expression (5), n represents the type of water-soluble organic solvent, $\epsilon_n$ represents the specific permittivity of the water-soluble organic solvent represented by n, and $r_n$ represents the content of the water-soluble organic solvent represented by n as to the total mass of the ink, and is a physical property value excluding water. The regions concentrated by the circulatory flow C in this case conceivably has little water due to evaporation, so the water-soluble organic solvent with water excluded will be used as the physical property value of the liquid in the concentrated region.

The specific permittivity E, defined by Expression (5) above represents the specific permittivity of the overall "aqueous medium consisting of water-soluble organic solvent" in the ink, and specifically is a value calculated as follows. The value is obtained by adding values, obtained by multiplying the specific permittivity (non-dimensional number) unique to the water-soluble organic solvent by the content in the ink of this component (content as to total mass of ink, in terms of % by mass), for each component, and dividing the total thereof by the total content of the water-soluble organic solvent. The specific permittivity can be measured by a common permittivity meter. The content of water in the ink can be found by Karl Fischer titration or the like, and the type and content of the water-soluble organic solvent can be found by gas chromatography (GC/MS) or high-performance liquid chromatography (LC/MS) or the like.

The ink used in the present disclosure may include various types of additives as necessary. Examples of such additives include surfactants, pH adjusters, defoamers, anti-rust agents, preservatives, antioxidants, reduction inhibitors, evaporation promoters, chelators, and so forth. The content of such additives in the ink generally is quite small, and accordingly do not have to be necessarily taken into consideration when calculating the specific permittivity.

Description of Relationship Between Lowering in Specific Permittivity of Ink and Presence/Absence of Circulatory Flow in Pressure Chamber Even in a configuration where no circulatory flow C is formed in the pressure chamber 23, a poor medium can be used as an ink solvent formula, in order to reduce specific permittivity. However, in a case of using ink with more solids such as pigment or the like, the specific permittivity of the ink is difficult to lower in a configuration where no circulatory flow C is generated in the pressure chamber 23, due to the two following detriments.

In a configuration where no circulatory flow C is generated, the pigment concentrates when discharge operations are stopped for a certain amount of time, so the optical density (OD) tends to be high regarding the first landing dot after the intermission. However, if the specific permittivity of the ink is lowered, the receding phenomenon of pigment occurs, so the OD of the first landing dot after the intermission becomes low instead. This is the first detriment.

There also is a method in a configuration where the circulatory flow C is not generated to suppress solidification due to pigment concentration by using a good medium with high specific permittivity, such as glycerin that has good moisture-retention properties, as one measure to deal with solidification due to ink evaporation from the discharge orifice 13. There also is a method to use a poor medium with low specific permittivity to cause the receding phenomenon of pigment to occur, thereby making pigment concentration harder to happen, and thereby suppress solidification. However, excessively promoting occurrence of the receding phenomenon of pigment, i.e., excessively promoting lower specific permittivity, results in the receded pigment solidifying within the pressure chamber 23. This makes markedly reducing specific permittivity difficult. This is the second detriment.

These two detriments can be avoided by generating the circulatory flow C within the pressure chamber 23, and making the determination value J in the flow mode A to be larger can further this. That is to say, in a state where the circulatory flow C is generated, particularly in a state where the ink is flowing through the discharge orifice portion 25 as in flow mode A, the OD of the first landing dot after stopping does not readily change, regardless of whether or not the receding phenomenon of pigment is occurring. Accordingly, ink having a lower specific permittivity can be used, and stagnation of ink near the perimeter of the discharge orifices 13 can be suppressed. Solidification within the discharge orifice portion 25 and pressure chamber 23 also occurs less readily regardless of whether or not the receding phenomenon of pigment is occurring, ink with a lower specific permittivity can be used. Accordingly, lowering the specific permittivity of ink is particularly effective in a configuration where the circulatory flow C is generated in the pressure chamber 23. The present disclosure is particularly applicable to the flow mode A, but also is applicable to the flow mode B if the circulatory flow C is generated.

Thus, according to the present disclosure, a liquid discharge apparatus and liquid discharge head capable of high-definition and high-quality image formation can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-002959, filed Jan. 8, 2016 and No. 2016-238633 filed Dec. 8, 2016, which are hereby incorporated by reference herein in their entirety.

What is claimed is:
1. A liquid discharge apparatus comprising:
a liquid discharge head having a recording element board that includes:
  a discharge orifice configured to discharge liquid,
  a pressure chamber internally provided with a recording element configured to generate energy used to discharge liquid,
  a liquid supply channel configured to supply liquid to the pressure chamber,
  a liquid recovery channel configured to recover liquid from the pressure chamber; and
a flowage unit configured to cause liquid to flow through the liquid supply channel, the pressure chamber, and the liquid recovery channel, in that order,
wherein specific permittivity $\epsilon_r$ of the liquid being made to flow through the pressure chamber by the flowage unit satisfies the relationship of $\epsilon_r \leq 40.7$.

2. The liquid discharge apparatus according to claim 1, wherein specific permittivity $\epsilon_r$ of the liquid flowing through the pressure chamber satisfies the relationship of $\epsilon_r \leq 33.8$.

3. The liquid discharge apparatus according to claim 2, wherein specific permittivity $\epsilon_r$ of the liquid flowing through the pressure chamber satisfies the relationship of $\epsilon_r \leq 30.0$.

4. The liquid discharge apparatus according to claim 1, wherein a discharge orifice portion is formed communicating between the discharge orifice and the pressure chamber, and wherein a height H of the pressure chamber at an upstream side in a direction of flow of the liquid as to the communication portion with the discharge orifice portion, a length P of the discharge orifice portion in the discharge direction of the liquid, and a length W in the flow direction of the liquid at the discharge orifice portion, satisfy a relationship of $H^{-0.34} \times P^{-0.66} \times W > 1.7$.

5. The liquid discharge apparatus according to claim 4, wherein the height H is 20 μm or less, the length P is 20 μm or less, and the length W is 30 μm or less.

6. The liquid discharge apparatus according to claim 1, wherein the flow velocity of the liquid flowing through the pressure chamber is 0.1 to 100 mm/s.

7. The liquid discharge apparatus according to claim 1, wherein a solid component of the liquid is 8% by weight or more.

8. A liquid discharge head comprising:
a discharge orifice configured to discharge liquid;
a recording element configured to generate energy used to discharge liquid;
a pressure chamber internally provided with the recording element;
a liquid supply channel configured to supply liquid to the pressure chamber; and
a liquid recovery channel configured to recover liquid from the pressure chamber,
wherein a liquid of which specific permittivity $\epsilon_r$ satisfies the relationship of $\epsilon_r \leq 40.7$ circulates through the liquid supply channel, the pressure chamber, and the liquid recovery channel, in that order.

9. The liquid discharge head according to claim 8, wherein the specific permittivity $\epsilon_r$ of the liquid satisfies the relationship of $\epsilon_r \leq 33.8$.

10. The liquid discharge head according to claim 8, wherein a discharge orifice portion is formed communicating between the discharge orifice and the pressure chamber, and wherein a height H of the pressure chamber at an upstream side in a direction of flow of the liquid as to the communication portion with the discharge orifice portion, a length P of the discharge orifice portion in the discharge direction of the liquid, and a length W in the flow direction of the liquid at the discharge orifice portion, satisfy a relationship of $H^{-0.34} \times P^{-0.66} \times W > 1.7$.

11. The liquid discharge head according to claim 10, wherein the height H is 20 μm or less, the length P is 20 μm or less, and the length W is 30 μm or less.

12. The liquid discharge head according to claim 8, wherein the flow velocity of the liquid flowing through the pressure chamber is 0.1 to 100 mm/s.

13. The liquid discharge head according to claim 8, wherein a solid component of the liquid is 8% by weight or more.

14. The liquid discharge head according to claim 8, further comprising:
a plurality of recording element boards having the recording element; and
a channel member that supports the plurality of recording element boards and also supplies liquid to the plurality of recording element boards,
wherein the liquid discharge head is a page-wide liquid discharge head.

15. The liquid discharge head according to claim 14, wherein the channel member includes
a common supply channel extending in an array direction in which the plurality of recording element boards are arrayed, and configured to supply liquid to the plurality of recording element boards, and
a common recovery channel extending in the array direction, and configured to recover liquid from the plurality of recording element boards.

16. The liquid discharge head according to claim 14, wherein the plurality of recording element boards are arrayed in a straight line.

17. The liquid discharge head according to claim 8, wherein the liquid within the pressure chamber is circulated between the inside of the pressure chamber and the outside of the pressure chamber.

* * * * *